United States Patent
Mukai et al.

(10) Patent No.: US 9,240,854 B2
(45) Date of Patent: Jan. 19, 2016

(54) COMMUNICATION SYSTEM, STATION-SIDE COMMUNICATION DEVICE, USER-SIDE COMMUNICATION DEVICE, COMMUNICATION METHOD, AND CONTROL DEVICE

(75) Inventors: Hiroaki Mukai, Tokyo (JP); Fumihiko Tano, Tokyo (JP); Masaki Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 47 days.

(21) Appl. No.: 13/698,509

(22) PCT Filed: Jan. 27, 2012

(86) PCT No.: PCT/JP2012/051825
§ 371 (c)(1),
(2), (4) Date: Dec. 18, 2012

(87) PCT Pub. No.: WO2012/114827
PCT Pub. Date: Aug. 30, 2012

(65) Prior Publication Data
US 2014/0193150 A1  Jul. 10, 2014

(30) Foreign Application Priority Data
Feb. 25, 2011  (JP) ................. 2011-039740

(51) Int. Cl.
*H04J 14/00* (2006.01)
*H04J 14/02* (2006.01)
(Continued)

(52) U.S. Cl.
CPC .......... *H04J 14/0221* (2013.01); *H04B 10/272* (2013.01); *H04J 14/0247* (2013.01);
(Continued)

(58) Field of Classification Search
CPC .............. H04J 14/0221; H04J 14/0247; H04J 14/0252; H04J 14/0254; H04J 14/0267; H04J 14/023; H04J 14/0231; H04J 14/0232; H04J 14/0235; H04J 14/0238; H04J 14/0239; H04J 14/0242; H04J 14/0243; H04J 14/0245; H04J 14/0246; H04J 14/0249; H04J 14/025; H04J 14/0272; H04J 14/0278; H04B 10/272; H04B 10/278; H04L 12/12; H04L 12/14; H04L 12/44; Y02B 60/32; Y02B 60/34
USPC .............................. 398/70, 71, 72, 67, 66, 38
See application file for complete search history.

(56) References Cited

U.S. PATENT DOCUMENTS 8,774,621 B2  7/2014  Mukai
2008/0186892 A1  8/2008  Damnjanovic
(Continued)

FOREIGN PATENT DOCUMENTS

JP  7 154369  6/1995
JP  2009 55301  3/2009
WO  2011 021307  2/2011

OTHER PUBLICATIONS

International Telecommunication Union, "ONU management and control interface (OMCI) specification," ITU-T Telecommunication Standardization Sector of ITU, G.988, pp. 74 to 76, (Oct. 2010).
(Continued)

*Primary Examiner* — M. R. Sedighian
(74) *Attorney, Agent, or Firm* — Oblon, McClelland, Maier & Neustadt, L.L.P.

(57) ABSTRACT

An OLT includes an OLT control unit that generates a control signal for controlling a power saving operation of an ONU by specifying a different idle period with respect to a first power saving operation in which an optical receiver is operated while an optical transmitter of the ONU is controlled to a power saving state and a second power saving operation for controlling the optical transmitter and the optical receiver to the power saving state, and a station-side transmitter that transmits the control signal generated by the OLT control unit to the ONU. The ONU includes an ONU control unit that receives the control signal via the optical receiver to selectively perform the first power saving operation and the second power saving operation based on the idle period specified by the control signal.

29 Claims, 27 Drawing Sheets

(51) Int. Cl.
    *H04L 12/44* (2006.01)
    *H04L 12/12* (2006.01)
    *H04B 10/272* (2013.01)
(52) U.S. Cl.
    CPC ......... *H04J14/0252* (2013.01); *H04J 14/0254* (2013.01); *H04J 14/0267* (2013.01); *H04L 12/12* (2013.01); *H04L 12/44* (2013.01); *Y02B 60/32* (2013.01); *Y02B 60/34* (2013.01)

(56) References Cited

U.S. PATENT DOCUMENTS

| | | | |
|---|---|---|---|
| 2010/0111523 A1* | 5/2010 | Hirth et al. | 398/25 |
| 2012/0063770 A1 | 3/2012 | Tsuji | |
| 2012/0128357 A1 | 5/2012 | Mukai et al. | |
| 2012/0148246 A1 | 6/2012 | Mukai et al. | |
| 2012/0177361 A1 | 7/2012 | Hirano et al. | |
| 2014/0079396 A1 | 3/2014 | Hirano et al. | |

OTHER PUBLICATIONS

International Telecommunication Union, "GPON power coservation," ITU-T Telecommunication Standardization Sector of ITU, Series G, Supplement 45, Total 53 Pages, (May 2009).
International Telecommunication Union, "10-Gigabit-capable passive optical networks (XG-PON): Transmission convergence (TC) layer specification," ITU-T Telecommunication Standardization Sector of ITU, Series G, G.987.3, pp. 88 to 98, (Oct. 2010).
International Search Report Issued Feb. 21, 2012 in PCT/JP12/051825 Filed Jan. 27, 2012.
U.S. Appl. No. 13/695,554, filed Oct. 31, 2012, Nakura, et al.
U.S. Appl. No. 14/095,962, filed Dec. 3, 2013, Mukai, et al.
Extended European Search Report issued Jan. 30, 2014 in Patent Application No. 12749905.1.
Jeff Mandin, "EPON Powersaving via Sleep Mode" PMC-Sierra, IEEE Draft, 3AV_0809, vol. 802.3, XP017633965, Sep. 9, 2008, 8 Pages.
International Telecommunication Union, "White Paper: Means and impact of GPON power conservation", Telecommunication Standardization Sector, Study Group 15, TD97 (WP 1/15), (Dec. 2008), XP17444919A.
Haran, Onn, "ONU power-save annex", PMC-Sierra Inc., pp. 1-12, (Apr. 2008).
International Telecommunication Union, "Amendment 1-Specification of the ONU registration method and various clarifications", ITU-T Telecommunication Standardization Sector of ITU, Series G, G.984.3, Amendment 1, Series G: Transmission Systems and Media, Digital Systems and Networks, Digital sections and digital line system—Optical line systems for local and access networks, Gigabit-capable Passive Optical networks (G-PON): Transmission convergence layer specification, Total 16 pages, (Feb. 2009), XP17436107A.
Mangin, Christopher and Mukai, Hiroaki, "Type B Optical Link Protection", Draft Contribution to IEEE 1904.1, TF3,Total 7 pages, (Server Date Oct. 18, 2010 ), XP17737894A.
IEEE P 1904.1, "Service iteroperability in Ethernet Passive Optical Networks (SIEPON)", pp. 9-1 to 9-18,(Aug. 2010), XP17739757A.
Draft Amendment to IEEE Std. 802.3-2008, IEEE 802.3zv 10G-EPON Task Force, IEEE Draft P802.3av/D1.3, Section 93. Multipoint MAC Control, (Apr. 2008).
Office Action issued Aug. 22, 2013 is Taiwanese Patent Application No. 101105785 (with partial English translation).
Office Action issued Mar. 10, 2015 in European Patent Application No. 12 749 905.1.
European Office Action dated Oct. 22, 2015 for European Patent Application No. 12749905.1.

* cited by examiner

FIG.12

| ONU Serial No | ONU FUNCTION POWER SAVING MODE | USER ID | SERVICE ID (1) | SERVICE ID (2) | USER REQUIREMENT POWER SAVING MODE |
|---|---|---|---|---|---|
| 2566941 | Tx Sleep TRx Sleep | 100201 | BUSINESS | IPTV | Tx Sleep |
| | | | | INTERNET | |
| 9852234 | Tx Sleep | 100202 | GENERAL | SERVER | |
| 5551459 | Tx Sleep TRx Sleep | 100203 | GENERAL | IP PHONE | Tx Sleep |
| | | | | INTERNET | TRx Sleep |
| | | | | IPTV | |
| 1864257 | なし | 100204 | BUSINESS | IP PHONE | |
| | | | | INTERNET | |
| 1900014 | Tx Sleep | 100205 | GENERAL | INTERNET | |

FIG.13

| SERVICE ID (1) | PROHIBITED POWER SAVING MODE | |
|---|---|---|
| | Tx SLEEP | TRx SLEEP |
| GENERAL | | |
| BUSINESS | | DISAPPROVED |

FIG.14

| SERVICE ID(2) | PROHIBITED POWER SAVING MODE ||
|---|---|---|
| | Tx SLEEP | TRx SLEEP |
| INTERNET | | |
| IPTV | | |
| IP PHONE | | DISAPPROVED |
| SERVER | DISAPPROVED | DISAPPROVED |

FIG.15

| SERVICE ID(2) | SLEEP PERIOD [ms] ||||||
|---|---|---|---|---|---|---|
| | DEFAULT VALUE || ACQUIRED SLEEP PERIOD || Sleep time ||
| | Tx SLEEP | TRx SLEEP | Tx SLEEP | TRx SLEEP | Tx SLEEP | TRx SLEEP |
| INTERNET | T1 | T2 | x | - | x | T2 |
| IPTV | T1 | T2 | - | y | T1 | y |
| IP PHONE | T1 | T2 | z | z | z | z |
| SERVER | 0 | 0 | 0 | 0 | 0 | 0 |

FIG.16

| SERVICE ID(2) | MAXIMUM SLEEP PERIOD [ms] ||
|---|---|---|
| | Tx SLEEP | TRx SLEEP |
| INTERNET | 1000 | 500 |
| IPTV | 200 | 100 |
| IP PHONE | 400 | 200 |
| SERVER | 0 | 0 |

COMMUNICATION SYSTEM, STATION-SIDE COMMUNICATION DEVICE, USER-SIDE COMMUNICATION DEVICE, COMMUNICATION METHOD, AND CONTROL DEVICE

FIELD

The present invention relates to a communication system in which a plurality of terminals are connected by a common line, and a communication method, and relates to, for example, a PON (Passive Optical Network) system constituted by an OLT (Optical Line Terminal: station-side communication device) and a plurality of ONUs (Optical Network Unit: user-side communication device).

BACKGROUND

In a PON system, communication is performed while achieving synchronization between the OLT and the ONU so that pieces of uplink data transmitted from the ONUs do not collide with each other. The OLT plans to grant a transmission permission to each ONU so that the pieces of uplink data do not collide with each other. At this time, the OLT considers delay due to a distance between respective ONUs. Therefore, the OLT performs measurement of a roundtrip time between respective ONUs and keep-alive communication. However, there are fluctuations in a transmission line such as jitter and wander in transfer by an optical fiber, and thus measurement needs to be performed cyclically.

Meanwhile, data communication is not performed constantly. For example, data communication is not performed at all during the night. However, measurement of the roundtrip time and transmission and reception of a keep-alive signal are performed cyclically regardless of the presence of data communication. It is a waste of power to maintain the ONU in a transmissible state at all times for measurement of the roundtrip time, even if data communication is not performed. Accordingly, a technique for causing the ONU to shift to a power saving state intermittently by requesting a shift to the power saving state from the ONU has been studied.

Furthermore, conventionally, there is a PON system in which an OLT generates a power-supply control signal of an ONU that does not require communication to control a power supply of a transmission circuit and a reception circuit of the ONU (Patent Literature 1). In this PON system, because the OLT remotely controls on/off of the power supply of the ONU, power consumption of the entire system can be reduced.

CITATION LIST

Patent Literature

Patent Literature 1: Japanese Patent Application Laid-open No. H7-154369

SUMMARY

Technical Problem

In the PON system described in Patent Literature 1, there is no description of a power saving period of an ONU. However, a communication service provided to a terminal device such as the ONU has various requirements. For example, if a power saving period is provided, a period during which a terminal device cannot respond becomes long, thereby increasing a delay time. If a priority is given to low latency, a transmitter-receiver cannot be halted, and thus power consumption cannot be reduced.

Solution to Problem

There is provided a communication system comprising a station-side communication device (hereinafter, OLT) and a user-side communication device (hereinafter, ONU), in which the ONU communicates with the OLT via a user-side transmitter and a user-side receiver connected to a communication line, wherein the OLT includes an OLT control unit that generates a control signal for controlling a power saving operation of the ONU by specifying a different idle period with respect to a first power saving operation in which an optical receiver is operated while an optical transmitter of the ONU is controlled to a power saving state and a second power saving operation in which the user-side transmitter and the user-side receiver are controlled to a power saving state, and a station-side transmitter that transmits the control signal generated by the OLT control unit to the ONU, and the ONU includes an ONU control unit that receives the control signal via the user-side receiver to selectively perform the first power saving operation and the second power saving operation based on the idle period specified by the control signal.

There is provided a station-side communication device connected to a user-side communication device via a communication line, the station-side communication device comprising: a control unit that generates a control signal for controlling an operation of the user-side communication device in a power saving mode in which a transmitter or a receiver of the user-side communication device is intermittently halted, so that the user-side communication device can change over a plurality of idle periods with respect to the power saving mode; and a transmitter that transmits the control signal generated by the control unit to the user-side communication device.

There is provided a user-side communication device that communicates with a station-side communication device based on a control signal transmitted from the station-side communication device, the user-side communication device comprising: a receiver that receives a control signal related to a power saving operation from the station-side communication device, and can shift to a power saving state where power consumption is reduced by halting a part or all of a receiving function; a transmitter that transmits a transmission signal to the station-side communication device and can shift to a power saving state where power consumption is reduced by halting a part or all of a transmitting function; and a control unit that selects a power saving period to be used from a plurality of power saving periods based on the control signal received by the receiver, and controls the receiver or the transmitter to the power saving state based on the selected power saving period.

There is provided a communication method used in a communication system including a station-side communication device (hereinafter, OLT) and a user-side communication device (hereinafter, ONU), in which the OLT controls a first power saving operation of the ONU and a second power saving operation different from the first power saving operation, the communication method comprising: a step at which the OLT transmits a first power saving period related to the first power saving operation of the ONU and a second power saving period related to the second power saving operation to the ONU; a step at which the ONU receives the control signal transmitted from the OLT; a step at which the ONU determines whether to perform a power saving operation; and a step at which the ONU performs the first power saving operation in the first power saving period, and the second power saving operation in the second power saving period, depending on the determination result.

There is provided a control device of a station-side communication device connected to a user-side communication device (hereinafter, ONU) including a receiver that can shift to a power saving state where power consumption is reduced by halting a part or all of a receiving function, and a transmitter that can shift to a power saving state where power consumption is reduced by halting a part or all of a transmitting function, via a line to control an operation of the ONU, wherein the control device generates a control signal for controlling the operation of the ONU in a power saving mode in which the transmitter or the receiver of the ONU is intermittently halted, so that the ONU can change over a plurality of idle periods with respect to the power saving mode.

There is provided a control device provided in a user-side communication device including a receiver that receives a control signal related to a power saving operation from a station-side communication device and can shift to a power saving state where power consumption is reduced by halting a part or all of a receiving function, and a transmitter that transmits a transmission signal to the station-side communication device and can shift to a power saving state where power consumption is reduced by halting a part or all of a transmitting function, wherein the control device selects a power saving period to be used from a plurality of power saving periods based on the control signal received by the receiver, and controls the receiver or the transmitter to the power saving state based on the selected power saving period.

Advantageous Effects of Invention

The communication system, the station-side communication device, the user-side communication device, the communication method, and the control device according to the present invention can suppress power consumption by setting a plurality of power saving periods.

BRIEF DESCRIPTION OF DRAWINGS

FIG. 12 is a table representing data of ONUs and services in the second embodiment of the present invention.

FIG. 13 is a table representing data of services and a prohibited power saving mode in the second embodiment of the present invention.

FIG. 14 is a table representing data of services and a prohibited power saving mode in the second embodiment of the present invention.

FIG. 15 is a table representing data of services and a sleep period in the second embodiment of the present invention.

FIG. 16 is a table representing data of services and a maximum sleep period in the second embodiment of the present invention.

DESCRIPTION OF EMBODIMENTS

First Embodiment

Hardware Configuration

Figure 1:
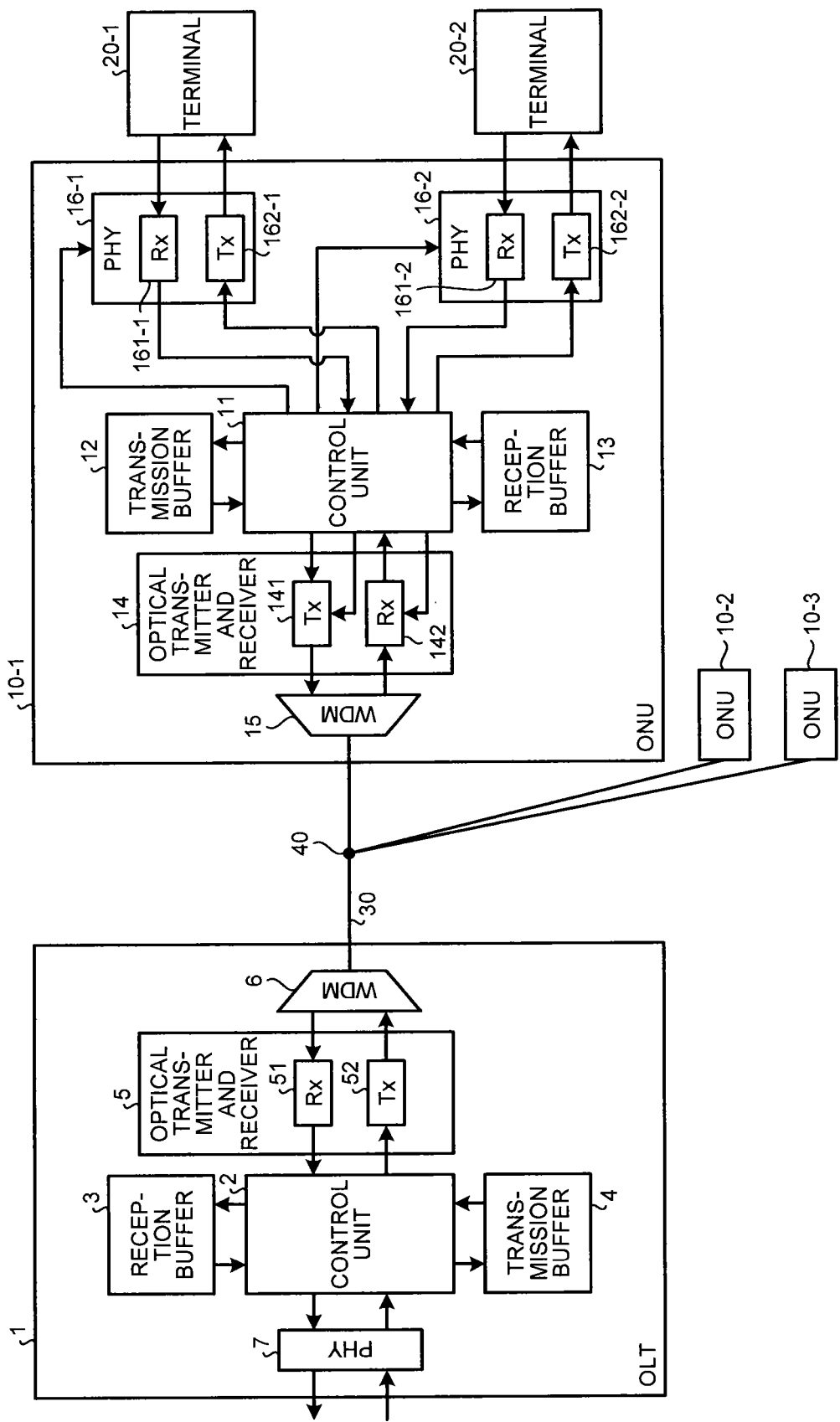
FIG. 1 is a configuration example of a communication system according to an embodiment of the present invention.

FIG. 1 illustrates a configuration example of a PON system according to a first embodiment of the present invention. As shown in FIG. 1, the PON system according to the present embodiment includes an OLT 1 (a master station) and ONUs 10-1 to 10-3 (slave stations). The OLT 1 and the ONUs 10-1 to 10-3 are connected to each other by an optical fiber 30 via a splitter 40. The splitter 40 branches the optical fiber 30, which is a trunk line connected to the OLT 1, into the number of ONUs 10-1 to 10-3. The ONU 10-1 is connected to terminals 20-1 and 20-2. While an example of including three ONUs is described here, the number of ONUs is not limited thereto and can be any number. When the ONU 10 is generally shown, the ONU is described as ONUi (i=1, 2, ..., N. N is an integer equal to or larger than 1).

The OLT 1 includes a control unit 2 (OLT control unit) that performs processes on the OLT side based on a PON protocol, a reception buffer 3 for storing uplink data received from the ONUs 10-1 to 10-3, a transmission buffer 4 for storing downlink data to be transmitted to the ONUs 10-1 to 10-3, an optical transmitter and receiver 5 that transmits and receives an optical signal, a WDM (Wavelength Division Multiplexing) coupler (WDM) 6 that wavelength-multiplexes uplink data and downlink data by using different wavelengths, and a physical-layer processing unit (PHY) 7 that realizes a physical interface function of an NNI (Network Node Interface) with a network (not shown). The optical transmitter and receiver 5 includes an optical receiver (Rx: receiver) 51 that performs a reception process of an optical signal transmitted from the ONUs 10-1 to 10-3 and that converts the optical signal into uplink data, and an optical transmitter (Tx: transmitter) 52 that performs a transmission process of downlink data to be transmitted to the ONUs 10-1 to 10-3 and that converts the downlink data into an optical signal.

The PON protocol is a control protocol used in a MAC (Media Access Control) layer or the like, which is a sublayer of a layer two, and is, for example, a MPCP (Multi-point Control Protocol) or an OAM (Operation Administration and Maintenance) specified by the IEEE.

The ONU 10-1 includes a control unit 11 (ONU control unit) that performs processes on the ONU side based on the PON protocol, a transmission buffer (an uplink buffer) 12 for storing transmission data (uplink data) to the OLT 1, a reception buffer (a downlink buffer) 13 for storing received data (downlink data) from the OLT 1, an optical transmitter and receiver 14, a WDM 15 that wavelength-multiplexes optical signals in the uplink data and downlink data by using different wavelengths, and physical-layer processing units (PHYs) 16-1 and 16-2 that respectively realize a physical interface function of an UNI (User Network Interface) between the terminals 20-1 and 20-2.

The optical transmitter and receiver 14 of the ONU 10-1 includes an optical transmitter (Tx: transmitter) 141 that performs a transmission process of uplink data to be transmitted to the OLT 1 and that converts the uplink data to an optical signal, and an optical receiver (Rx: receiver) 142 that performs a reception process of the optical signal transmitted from the OLT 1 and that converts the optical signal into downlink data. The control unit 11 is connected to the optical transmitter and receiver 14 via a signal line for power saving control for controlling at least one or both of the optical transmitter 141 and the optical receiver 142 to an on state/off state. The PHY 16-1 includes a reception unit (Rx: receiver) 161-1 that performs a reception process of data transmitted from the terminal 20-1 and a transmission unit (Tx: transmitter) 162-1 that performs a transmission process of data to be transmitted to the terminal 20-1. The PHY 16-2 similarly includes a reception unit (Rx: receiver) 161-2 that performs the reception process, and a transmission unit (Tx: transmitter) 162-2 that performs the transmission process.

In the communication system according to the present embodiment, (1) an ONU 10 that can control only the optical transmitter 141 to a power saving state, (2) an ONU 10 that can control the optical transmitter 141 and the optical receiver 142 to the power saving state, and (3) an ONU 10 that cannot support the control to any power saving state are present together. These ONUs 10 can be classified into four types, that is, an ONU that supports any one of the two power saving modes, an ONU that supports both modes, and an ONU that does not support any mode.

[1] Tx sleep mode (Tx only Sleep mode or Doze mode): a receiving function [Rx] is in an on state at all times and only a transmitting function (Tx) cyclically repeats on and off.

[2] TRx sleep mode (TRx Sleep mode or Cyclic sleep mode): the transmitting function [Tx] and the receiving function [Rx] cyclically repeat on and off.

It is assumed here that two terminals are connected to the ONU 10-1. However, the number of terminals is not limited thereto, and can be any number, and includes physical-layer processing units (PHYs) corresponding to the number of terminals. While a configuration example of the ONU 10-1 is shown in FIG. 1 as a representative example, and the ONUs 10-2 and 10-3 have the same configuration as that of the ONU 10-1.

The control unit 2 of the OLT 1 allocates a band to each of the ONUs 10-1 to 10-3 so that a transmission time period of uplink data does not overlap on each other and notifies each of the ONUs 10-1 to 10-3 of the allocated band as a transmission permission, thereby preventing collision of pieces of uplink data transmitted from the ONUs 10-1 to 10-3, as in the conventional PON system. While any method can be applied to the band allocation, for example, a method described in the following literature can be used. "Dynamic Bandwidth Allocation Algorithm for Multimedia Services over Ethernet® PONs", by Su-il Choi and Jae-doo Huh, ETRI Journal, Volume 24, Number 6, December 2002, p. 465 to p. 466.

Overall Operation of Communication System

An overall operation of the OLT 1 and the ONUs 10-1 and 10-3 according to the present embodiment is explained. The control unit 2 stores downlink data (downlink communication data) received from the network via the PHY 7 in the transmission buffer 4. At the time of transmitting data from the OLT 1, the control unit 2 reads the downlink data stored in the transmission buffer 4 and outputs the downlink data to the optical transmitter and receiver 5. The Tx 52 in the optical transmitter and receiver 5 outputs the transmitted data to the WDM 6 as an optical signal. The WDM 6 performs wavelength-multiplexing with respect to the optical signal output from the optical transmitter and receiver 5, and outputs the wavelength-multiplexed optical signal to the ONUs 10-1 and 10-3 via the optical fiber 30 as a downlink signal. The control unit 2 generates a control message informing an allocation result of a transmission band as a transmission permission, a control message inquiring link maintenance, and the like, outputs these control messages to the optical transmitter and receiver 5, and transmits the control messages to the ONUs 10-1 and 10-3 in similar manner to that in the downlink data. In the PON system in FIG. 1, because wavelength-multiplexing is performed, assuming that the uplink signal and the downlink signal are optical signals having different wavelengths, the WDMs 6 and 15 are used. However, when communication is performed by using a single wavelength, the control unit 2 also allocates uplink and downlink transmission bands instead of using the WDMs 6 and 15.

A signal which is provided by converting uplink data and an uplink control message into an optical signal are collectively referred to as "uplink signal", and a signal which is provided by converting downlink data and a downlink control message into an optical signal are collectively referred to as "downlink signal".

In the ONUs 10-1 and 10-3, when a downlink signal is received from the OLT 1, the WDM 15 separates the downlink signal from an uplink signal and outputs the downlink signal to the optical transmitter and receiver 14, and the Rx 142 in the optical transmitter and receiver 14 converts the downlink signal into downlink data or a control message of an electric signal and outputs the electric signal to the control unit 11. The control unit 11 stores the downlink data output from the Rx 142 in the optical transmitter and receiver 14 in the reception buffer 13, and acquires information related to a transmission permission and an inquiry about link maintenance from the control message. The control unit 11 performs a transmission process described later based on the acquired pieces of information.

The control unit 11 also reads the downlink data stored in the reception buffer 13 and outputs the downlink data to both or one of the PHYs 16-1 and 16-2 according to the address of data. The PHYs 16-1 and 16-2 having received the downlink data perform a predetermined process with respect to the downlink data and transmit the data to the terminals 20-1 and 20-2 connected to the own device.

Meanwhile, when uplink data is to be transmitted from the ONUs 10-1 and 10-3, the control unit 11 stores the uplink data acquired from the terminals 20-1 and 20-2 via the PHYs 16-1 and 16-2 in the transmission buffer 12. The control unit 11 then reads the uplink data stored in the transmission buffer 12 and outputs the data to the optical transmitter and receiver 14 based on a band allocation result provided as the transmission permission from the OLT 1. The control unit 11 generates a control message related to the link maintenance or the like, and outputs the control message to the optical transmitter and receiver 14 based on the transmission band provided from the OLT 1. The Tx 141 in the optical transmitter and receiver 14 converts the uplink data into an optical signal (an uplink signal), and transmits the optical signal to the OLT 1 via the WDM 15 and the optical fiber 30.

The OLT 1 converts the optical signal received from the ONUs 10-1 and 10-3 via the optical fiber 30 and the WDM 6 into uplink data and a control message by the Rx 51 in the optical transmitter and receiver 5. The control unit 2 stores the converted uplink data in the reception buffer 3, performs an operation based on the control message, and generates a response to the control message, and discards the control message. Upon reception of the uplink data, the control unit 2 reads the uplink data stored once in the reception buffer 3, and outputs the uplink data to the network via the PHY 7.

Power Saving Operation of PON System

Figure 2:
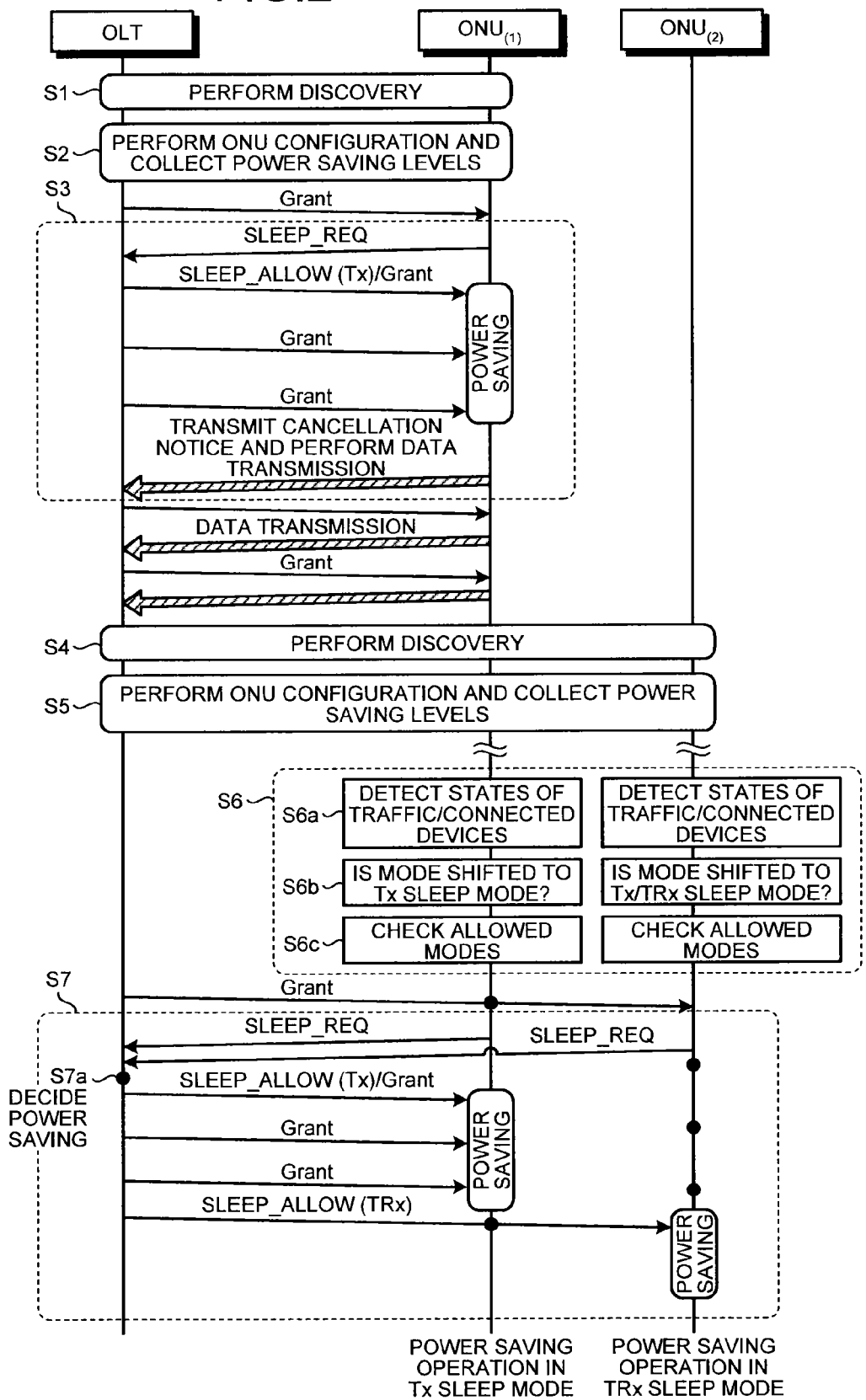
FIG. 2 is a sequence diagram depicting a communication method according to a first embodiment of the present invention.
Figure 4:
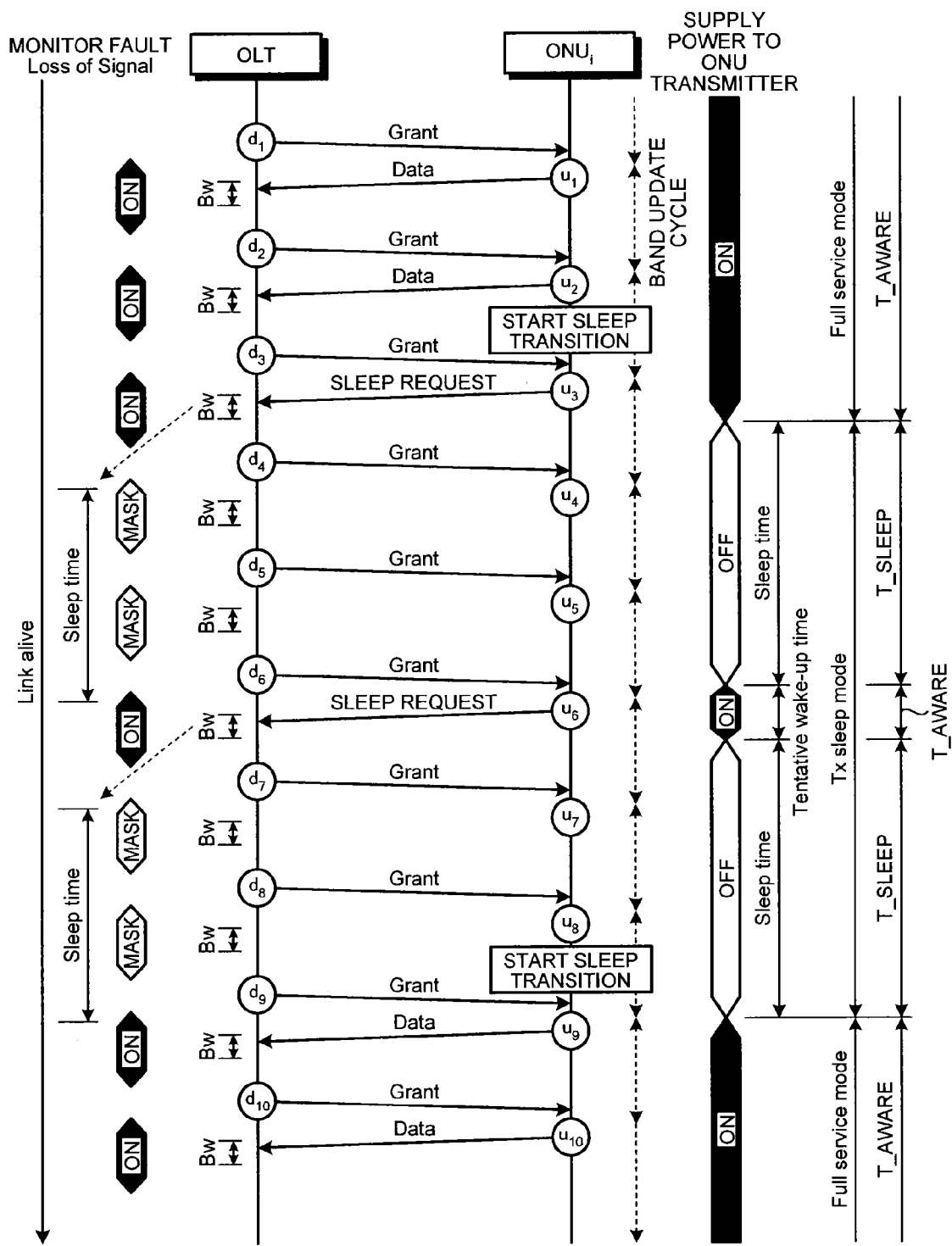
FIG. 4 is a sequence diagram depicting the communication method according to the first embodiment of the present invention in a power saving mode.

A power saving operation of the PON system is explained as an example of a power saving operation of the communication system with reference to FIG. 2 or FIG. 4. In the communication system shown in FIG. 2, an ONU (1) having the power saving function of the Tx sleep mode (corresponding to the power saving mode) and an ONU (2) having the power saving function of both the 'Tx sleep mode'/'TRx sleep mode' are connected to one OLT 1. FIG. 2 depicts a control sequence in which the OLT 1 operates the ONU 10 in the power saving state, matched with the capability of the ONU 10 (the power saving function).

At Step S1, the OLT 1 performs a discovery process for finding an active ONU 10. The OLT 1 broadcasts a discovery control message as a downlink signal, and each ONU 10 having received the control message returns unique identification information such as a serial number of the ONU or the like. Because all the ONUs 10 in a communicable state generate a control message and return the control message to the OLT 1 having transmitted the discovery control message, the OLT 1 can detect an active ONU 10 by receiving a response control message. In a state at Step S1, the ONU (2) is turned off, and does not return a response message.

The OLT 1 exchanges various parameters related to the capability of the ONU 10 and a communication condition with the ONU 10 detected at Step S1, thereby setting a communication condition with each other (Step S2).

When a configuration at Step S2 is complete, the OLT 1 shifts to a normal communication state. The OLT 1 allocates a band for uplink communication to each ONU 10, and transmits the allocated band to each ONU 10 as transmission permission information (Grant or Gate). The OLT 1 can store the Grant in a frame together with other pieces of downlink data and transmit the frame to the ONU 10, or can transmit the Grant individually. The frame can be rephrased as "packet".

When there is uplink transmission data in the transmission buffer 12, the ONU 10 having received the Grant starts data transmission in a full service mode (both the Tx and the Rx are in the on state). However, a case where there is no transmission data and the ONU 10 shifts to the power saving mode (Step S3) is explained below.

When shifting to the power saving mode, the ONU 10 transmits a request signal requesting a transition permission to the power saving mode to the OLT 1. The OLT 1 determines whether to allow transition to the power saving mode based on, for example, various pieces of information of the ONU 10 acquired at Step S2 and an uplink and downlink communication status with the ONU 10, and transmits a permission signal (or a non-permission signal) to the ONU 10. Upon reception of the permission signal, the ONU 10 turns off the optical transmitter 141 (or the optical transmitter 141 and the optical receiver 142) for a predetermined period based on the permission signal, thereby reducing power consumed by the optical transmitter and receiver 14.

The OLT 1 can allow the ONU 10 to shift to a power saving mode different from the power saving mode requested by the ONU 10, according to the configuration result.

At Step S3, the OLT 1 also allocates a band to the ONU 10 in the Tx sleep mode in which the optical transmitter 141 is turned off, to transmit the Grant to the ONU 10. When uplink data desired to be transmitted is generated, the ONU 10 having received the Grant generates a control message requesting cancellation of the Tx sleep mode and turns on the optical transmitter 141, thereby transmitting data to the OLT 1 by using the allocated band. Alternatively, the ONU 10 generates a control message requesting cancellation of the Tx sleep mode, and transmits the control message to the OLT 1 by using the band allocated by the Grant.

The ONU 10 monitors generation of uplink data equal to or larger than a predetermined threshold and communication start of the terminal (a connected device) that requests a large band and decides cancellation of the power saving mode based on a monitoring result. The ONU 10 having determined cancellation of the power saving mode transmits a cancellation message SLEEP_ACK (wake up) and data to the OLT 1 by using the received Grant, thereby enabling to notify the OLT 1 of a cancellation decision of the power saving mode. The OLT 1 having received the cancellation message and data from the ONU 10 determines that the ONU 10 ends the power saving mode and shifts to the full service mode (both the Tx and the Rx are in the on state), and allocates the Grant in the normal communication state.

When the OLT 1 does not receive the cancellation message SLEEP_ACK (wake up) but receives a new band allocation request for uplink data from the ONU 10, the OLT 1 can determine that cancellation of the power saving mode of the ONU 10 has been decided.

Control when the ONU (2) that can support both the TX sleep mode and the TRx sleep mode is started up is explained next. When the ONU (2) is found by the discovery (Step S4) cyclically performed by the OLT 1, the configuration is performed between the OLT 1 and the ONU (2) (Step S5).

Because the OLT 1 has acquired various parameters of the ONU (1) at Step S2, the configuration between the OLT 1 and the ONU (1) at Step S5 can be skipped unless information of the acquired various parameters is reset. When the configuration is performed at Step S5 and the result thereof is different from the result at Step S2, a priority is given to the result of the configuration performed last (in this case, the result at Step S5).

When the configuration is complete, the ONU (2) starts communication. When there is no uplink data, the ONU (2) having received the Grant from the OLT 1 transmits a request (SLEEP_REQ) requesting a transition permission to a power saving mode similar to that at Step S3 (Step S7).

In an example shown in FIG. 2, at Step S7, the ONUS (1) and (2) transmit a request (SLEEP_REQ) requesting a transition permission to the power saving mode to the OLT 1. The OLT 1 starts communication with the ONU (1) by a power saving protocol of the Tx sleep mode based on the result of the configuration. Meanwhile, because the ONU (2) supports both the Tx sleep mode and the TRx sleep mode, the OLT 1 confirms the state of a downlink buffer (the transmission buffer 4) to decide a power saving mode to be allowed, and starts communication with the ONU (2) by using the power saving protocol corresponding to the decided power saving mode.

Step S7 is explained in detail with reference to FIG. 3.

If the power saving mode is not specified by the ONU 10, the OLT 1 having received the request (SLEEP_REQ) detects a state of traffic (presence and amount) of uplink or downlink communication, the type of link, and a connected device (type, on/off, and the like) on a side of the ONU 10, and selects a power saving mode based on a detection result and the information of the power saving mode allowed by the configuration (Step S7*a*).

On the other hand, if the power saving mode is specified by the ONU 10, the OLT 1 selects a power saving mode based on the requested power saving mode, a detection result of the communication status and the like, and the information of the power saving mode allowed by the configuration (Step S7*a*). The OLT 1 returns the selected result to the ONU 10 as a permission notice (or a non-permission notice).

Details of selection of the power saving mode and transition to the power saving mode are explained later.

Explanations are continued while referring back to FIG. 2. The ONU 10 can also specify the desired power saving mode, together with the request (SLEEP_REQ) at Step S6. In this case, the OLT 1 starts communication with the ONU (2) by using the power saving protocol corresponding to the specified information. As a state where the ONU 10 specifies the desired power saving mode, for example, there can be considered a case where the ONU 10 can shift to the power saving mode after communication has started. Such a state occurs when a small amount of intermittent data communication by web browsing or only speech communication with a small band occurs, or when only an IP phone is turned on and is in a standby state.

The ONU 10 detects these states by monitoring the transmission buffer 12 and the state of the connected device, decides a shift to the power saving mode when a predetermined condition is achieved, and notifies the OLT 1 of the desired power saving mode. For example, a shift determination of the ONU 10 is performed when a total amount or a mean value of uplink traffic and downlink traffic becomes equal to or lower than a threshold for a predetermined period, or when a predetermined condition matches with the state of the connected device by using a correlation table of power saving modes to which the ONU 10 can shift (Steps S6*a* and S6*b*).

The ONU 10 accesses a storage device (not shown) to check whether the power saving mode decided based on the state of traffic and the like corresponds to the power saving mode allowed by the OLT 1 (Step S6*c*), and if the power saving mode is the allowed mode, transmits a request (SLEEP_REQ) to the OLT 1. At this time, when the decided mode does not correspond to the allowed mode, the ONU 10 changes the mode to a mode corresponding to the allowed mode to transmit a request or suppress transmission of the request. As described above, by suppressing the request which does not correspond to the allowed mode, unnecessary consumption of the band and power associated with the process can be saved. Step S6 is not essential in this case.

(Link Management and Band Allocation Notification)

Link management between the OLT 1 and the ONU 10 is explained below. The OLT 1 cyclically transmits a control message for an inquiry about link maintenance to the ONU 10 found at Step S1. The ONU 10 having received the inquiry message returns a response message, maintains a link state when the OLT 1 receives the response message, and disconnects the link when the response is not received by the OLT 1 continuously for a predetermined number of times. The ONU 10 in the power saving mode cyclically turns on the optical transmitter 141 (or the optical transmitter 141 and the optical receiver 142) in order to respond to the inquiry about the link maintenance. The ONU 10 can transmit other pieces of control information and data of a small capacity stored in the transmission buffer 12 by using the band allocated for a response of the link maintenance.

A dedicated control message can be also used for the inquiry about the link maintenance. However, the PON system uses the Grant that notifies band allocation as the control message for an inquiry about the link maintenance.

For example, in FIG. 4, the OLT 1 transmits the Grant for each band update cycle, regardless of an operating mode. The ONU 10 returns data each time in the full service mode (timings u1 and u2). After having transmitted a sleep request in the Tx sleep mode (a timing u3), the ONU 10 does not respond when the optical transmitter 141 is turned off (timings u4 and u5), and responds when the optical transmitter 141 is transiently turned on (a timing u6). That is, the Grant received by the ONU 10 at the timings u4 and u5 is simply a band allocation notice for transmission of uplink data by the ONU 10, and an inquiry about the link maintenance is not performed. The Grant received at the timing u6 indicates that an inquiry about the link maintenance is also made in addition to the band allocation notice for transmission of uplink data.

Whether or not an inquiry cycle for the link maintenance is set for the same length of time as a transmission cycle of the Grant is determined between the OLT 1 and the ONU 10 based on the power saving protocol or the like. When the ONU 10 wants to transmit uplink data in a period during which the optical transmitter 141 is turned off, if a band is allocated, the ONU 10 can turn on the optical transmitter 141 to transmit the data to the OLT 1. Alternatively, the ONU 10 can generate a control message requesting cancellation of the Tx sleep mode and transmit the control message to the OLT 1 by using the allocated band. With this power saving protocol of the Tx sleep mode, the ONU 10 can transmit data in a short delay time, even if uplink data is generated.

The OLT 1 can allocate a band to the ONU 10 whose optical transmitter 141 is turned off each time for each band update cycle in the full service mode, or can allocate a band once in several times in the full service mode, taking it into consideration that there is not so much uplink communication.

Meanwhile, the ONU 10 in the Tx sleep mode needs to turn on the optical transmitter 141 in order to respond to the inquiry about the link maintenance from the OLT 1, and power consumption is wasted if a response is made to each Grant. Therefore, in the power saving protocol of the Tx sleep mode, an inquiry about the link maintenance from the OLT 1 is made once in several times of band allocation notices, to reduce the number of responses to the Grant by the ONU 10, thereby extending a power-off period of the optical transmitter 141. In this manner, the link state can be maintained, while reducing power consumption.

The power saving protocol of the TRx sleep mode is set such that the inquiry cycle for link maintenance is the same as the band allocation cycle, and a period during which the optical transmitter 141 and the optical receiver 142 are turned off is longer than the transmission cycle of the Grant in the full service mode and is shorter than a period during which the optical transmitter 141 is turned off in the Tx sleep mode. It is because in the TRx sleep mode, the optical transmitter 141 and the optical receiver 142 are on/off controlled together, and thus the cycle does not need to be changed for an inquiry about the link maintenance and for band allocation, and uplink communication is less than that in the full service mode, thereby enabling to increase a transmission interval of the Grant. Because the ONU 10 in the TRx sleep mode also turns off the optical receiver 142 in addition to the optical transmitter 141, power consumption can be reduced, and data can be transmitted in a short delay time when uplink data is generated in the ONU 10, while maintaining the link state in the power saving mode, by setting the transmission interval of the Grant as described above.

(Details of Configuration)

The configuration performed at Steps S2 and S5 is explained next in detail with reference to FIG. 3. At Step S5, the configuration is performed between both the ONUs (1) and (2) and the OLT 1. In FIG. 3, steps denoted by like reference signs in FIG. 2 represent like or corresponding processes. The protocol described below is an example and the present invention is not limited to various transmission frames, names thereof, and procedures shown in FIG. 3 and, for example, an extended OAM (eOAM) or an OMCI (an ONU management and control interface or an ONT management and control interface) can be also used.

Figure 3:
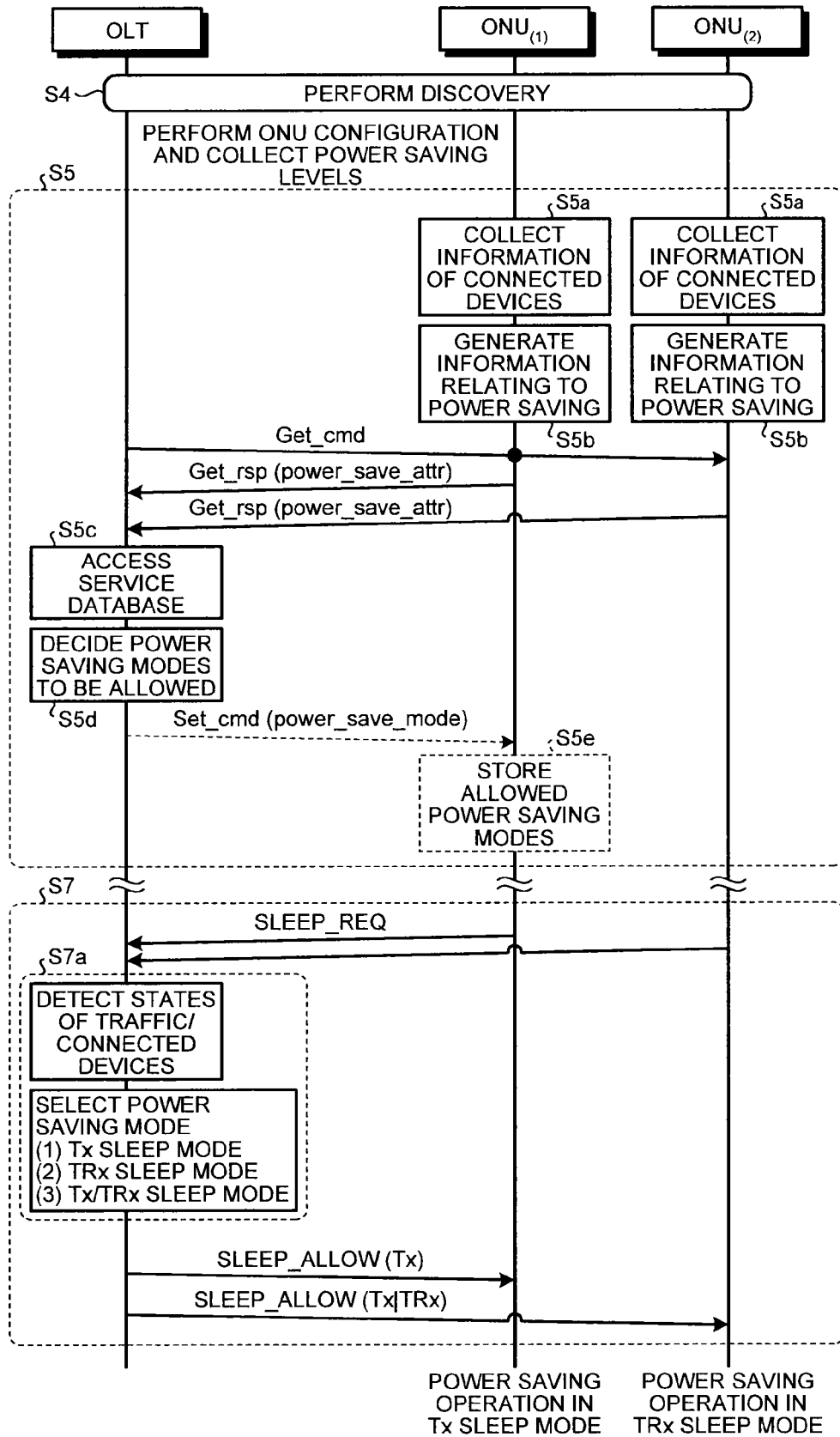
FIG. 3 is a sequence diagram depicting configuration control and sleep control according to the first embodiment of the present invention.

In FIG. 3, when a discovery at Step S4 is complete, the ONU 10 collects pieces of attribute information such as the type, on/off, type of line, speed, idle period during which the power saving operation is performed (a time associated with a period of T_SLEEP in FIG. 4), and a transient operating time at which the optical transmitter 141 is intermittently turned on to operate in the power saving mode (a time associated with a period of T_AWARE) in FIG. 4) of the connected device such as the terminal 20-1 (Step S5$a$), and generates attribute information together with information related to the function and performance of the own device recorded in a storage device (not shown) of the own device (Step S5$b$). The ONU 10 records associated information of the power saving function (power_save_attr) as the attribute information.

When the discovery is complete, the OLT 1 transmits a request command (Get_cmd) of the attribute information of the ONU 10. Each ONU 10 returns the attribute information in a response frame (Get_rsp) with respect to the request command. There can be case where the ONU 10 that does not support the power saving function does not transmit associated information of the power saving function (power_save_attr).

Upon reception of the response frame (Get_rsp), the OLT 1 records the acquired attribute information of the ONU 10 in the own storage device (a database) in a format shown in FIG. 12 described later.

In the storage device of the OLT 1, an idle period T1 for the Tx sleep mode (a power saving period during which the ONU 10 in the Tx sleep mode turns off the optical transmitter 141) and an idle period T2 for the TRx sleep mode (a power saving period during which the ONU 10 in the TRx sleep mode turns off the optical transmitter 141 and the optical receiver 142) are recorded beforehand. Contract information of each user is also recorded therein.

The OLT 1 checks restrictions of the power saving mode for each user and each service to be offered based on the contract of each user prerecorded in the storage device (Step S5$c$), and determines the power saving mode and a condition allowed to each ONU 10 (Step S5$d$). Examples of the restrictions are shown in FIGS. 12 to 16. For example, when a user uses a communication line in a server application that requires a rapid response, it is not desired that the ONU 10 shifts to the power saving mode and delay is generated. The OLT 1 and the ONU 10 confirm the power saving mode to be allowed before starting communication, thereby enabling to suppress such undesired delay.

Figure 5:
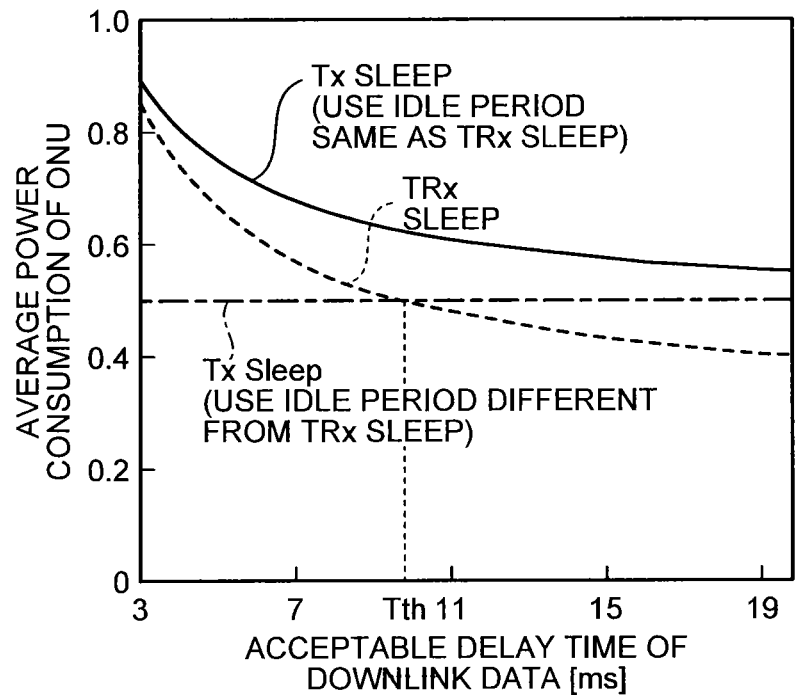
FIG. 5 depicts a relation between an acceptable delay time of downlink data and an average power consumption of an ONU in the first embodiment of the present invention.
Figure 6:
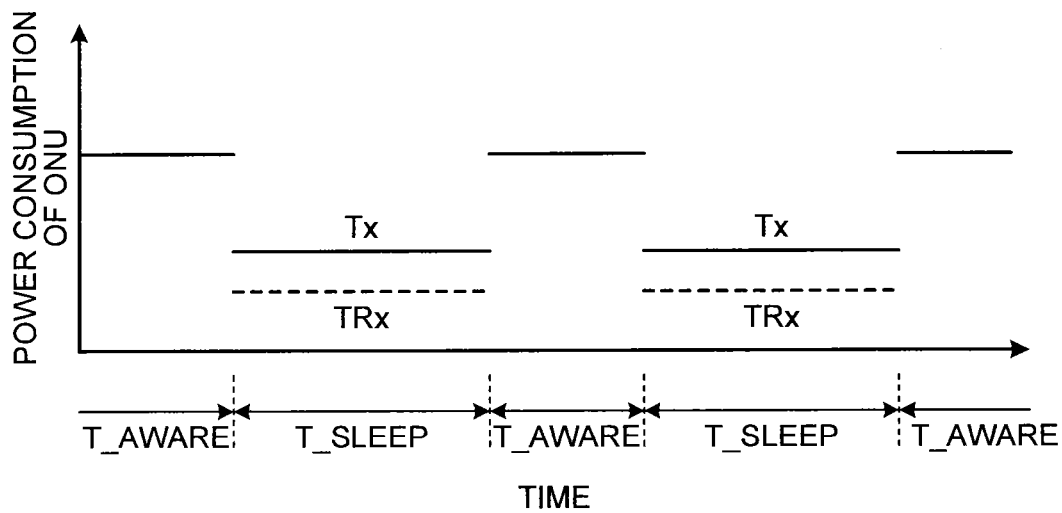
FIG. 6 depicts a relation between an intermittent operation in a power saving mode and an average power consumption of an ONU in the first embodiment of the present invention.

A relation between an acceptable delay time of downlink data and an average power consumption of the ONU 10 is shown in FIG. 5. A solid line denotes a Tx sleep mode in which an idle period is similar to that in the TRx sleep mode, a one-dot chain line denotes a Tx sleep mode of the present embodiment (an idle period thereof is different from the TRx sleep mode), and a broken line denotes the TRx sleep mode. The average power consumption of the ONU 10 is normalized based on the power consumption in the full service mode. A relative relation of the power consumption between a period during which the power supply is intermittently turned on in the Tx sleep mode and the TRx sleep mode (T_AWARE) and a period during which the power supply is turned off (T_SLEEP) is shown in FIG. 6.

As can be understood from the states of the TRx sleep mode and the conventional Tx sleep mode in FIG. 5, power consumption decreases as the acceptable delay time of downlink data becomes long. That is, if the idle period of the power saving mode is set long, power consumption of the ONU 10 can be reduced. However, when the idle period is set long in the TRx sleep mode, a delay time when uplink data is generated in the ONU 10 becomes also long by the extended idle period. On the other hand, in the Tx sleep mode, even if the idle period is set long, the ONU 10 can cancel the power saving mode, and thus can transmit data in a short delay time.

In the Tx sleep mode of the present embodiment, the idle period in the Tx sleep mode and the idle period in the TRx sleep mode are individually set, and the idle period of the Tx sleep mode is set to be equal to or longer than that in the TRx sleep mode. Because the ONU 10 in the Tx sleep mode can receive downlink data even in the idle period, the power saving state (the state where the optical transmitter 142 is turned off) can be maintained even when the acceptable delay time of downlink data is as short as a few milliseconds.

Accordingly, power consumption can be reduced than in the conventional Tx sleep mode using the same idle period as the TRx sleep mode.

As a value of the idle period, for example, it can be considered to set the Tx sleep mode to 500 milliseconds at which a reduction effect of power consumption is acquired, and set the TRx sleep mode to 50 milliseconds based on a call-reply request time of telephone (a representative service requiring low delay). The set value is not limited thereto.

The OLT 1 generates a command frame (Set_cmd) including the decided allowed power saving mode and information of the corresponding idle period, and transmits the command frame to the ONU 10. Upon reception of the command frame (Set_cmd), the ONU 10 records the allowed power saving mode and the idle period in the storage device of the own device (Step S5*e*). When there are two allowed power saving modes, the OLT 1 can insert the two allowed power saving modes and information of the idle periods T1 and T2 into the command frame (Set_cmd) to be transmitted to the ONU 10. Even when there are three power saving modes, the command frame can include respective pieces of information.

In this manner, because the OLT 1 notifies the ONU 10 of different idle periods T1 and T2 corresponding to the power saving mode of the ONU 10, the ONU 10 in the Tx sleep mode can reduce power consumption, and the ONU 10 in the TRx sleep mode can transmit uplink data in a short delay time.

(Selection of Power Saving Mode and Transition to Power Saving Mode)

When there are a plurality of power saving modes allowed at Steps S5*d* and S5*e*, before the ONU 10 shifts to the power saving mode, the OLT 1 or the ONU 10 needs to decide which power saving mode is to be selected. Four cases are explained below.

(a) A case where the OLT 1 makes an inquiry, and the ONU 10 decides the power saving mode.

The OLT 1 generates a control message SLEEP_ALLOW (Tx|TRx) inquiring which of the Tx sleep mode and the TRx sleep mode is to be selected, and transmits the control message to the ONU 10. The ONU 10 having received the control message SLEEP_ALLOW selects any one of the power saving modes based on the own capability (the power saving function provided therein), and records one of the idle periods T1 and T2 notified from the OLT 1 beforehand corresponding to the selected power saving mode as the idle period of the own device. For example, when the ONU 10 selects the Tx sleep mode, the ONU 10 generates SLEEP_ACK(Tx) including information of the selected power saving mode as a response to the SLEEP_ALLOW, and returns the SLEEP_ACK(Tx) to the OLT 1. At this time, the ONU 10 shifts to the Tx sleep mode. Upon reception of the SLEEP_ACK(Tx), the OLT 1 records that the power saving mode of the ONU 10 is the Tx sleep mode in the storage unit of the own device, and recognizes that the ONU 10 has shifted to the Tx sleep mode.

A case where the ONU 10 corresponds to the Tx sleep mode has been explained above. However, in a case where the ONU 10 corresponds to the TRx sleep mode, the ONU 10 having received the SLEEP_ALLOW(Tx|TRx) from the OLT 1 selects the TRx sleep mode based on the own capability, records the information of the power saving mode and the idle period T2 in the storage unit of the ONU 10, and shifts to the TRx sleep mode. The ONU 10 generates and transmits SLEEP_ACK(TRx) to the OLT 1. The OLT 1 having received the SLEEP_ACK(TRx) records that the power saving mode of the ONU 10 is the TRx sleep mode in the storage unit of the own device, and recognizes that the ONU 10 has shifted to the TRx sleep mode.

By giving a decision right to the ONU 10 in this manner, the power saving mode corresponding to the state of the uplink buffer (the transmission buffer 12) of the ONU 10 can be decided.

(b) A case where the OLT 1 decides the power saving mode and notifies the ONU 10 of the power saving mode.

The OLT 1 can decide a power saving mode to be allowed in the own device and transmit the decided power saving mode (Tx or TRx) to the ONU 10 as a permission notice (SLEEP_ALLOW), instead of allowing the ONU 10 to select the power saving mode.

At this time, a response from the ONU 10 to the OLT 1 is not essential. The OLT 1 registers that the ONU 10 shifts to the power saving mode when the permission notice reaches the ONU 10, taking into consideration an RTT (round trip time) or a setup time of the optical transmitter and receiver 14, and upon reception of the permission notice, the ONU 10 shifts to the power saving mode.

When the ONU 1 responds to the OLT 1, the ONU 10 shifts to the power saving mode at the time of responding to the permission notice, and upon reception of the response, the OLT 1 recognizes that the ONU 10 has shifted to the power saving mode. It should be noted that, When there is no response within a predetermined time, if the OLT 1 retransmits the permission information, the power saving mode can be securely recognized mutually between the OLT 1 and the ONU 10.

(c) A case where the OLT 1 makes an inquiry in a response to a request from the ONU 10, and the ONU 10 decides the power saving mode.

The ONU 10 transmits a control message SLEEP_REQ requesting a shift inquiry to the power saving mode to the OLT 1. The OLT 1 having received the SLEEP_REQ specifies power saving modes to be allowed, and transmits to the ONU 10 a control message SLEEP_ALLOW(Tx|TRx) inquiring which power saving mode is to be selected. As in (a), the ONU 10 decides the power saving mode and notifies the OLT 1 of the power saving mode.

(d) A case where the ONU 10 decides the power saving mode, and requests a permission to the OLT 1.

The ONU 10 decides the own power saving mode based on the states of the transmission buffer 12 and the like, and transmits the SLEEP_REQ including information of the decided power saving mode to the OLT 1. The OLT 1 having received the SLEEP_REQ determines whether the power saving mode decided by the ONU 10 can be allowed based on the information of the power saving mode decided by the ONU 10 and the information recorded in the storage device, and transmits a permission notice SLEEP_ALLOW (or a non-permission notice) to the ONU 10. Upon reception of the permission notice with respect to the SLEEP_REQ, the ONU 10 shifts to the power saving mode, and the OLT 1 recognizes that the ONU 10 shifts to the power saving mode at a point in time when the permission notice reaches the ONU 10.

In this case, because the ONU 10 has selected and decided the power saving mode beforehand, an inquiry from the OLT 1 to the ONU 10 can be omitted, and the procedure can be simplified. Because the OLT 1 can allocate a band to the ONU 10 regardless of the power saving mode of the ONU 10, the ONU 10 can transmit uplink traffic in a short delay time.

When the allowed power saving mode is one power saving mode, when the ONU 10 shifts to the power saving mode, the OLT 1 makes an inquiry as in the above-described (a) and (b) or the ONU 10 requests a permission as in the above-described (c) and (d), thereby enabling to recognize the state of the operating mode mutually between the OLT 1 and the ONU 10. When the ONU 10 has received the SLEEP_AL- LOW(Tx|TRx), the SLEEP_REQ is generally transmitted when the ONU 10 shifts to the power saving mode. However, before receiving the SLEEP_ALLOW(Tx|TRx), the ONU 10 can transmit the SLEEP_REQ as in the above-described (c) and (d).

(Mode Change Between Power Saving Modes)

Figure 7:
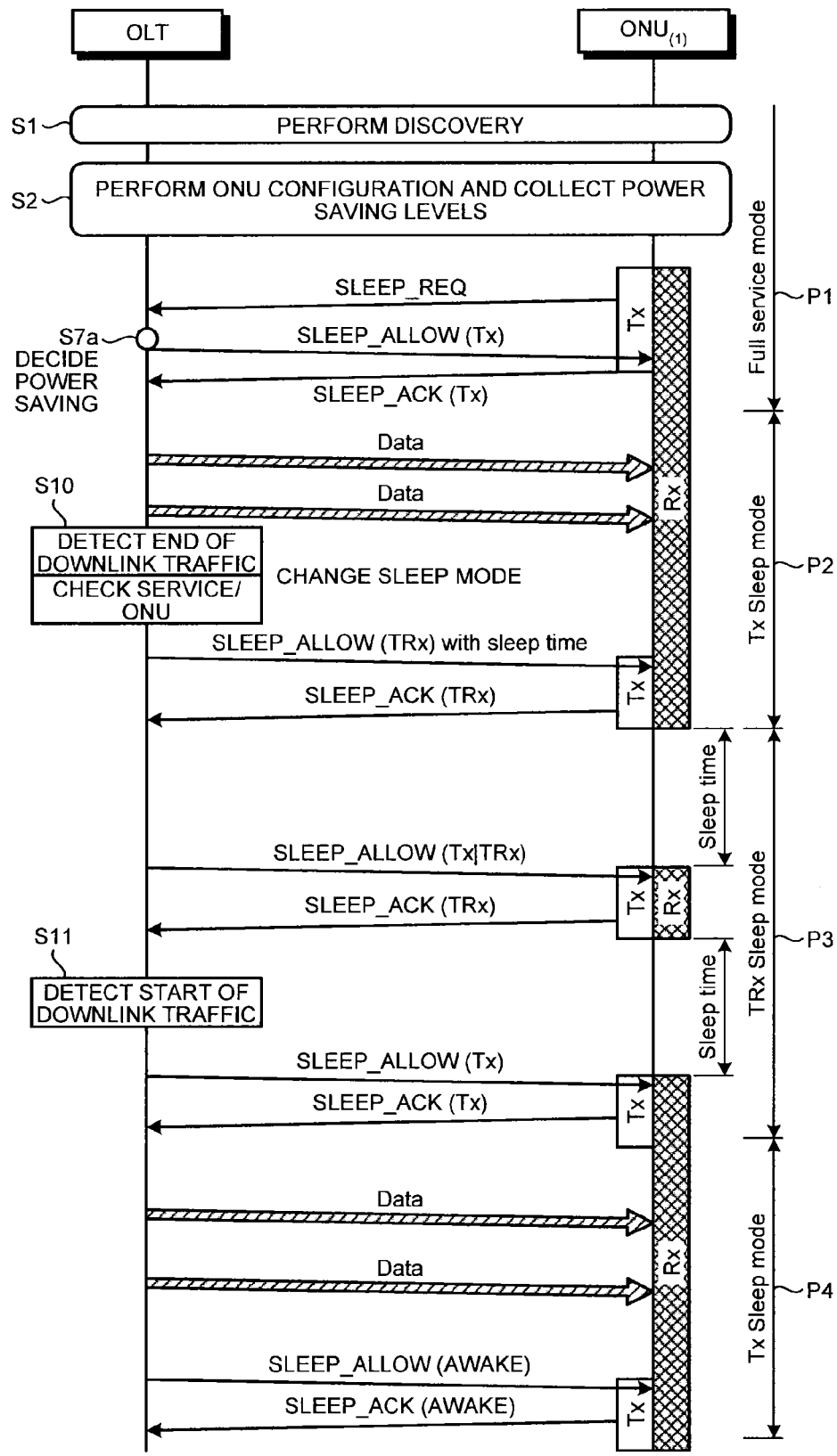
FIG. 7 is a sequence diagram depicting a power saving protocol according to the first embodiment of the present invention.

Mode change between the different power saving modes is explained next with reference to FIG. 7. In FIG. 7, steps denoted by like reference signs in FIG. 2 represent like or corresponding processes. In FIG. 7, steps denoted by like reference signs in FIG. 2 represent like or corresponding processes. The protocol described below is an example and the present invention is not limited to various transmission frames, names thereof, and procedures shown in FIG. 7.

FIG. 7 depicts a state where the ONU 10 shifts from the Tx sleep mode to the TRx sleep mode, and thereafter, shifts to the Tx sleep mode again. Mode change between the power saving modes may be performed by the ONU 10 autonomously based on a determination of the ONU 10 explained at Steps S6a to S6c in FIG. 2. However, the OLT 1 can instruct the ONU 10 to shift the mode. A case where the OLT 1 instructs the ONU 10 to shift the mode is explained below as an example.

When the ONU 10, which is operating in the full service mode in a period P1, specifies the Tx sleep mode and transmits a transition request (SLEEP_REQ) to the power saving mode to the OLT 1, the OLT 1 decides whether to allow power saving (Step S7a) and returns a response (SLEEP_ALLOW (Tx)) allowing the request. Upon reception of the permission notice, the ONU 10 shifts to the Tx sleep mode, and operates in the Tx sleep mode during a period P2. The ONU 10 also returns the SLEEP_ACK(Tx) as a response to the OLT 1. The ONU 10 having shifted to the Tx sleep mode maintains power to the optical receiver 142, but cuts power to the optical transmitter 141, and starts an operation with power consumption being suppressed. In FIG. 7, Tx and Rx respectively indicate a power-on state of the optical transmitter 141 and the optical receiver 142 (in a period with no description, the optical transmitter 141 and the optical receiver 142 are in a power-off state).

In the period P2, because the optical receiver 142 is in the on state, the OLT 1 can transmit downlink data. This means that the ONU 10 can receive data transmitted from the OLT 1. Although not shown in FIG. 7, the OLT 1 also provides the Grant together with the downlink data. The ONU 10 receives the Grant. However, when there is no transmission data, the ONU 10 does not supply power to the optical transmitter 141, thereby suppressing power consumption.

When there is no downlink traffic transmitted from the OLT 1 to the ONU 10 at Step S10, the OLT 1 detects this based on the monitoring result of the transmission buffer 4 and the like, and checks the configuration result at Step S2 stored in the storage device, to determine whether to change the downlink communication to the power saving mode as well. Completion detection of downlink traffic is performed based on, for example, whether the downlink traffic read from the transmission buffer 4 becomes equal to or less than a predetermined threshold in a certain period.

When having determined to change the mode from the Tx sleep mode to the TRx sleep mode, the OLT 1 specifies the mode (TRx) to be changed in a sleep mode change request (SLEEP_ALLOW) and transmits the sleep mode change request to the ONU 10. The ONU 10 having received the change command transmits the SLEEP_ACK(TRx) as in the shift to the power saving mode at Step S7, and changes over the power saving mode from the Tx sleep mode to the TRx sleep mode. The ONU 10 cuts power to the optical receiver 142 and operates in a state of power consumption being further suppressed.

In the TRx sleep mode, cyclic sleep is performed in which power on/off is repeated in a constant or variable cycle. It is specified how long power is to be turned off by a parameter referred to as "sleep time". The sleep time can be a default value decided by the configuration (the idle period T1 in the case of the Tx sleep mode, and the idle period T2 in the case of the TRx sleep mode), or can be a value specified by the SLEEP_ALLOW(TRx). For example, when the sleep time is not specified by the SLEEP_ALLOW(TRx), the ONU 10 and the OLT 1 use the idle period T2 of the default value.

To specify the sleep time, for example, there are a method of specifying a power-off period of the optical transmitter and receiver 14, a method of specifying a start time and a finish time, and a method of specifying a power-off start time and power-off continuous period. It is assumed here that the sleep time is specified by specifying a power-off period.

In a period P3, the ONU 10 temporarily turns on the optical transmitter 141 and the optical receiver 142 according to the sleep time, and returns a response (SLEEP_ACK) indicating whether the TRx sleep mode is to be continued or a change of the power saving mode is requested with respect to the inquiry from the OLT 1. The OLT 1 can confirm that there is no line disturbance between the ONU 10 and the OLT 1 by receiving the SLEEP_ACK.

A case where downlink traffic is generated or increased in the TRx sleep mode is explained next. When having detected a change of status of the traffic or generation of new communication by monitoring the transmission buffer 4, the OLT 1 determines whether to change the sleep mode (Step S11), and when the mode is to be changed, transmits a change request (SLEEP_ALLOW) to the ONU 10. At this time, when having determined that the traffic increases in downlink communication, the OLT 1 can instruct the ONU 10 to change from the TRx sleep mode to the Tx sleep mode by transmitting the SLEEP_ALLOW(Tx). By this command, such an effect can be obtained that power consumed by the ONU 10 is reduced than in a case where the mode is shifted from the TRx sleep mode to the full service mode (both the Tx and the Rx are in the on state).

When the power saving mode of the ONU 10 operating in the Tx mode is to be canceled, the OLT 1 transmits a change request (SLEEP_ALLOW(AWAKE)) to the ONU 10. The ONU 10 having received the SLEEP_ALLOW(AWAKE) from the OLT 1 turns on the optical transmitter 141 to shift to the full service mode, and transmits a response SLEEP_ACK (AWAKE) to the OLT 1.

Figure 8:
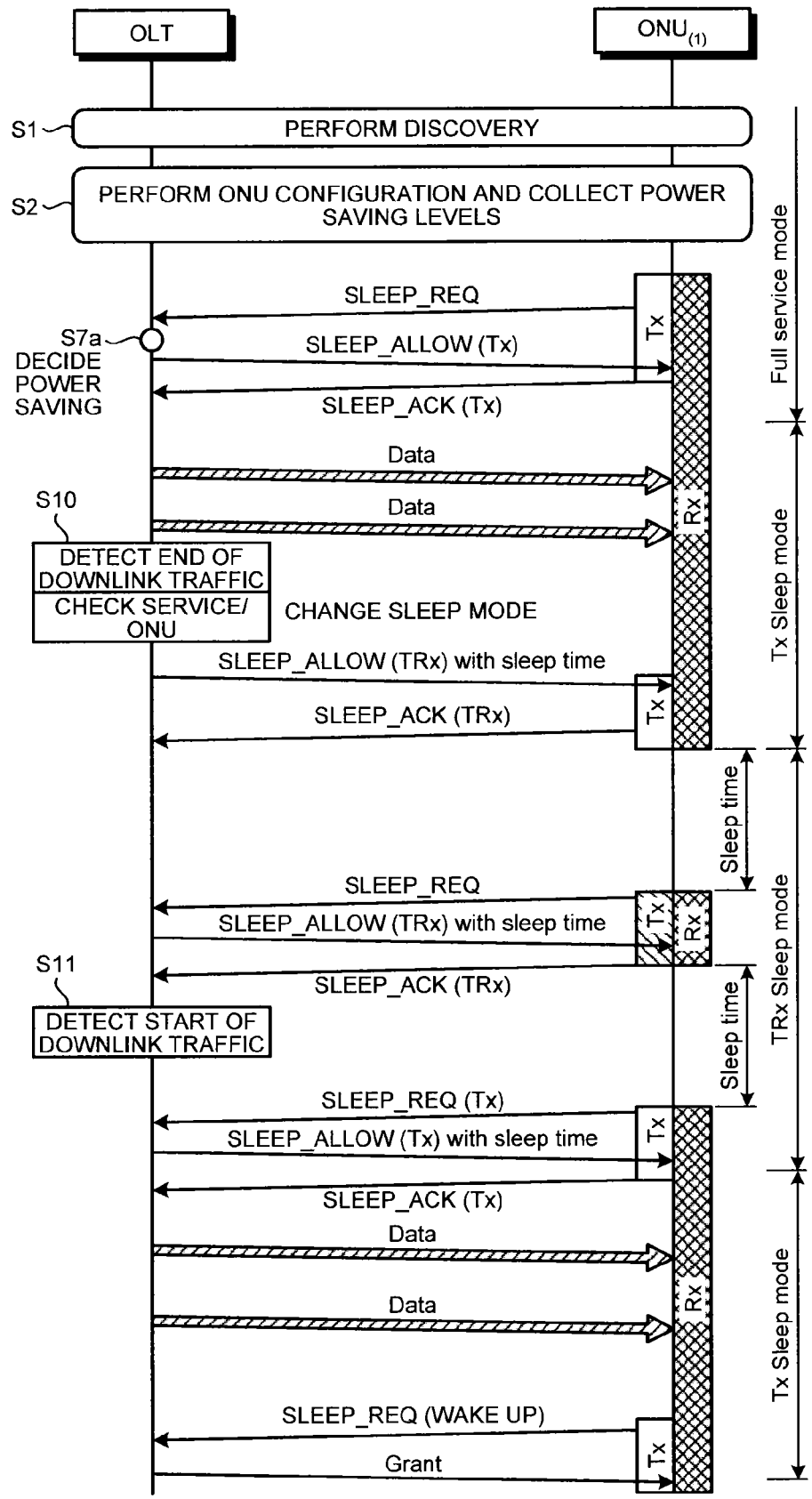
FIG. 8 is a sequence diagram depicting another example of the power saving protocol according to the first embodiment of the present invention.

In the example shown in FIG. 7, two messages of SLEEP_ALLOW and SLEEP_ACK are used for a mode change between the Tx sleep mode and the TRx sleep mode. However, as shown in FIG. 8, the mode change can be performed by using three messages of SLEEP_REQ, SLEEP_ALLOW, and SLEEP_ACK.

When the mode change is performed by using three messages, for the ONU 10 operating in the power saving mode to shift to the full service mode, the ONU 10 detects generation of uplink traffic based on an amount of data accumulated in the transmission buffer 12, which is being monitored, turns on the optical transmitter 141, and shifts to the full service mode. Thereafter, the ONU 10 transmits a message SLEEP_REQ (WAKE UP). Upon reception of the SLEEP_REQ(WAKE UP), the OLT 1 recognizes that the ONU 10 has shifted to the full service mode, and resumes transmission of the Grant in the full service mode.

According to the present embodiment, the time during which the optical transmitter and receiver 14 of the ONU 10 is turned off can be set individually in the Tx sleep mode and the TRx sleep mode depending on the power saving mode. Accordingly, when the idle period of the ONU 10 in the Tx sleep mode can be longer than the idle period of the ONU 10 in the TRx sleep mode, even if the acceptable delay time of downlink data is short, power consumption of the ONU 10 in the Tx sleep mode can be reduced than that in the conventional Tx sleep mode.

Furthermore, the idle period depending on the power saving mode can be changed as required by newly performing negotiation between the OLT 1 and the ONU 10.

Second Embodiment

In the first embodiment, the PON system that sets different idle periods depending on the power saving mode has been explained. In a second embodiment, a case where the OLT 1 forcibly changes the power saving mode if the acceptable delay time of downlink data is less than a predetermined threshold at the time of selecting or changing the power saving mode is explained.

Figure 9:
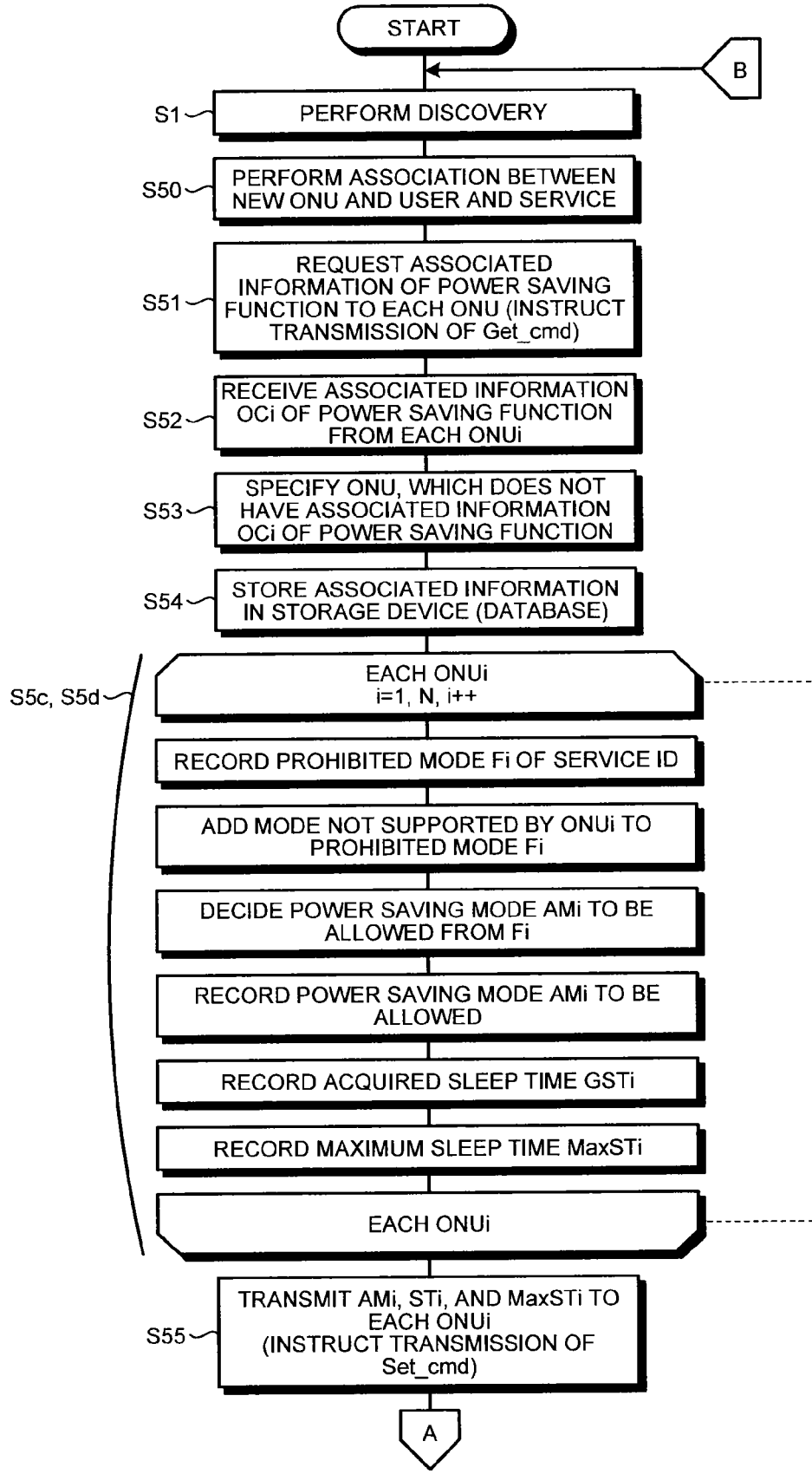
FIG. 9 is a flowchart of a configuration process and the like of a control device according to a second embodiment of the present invention.

FIG. 9 is a flowchart for explaining a process of the control unit 2 in the OLT 1 according to the second embodiment. The control unit 2 according to the second embodiment is applicable to the communication system according to the first embodiment, and features regarding to the overall communication system are similar to those of the first embodiment.

The control unit 2 is a control device used in a master unit such as the OLT 1, and constituted by combining a digital signal processor, a general processor, and software. These processors are integrated on a chip by a highly integrated IC (Integrated Circuit), and functions as the OLT 1 by being coupled and combined with the optical transmitter and receiver 5 and the like by a signal line.

The control unit 2 first starts a discovery via the optical transmitter and receiver 5. In the discovery, because a serial number of the ONU 10 can be acquired, the control unit 2 accesses the storage device incorporated therein or externally connected based on the serial number to identify a user who is using the ONU 10. The control unit 2 performs association between the user and a service contracted by the user (Step S50). For example, FIG. 12 is an example of the association, in which the control unit 2 performs association among the serial number of the ONU, a user ID, and pieces of service information such as whether the user signs up for business use or for general houses. Associated information includes information of type of the service line (IPTV, IP phone, and other Internet services). These service lines have different service requirements (QoS) such as guaranteed bands for uplink and downlink traffic and the acceptable delay time.

Configuration

Subsequently, the control unit 2 starts a configuration of the ONU 10 corresponding to Step S2 in FIG. 2. The control unit 2 generates a request message (Get_cmd) in order to request associated information (power_save_attr) of the power saving function to the respective ONUs 10 and transmits the request message to the respective ONUs 10 (Step S51). At this time, the control unit 2 can request attribute information of other ONUs 10. The attribute information of the ONU 10 is information specified in, for example, the ITU-TG.984.4 ONT management and control interface, and the configuration method thereof can be performed in similar manner. The attribute information can be acquired by using information or a method similar to equivalent standards such as the ITU-T G.988 ONU management and control interface and the next-generation standard XG-PON to be drawn up in future.

The control unit 2 acquires associated information OCi of the power saving function received from each ONUi by the optical transmitter and receiver 5 from the buffer or the optical transmitter and receiver 5 (Step S52), and compares the serial number of an active ONU 10 identified by the discovery with the serial number of the ONU 10 having transmitted the associated information OCi, thereby identifying the ONU 10, which does not include the associated information OCi of the power saving function, as an ONU 10 that does not support the power saving function (Step S53). Even when the ONU 10 transmits the associated information OCi indicating that the power saving function is not supported by using a Get_rsp message, the control unit 2 identifies the ONU 10 as an ONU 10 that does not support the power saving function.

The control unit 2 writes the associated information in the storage device or the like incorporated therein, in association with the ONU 10 in a format shown in FIG. 12 (Step S54). The associated information acquired by the control unit 2 includes not only the power saving mode but also various parameters related to the power saving function such as the idle period (a sleep time). Therefore, although not shown in FIG. 12, the control unit 2 also records these various parameters in the storage device.

The control unit 2 accesses a service database (a storage device) as shown in FIGS. 12 to 16 to decide the power saving mode allowed to each of N pieces of ONUi and a power saving parameter (Steps S5*c* and S5*d*). The decision can be performed by, for example, the following method.

The control unit 2 reads a service ID contracted by a user from the storage device (see FIG. 12) based on a user identifier (ID) associated with the ONUi, and identifies a power saving mode Fi prohibited with respect to each service ID from respective information tables in FIGS. 13 and 14. At this time, although the power saving mode prohibited with respect to the ONUi can be decided by any algorithm, when a power saving mode is "disapproved" in any of FIGS. 13 and 14, the control unit 2 sets this power saving mode as the prohibited power saving mode Fi.

The control unit 2 identifies the power saving mode that can be supported by the ONUi itself from the information table in FIG. 12, and decides a power saving mode AMi to be allowed by excluding the prohibited power saving mode Fi from the power saving mode identified here. The power saving mode AMi to be allowed is stored in the storage device.

When having acquired the sleep time from the ONU 10, the control unit 2 stores the sleep time as an acquired sleep period GSTi in the storage device (FIG. 15). The sleep time is one parameter associated with the power saving function, and it can be used instead of the default idle periods T1 and T2 set to the OLT 1 beforehand. The control unit 2 selects the acquired sleep period GSTi or the default idle period, and stores the period as a sleep time applied to the ONU 10 in the storage device. When the sleep time is acquired, it is assumed that the acquired sleep period GSTi is used.

The control unit 2 can also adjust the sleep time by using a regulation value or a default value determined beforehand corresponding to the service, in similar manner as the power saving mode is adjusted based on the service information. For example, when the sleep time notified from the ONU 10 is excessively long, communication quality of uplink communication deteriorates or the downlink traffic can apply compression on the storage area of the reception buffer of the OLT 1. Therefore, an adjusted value is stored in the storage device as the acquired sleep period GSTi.

The control unit 2 also stores a maximum sleep period MaxSTi acquired from the ONUi in the storage device (see FIG. 16). The maximum sleep period MaxSTi is a regulation value when the acquired sleep period GSTi is dynamically adjusted, and can be preset in the OLT 1 instead of acquiring the maximum sleep period MaxSTi from the ONU 10. The control unit 2 can use MaxSTi as a determination condition of an alarm such as LOS (loss of signal) or LOB (loss of burst).

The OLT 1 can store the tables in FIGS. 15 and 16, each in two types of a table stored in advance in the OLT 1 and a table decided as a result of negotiation with the ONU 10.

When having decided an allowed mode AMi, a sleep time Sti, and the maximum sleep period MaxSTi of these power saving modes for each ONU 10, the control unit 2 notifies each ONU 10 of these parameters by using a message (Set_cmd) (Step S55). Upon reception of the Set_cmd, the ONU 10 records these parameters in the storage device of the ONU 10 and uses these parameters for control of the power saving protocol.

Sleep Mode Control

Control of the sleep mode by the control unit 2 is explained next with reference to FIG. 10. A connector denoted by [A] in FIG. 10 indicates that it is a continuation of a flow shown by the connector [A] in FIG. 9. The control unit 2 performs band allocation control in the power saving mode at Steps S60 to S65. The OLT 1 detects the uplink and downlink traffic or the state of the connected device to the ONU 10 based on the states of the buffers 3 and 4 of the OLT 1, information transmitted from the ONU 10, and the like. The state information is used for band allocation at Step S66 or a shift determination to the power saving mode at Step S67.

The control unit 2 checks the current power saving mode of a target ONU 10, and limits a band allocation amount corresponding to each mode and an opportunity of providing the Grant (Step S61). When the ONU 10 is not in the power saving mode (in the full service mode), the control unit 2 does not limit the band allocation by the power saving mode. When the ONU 10 is in the Tx sleep mode, the control unit 2 limits a band allocation limit Bi of uplink communication to a preset value or a value determined according to the service (Step S62). When the power saving mode is the TRx sleep mode, the control unit 2 sets the band allocation limit Bi as at Step S62 (Step S63), and limits the opportunity of the Grant to once in m times (m is an integer equal to or larger than 1) of the band update cycle (Step S64). For example, the control unit 2 sets a grant skip flag GSi as a flag for not allocating a transmission opportunity of the band update cycle. When the grant skip flag is set at Step S66, the control unit 2 does not provide the transmission opportunity to the ONUi in the cycle. At Step S64, the control unit 2 sets the flag GSi (m−1) times in m times to provide one transmission opportunity in m band transmission cycles to the ONU 10.

The band allocation method corresponding to the power saving mode is an example, and the control unit 2 can set limitation/unlimitation of the band and limitation/unlimitation of the transmission opportunity in each mode, as required. For example, the control unit 2 can limit the opportunity of the Grant and uplink data transmission in the Tx sleep mode, or can provide the Grant every time without performing grant skip with respect to the ONU 10 in the TRx sleep mode. The band limitation is also arbitrary and, for example, even if the band allocation limit Bi is not set, the allocation amount by dynamic band allocation at Step S66 can be relatively less than other ONUs 10, due to a state where there is no uplink traffic from the ONU 10 or a band allocation request value is small. In this case, the control unit 2 can allocate the band without discriminating the ONU 10 in the power saving mode from the ONUs 10 in other states.

When the process described above is complete with respect to all the ONUs 10, the control unit 2 allocates the band to each ONU 10. At this time, the grant skip flag GSi and the band allocation limit Bi are used. The control unit 2 first removes the ONUi, to which the grant skip flag GSi is set, from band allocation targets of the next cycle, and allocates the band to each ONU 10 by using Traffic monitoring DBA (Dynamic Bandwidth Allocation), a status report DBA, or combination thereof. At this time, the control unit 2 does not provide a band exceeding the band allocation limit Bi to the ONUi in the power saving mode. When band allocation is complete, the control unit 2 resets the respective GSi and Bi.

At Step S67, the control unit 2 prepares for generating a permission signal SLEEP_ALLOW based on a request (SLEEP_REQ) received by the optical transmitter and receiver 5. A specific process is explained later with reference to FIG. 11.

The control unit 2 controls a change command of the power saving mode by the OLT 1 at Steps S68 to S75. The OLT 1 can shift the ONU 10 under the control thereof from the power saving mode to the full service mode, or can shift the ONU 10 from a certain power saving mode to another power saving mode, thereby enabling to reduce power consumption efficiently as the communication system, and to improve the communication quality.

The control unit 2 detects whether the ONUi is in the sleep mode by checking the storage device (Step S69). When the ONUi is not in the sleep mode, the control unit 2 checks whether there is a starting factor of the sleep mode (Step S70). When having determined that there is no starting factor, the control unit 2 proceeds to a process at Step S75, and repeats similar process for the next ONUi (an ONUi in which a value i is incremented by 1).

Meanwhile, when the downlink traffic (a downward link) decreases or the uplink traffic (an upward link) decreases, the control unit 2 shifts to the process at Steps S71 and S72 to prepare for transmitting the SLEEP_ALLOW in order to cause the ONU 10 to shift to the power saving mode.

When the downlink traffic decreases and the ONU 10 shifts from the full service mode or the Tx sleep mode to the TRx sleep mode, the control unit 2 specifies the TRx sleep mode as the power saving mode (Step S71). When the uplink communication is continued even if the downlink traffic decreases, the TRx sleep mode is not selected and the control unit 2 proceeds to a process at Step S75. On the other hand, although there is the downlink traffic, when the uplink traffic decreases and the ONU 10 shifts to the power saving mode, the control unit 2 specifies the Tx sleep mode as the power saving mode (Step S72).

At Step S69, when having determined that the ONUi is in the sleep mode, the control unit 2 detects a factor of interruption of the sleep mode (Step S73). When there is no factor of interruption, the control unit 2 continues the sleep mode and shifts to the process for the next ONU 10. On the other hand, when the factor of interruption is in an uplink (generation of uplink traffic equal to or larger than the threshold), the control unit 2 specifies AWAKE to prepare for transmitting the SLEEP_ALLOW in order to halt the power saving mode and shift to the full service mode (Step S74). When the factor of interruption is in a downlink (generation of downlink traffic equal to or larger than the threshold), the control unit 2 prepares for transmitting the SLEEP_ALLOW(Tx) to cause the ONU 10 to shift from the TRx sleep mode to the Tx sleep mode or to continue the Tx sleep mode (Step S72).

Furthermore, the starting factor and the factor of interruption of the sleep mode can be any factor, as long as it is a reference that can maintain required communication quality, while suppressing power consumption. As the reference, for example, there can be mentioned a traffic amount for a certain period, an amount of data accumulated in the buffer, on/off information of a device connected to the ONU 10, or start of a new service.

When the processes described above are complete, the control unit 2 generates a frame in which the band allocation result and the control message such as the SLEEP_ALLOW are stored and transmits the frame to the ONU 10 (Step S76). At this time, downlink data can be stored in the same frame as the control message and transmitted together.

The control unit 2 determines whether it is a timing at which a discovery is required (Step S77). If the discovery is required, the control unit 2 shifts to the process at Step S1 in FIG. 9 (see a connector [B]), and if the discovery is not required, the control unit 2 returns to Step S60 in FIG. 10 and shifts to transmission control of the next band update cycle.

Process of Request (SLEEP_REQ)

Figure 11:
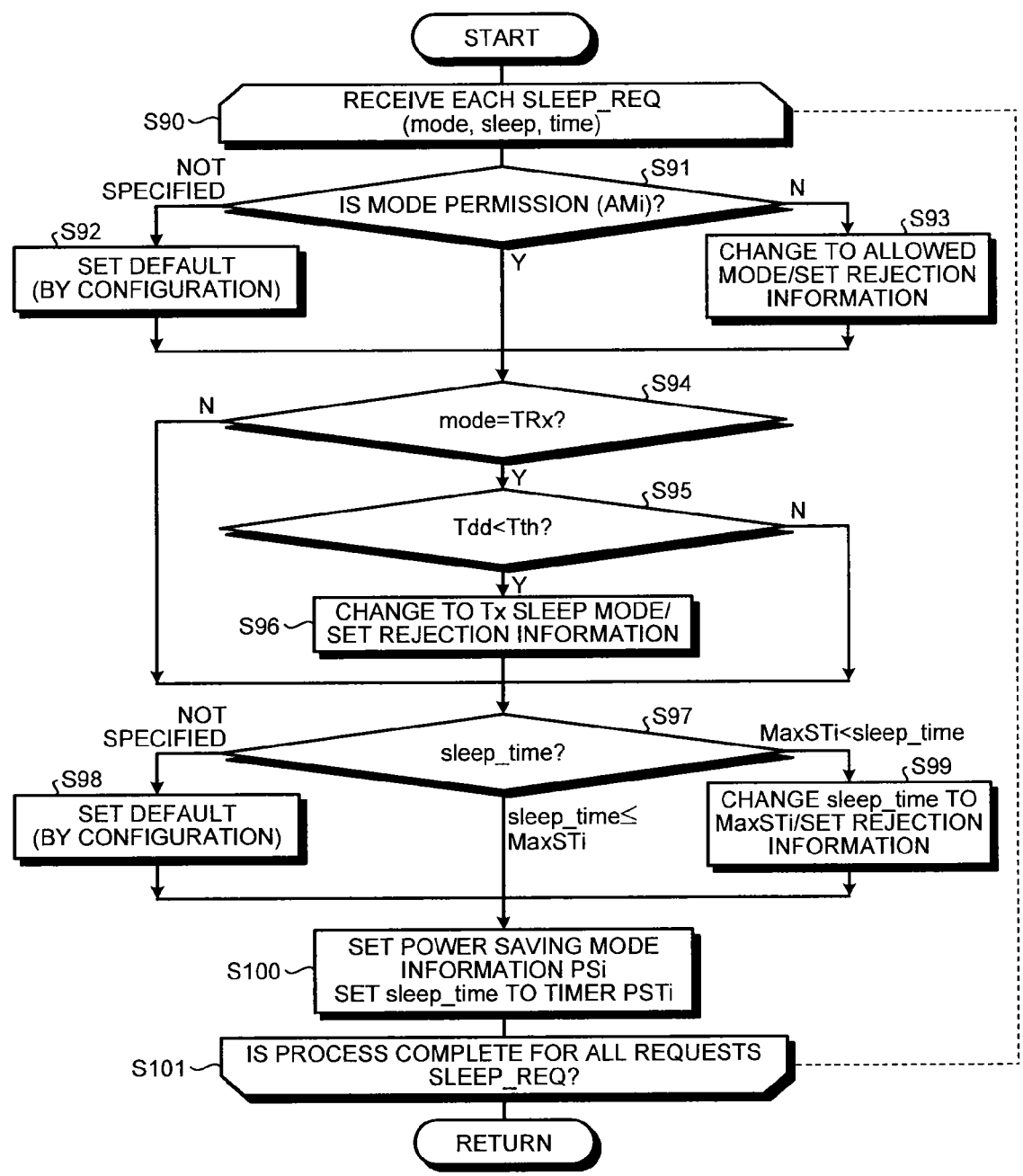
FIG. 11 is a flowchart of a power saving mode request and the like of the control device according to the second embodiment of the present invention.

FIG. 11 is an example of a preparation process for generating the SLEEP_ALLOW based on the request (SLEEP_REQ) received by the control unit 2 in the OLT 1. Upon reception of the SLEEP_REQ from the ONU 10 (Step S90), the control unit 2 determines whether to permit or change the request from the ONU 10, and returns the determination result in a SLEEP_ALLOW message to the ONU 10.

The control unit 2 checks whether the power saving mode specified in the SLEEP_REQ as a parameter is included in the allowed modes AMi of the ONUi by accessing the storage device (Step S91). When the power saving mode is not specified, the control unit 2 sets the power saving mode to a default value of the power saving mode determined beforehand by the configuration performed at Step S2 or the like in FIG. 2 (Step S92). On the other hand, when the specified mode is not included in the allowed modes AMi, the control unit 2 changes the specified mode to the allowed mode or sets rejection information with respect to the shift to the power saving mode (Step S93). When changing the power saving mode specified by the ONU 10, the control unit 2 needs to change the power saving mode so as not to interfere with the communication quality.

When the process is complete or the specified mode is the allowed mode AMi, the control unit 2 shifts to the next process at Step S94. At Step S94, the control unit 2 determines whether the allowed mode AMi or the power saving mode in default setting is the TRx sleep mode (Step S94). When it is the TRx sleep mode, the control unit 2 determines whether an acceptable delay time Tdd of downlink data is less than a predetermined threshold Tth (Step S95). The acceptable delay time Tdd can be identified by the service ID, the user ID, or the like in FIG. 12.

The predetermined threshold Tth can be defined as an acceptable delay time at an intersection of the Tx sleep mode and the TRx sleep mode in a graph shown in FIG. 5. When the acceptable delay time Tdd of downlink data is less than the threshold Tth, power consumption in the Tx sleep mode is lower than that in the TRx sleep mode. When the acceptable delay time Tdd of downlink data is equal to or more than the threshold Tth, power consumption in the TRx sleep mode is lower than that in the Tx sleep mode.

At Step S95, when having determined that the acceptable delay time Tdd of downlink data is less than the threshold Tth, the control unit 2 decides to change the allowed mode AMi to the Tx sleep mode forcibly, and sets the rejection information with respect to the shift to the power saving mode (Step S96). By forcibly changing the power saving mode by the OLT 1, power consumption of the ONU 10 can be reduced. Even if the acceptable delay time Tdd is equal to or more than the threshold Tth, the Tx sleep mode is not changed to the TRx sleep mode, because the presence of downlink data needs to be confirmed. Confirmation of the presence of downlink data is performed by processes corresponding to Steps S69 to S75 in FIG. 10.

When the process at Step S96 is complete, or when having determined that the sleep mode is not the TRx sleep mode at Step S94 or the acceptable delay time Tdd is equal to or more than the threshold Tth at Step S95, the control unit 2 checks whether the sleep time specified as the parameter in the SLEEP_REQ is equal to or less than the maximum sleep period MaxSTi set in the ONUi by accessing the storage device (Step S97). When the sleep time is not specified, the control unit 2 sets the default value STi of the sleep time determined beforehand by the configuration performed at Step S2 or the like to the sleep time (Step S98). On the other hand, when the specified sleep time is more than the MaxSTi, the control unit 2 changes this sleep time to the MaxSTi or sets the rejection information with respect to the shift to the power saving mode (Step S99).

Figure 10:
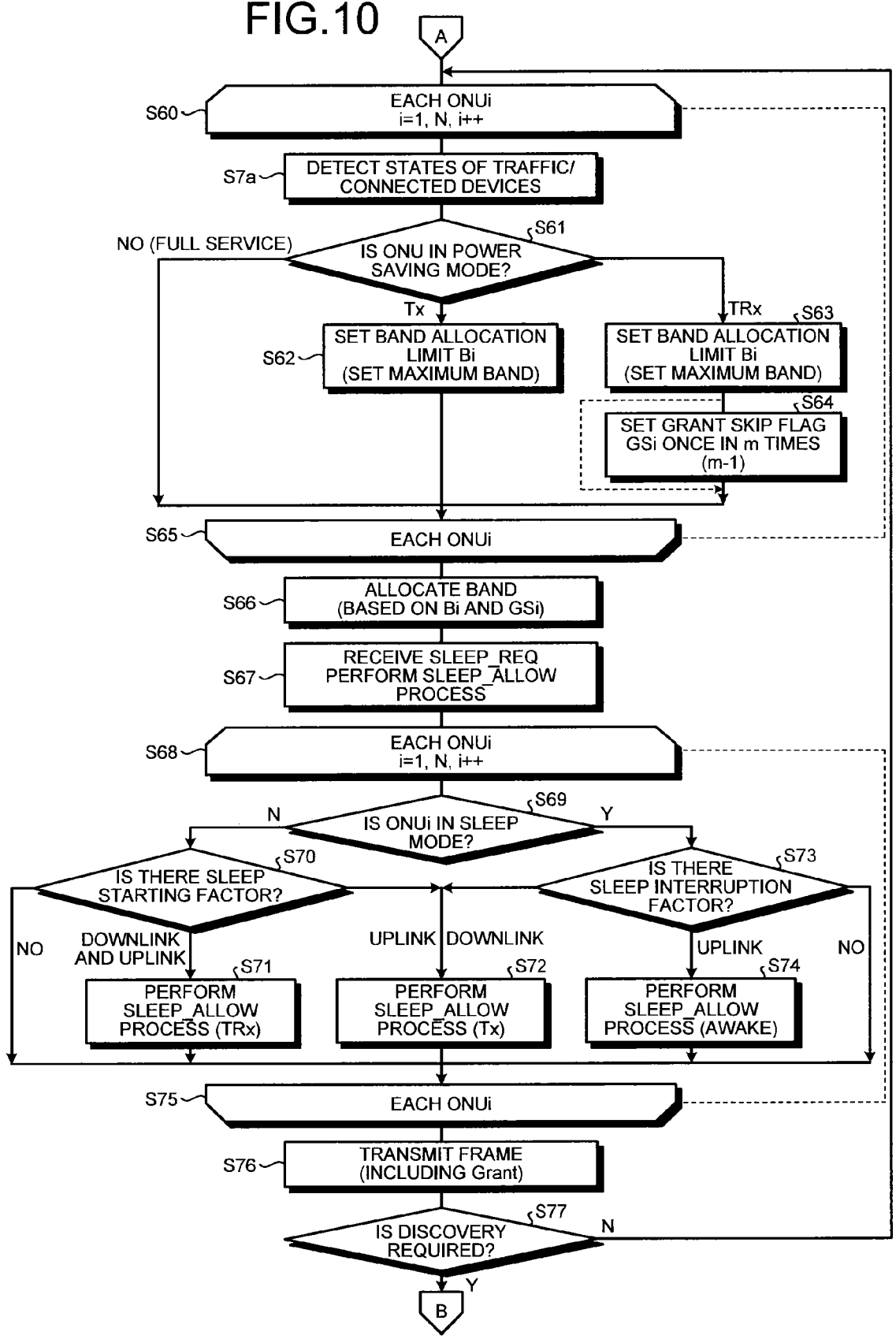
FIG. 10 is a flowchart of power saving mode control and the like of the control device according to the second embodiment of the present invention.

When the process is complete or when "sleep time≤MaxSTi", the control unit 2 records power saving mode information PSi as information of the power saving mode of a corresponding ONUi in the storage device, and sets the timing of the Grant at Steps S64 and S66 in FIG. 10 and a sleep time to a timer PSTi, which is a reference for suppressing an alarm during in the power saving mode (Step S100).

When the process is complete, the control unit 2 repeats the process described above with respect to all the received requests SLEEP_REQ (Step S101).

Third Embodiment

In the embodiments described above, the PON system that sets different idle periods in the Tx sleep mode and the TRx sleep mode has been explained. In a third embodiment, a PON system that sets different idle periods in the uplink and downlink is explained.

Figure 17:
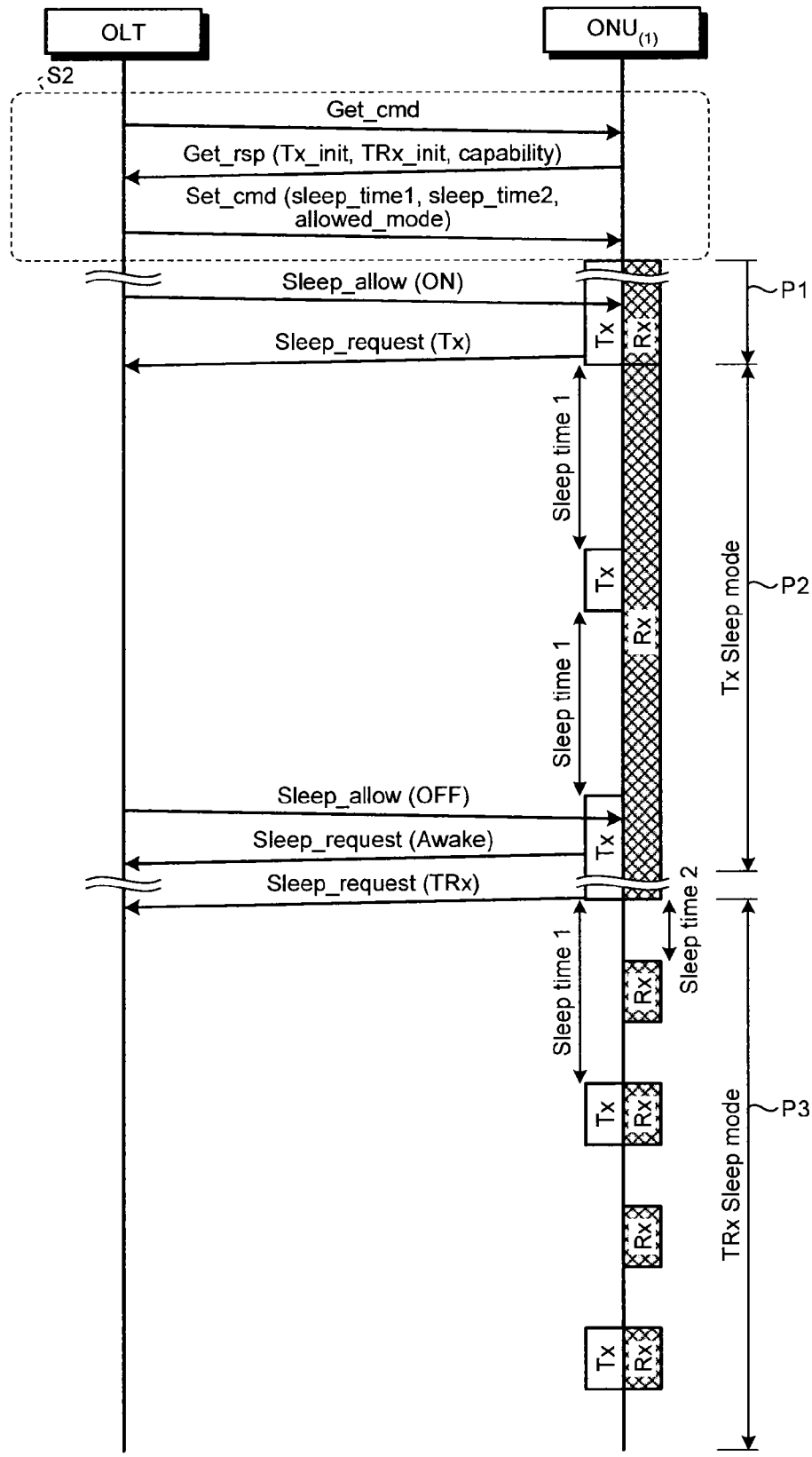
FIG. 17 is a sequence diagram depicting a power saving protocol according to a third embodiment of the present invention.

FIG. 17 is a sequence diagram depicting a communication protocol at the time of a sleep mode of the present embodiment. In FIG. 17, like reference signs in FIG. 7 or FIG. 8 represent like sequences. In the communication system, at a configuration step (Step S2), the OLT 1 transmits a sleep_time1 for the uplink and a sleep_time2 for the downlink to the ONU 10. The sleep_time1 indicates a period during which power consumption of the optical transmitter 141 is reduced (the idle period of the optical transmitter 141), and the sleep_time2 indicates a period during which power consumption of the optical receiver 142 is reduced (the idle period of the optical receiver 142).

The ONU 10 performs a power saving operation based on the received sleep parameter. A period P2 in FIG. 17 is a Tx sleep mode period, during which the ONU 10 repeats an operation of reducing power consumption of the optical transmitter 141 for a period of the sleep_time1, while maintaining the receiving function of the optical receiver 142. Furthermore, a period P3 is a TRx sleep mode period, during which the ONU 10 repeats an operation of reducing power consumption of the optical receiver 142 for a period of the sleep_time2, and reducing power consumption of the optical transmitter 141 for a period of the sleep_time1. In FIG. 17, Tx denotes a period during which the transmitting function of the optical transmitter 141 is on, and Rx denotes a period during which the receiving function of the optical receiver 142 is on.

By setting a plurality of idle periods in this manner, the communication system according to the present embodiment can arbitrarily adjust conflicting parameters of a delay time and power consumption as in the embodiments described above.

An operation of the communication system is explained below. To indicate various modifications, in FIG. 17, examples of the communication procedure different from FIGS. 7 and 8 are shown as well as the sleep parameters. In the configuration after the discovery process (Step S2), the OLT 1 transmits a get_command message to the ONU 10, to request transmission of the sleep parameter to the ONU 10. Although not shown in FIG. 17, the OLT 1 specifies an identifier of the parameter desired to acquire in the get_command message. The ONU 10 having received this message reads the sleep parameter stored in the own device from the storage device, and transmits the read parameters to the OLT 1 by using a get_response message.

The following parameters are transmitted as the sleep parameters.

Tx_init: a time required for the optical transmitter 141 to return to the operating state from the idle state TRx_init: a time required for the optical transmitter and receiver 5 (the optical transmitter 141 and the optical receiver 142) to return to the operating state from the idle state Capability: information of a power saving mode that can be performed by the ONU 10 (for example, Tx, TRx, or Tx and Rx)

The Tx_init and TRx_init can be expressed by an MPCP counter value in a unit of 16 nanoseconds, or can be expressed by the number of band update cycles when the band update cycle is 125 microseconds.

Upon reception of the sleep parameter from the ONU 10, the OLT 1 decides the sleep_time1 for the uplink, the sleep_time2 for the downlink, and the sleep mode (allowed_mode) allowed to the ONU 10, and transmits these to the ONU 10 by using a Set_command message. The sleep_time1 and the sleep_time2 can be decided by any method, and the method thereof is not particularly limited.

An example of the decision method is a method of deciding an arbitrary sleep_time1 based on the Tx_init as a least time and deciding the sleep_time2 based on the TRx_init as a minimum time. To increase the power saving effect, a value larger than the Tx_init and the like can be set as the sleep_time1 and the sleep_time2. Furthermore, the OLT 1 can acquire a time required for the optical receiver 142 to return to the operating state from the idle state instead of the TRx_init from the ONU 10, thereby deciding the parameter based on the sleep_time2. Upper limits of the sleep_time1 and the sleep_time2 can be limited based on the acceptable delay time. Further, the OLT 1 can acquire these upper limit values from the ONU 10 as the sleep parameters.

As another decision method, the sleep_time1, the sleep_time2, and the sleep mode to be allowed can be decided according to the service to be offered to a user. As another method, a method in which an arbitrary parameter is set to the OLT 1 by an operator or the like of the network can be used, or a method in which the OLT 1 has a parameter table for each time period so that these parameters are changed according to the time period. Alternatively, a method of deciding the sleep_time1 and the sleep_time2 based on the type of the terminals 20-1 and 20-2 connected to the ONU 10 and based on an application currently being executed can be used.

The ONU 10 stores the sleep parameters received from the OLT 1 in the own device, and performs the power saving operation based on these parameters.

In the communication system shown in FIG. 17, as an example of the power saving protocol, such a protocol is used that the OLT 1 transmits a sleep permission (the Sleep_allow message) to the ONU 10 beforehand, and the ONU 10 having the permission notifies the OLT 1 of shifting to the sleep state at an arbitrary timing (a Sleep_request message), thereby performing the power saving operation. The OLT 1 determines that the ONU 10 can shift to the power saving state based on the downlink communication status and the like, and grants a permission to the ONU 10 by using the Sleep_allow message. The Sleep_allow message includes information of "ON" indicating a permission or "OFF" indicating a non-permission and return from the power saving state, as parameters.

Upon reception of the Sleep_allow message, the ONU 10 stores information that the power saving operation is allowed. The ONU 10 having been granted the permission does not need to shift to the power saving mode, and can determine whether to shift to the power saving state independently, based on the amount of information accumulated in the transmission buffer 12 of the ONU 10, the service being offered to the user, the type, operation state, and the like of the connected terminals 20-1 and 20-2.

The ONU 10 having decided to shift to the power saving state specifies the sleep mode to be used and transmits a Sleep_request message to the OLT 1. When there is only one mode allowed beforehand by the allowed_mode, it can be skipped to specify the sleep mode. The ONU 10 having transmitted the Sleep_request message reduces power consumption of the optical transmitter and receiver 5 depending on the decided sleep mode (in this case, the Tx sleep mode). In this example, the ONU 10 repeats the operation of turning off the optical transmitter 141 for a period indicated by the sleep_time1.

Although not shown in FIG. 17, transmission and reception of a transmission-band allocation notice (Grant or Gate) by the OLT 1, transmission and reception of a control message such as a band allocation request (Report) by the ONU 10, and transmission and reception of data are performed in a normal way.

Power saving is stopped in two cases. One case is when the OLT 1 transmits a Sleep_allow(OFF) message indicating cancellation of the power saving permission, and the other case is when the ONU 10 itself cancels the power saving operation spontaneously, specifies "Awake" information indicating cancellation, and transmits a Sleep_request message to the OLT 1.

An operation in the TRx sleep mode period (P3) is explained next. The ONU 10, to which a shift to the power saving state is allowed, specifies information indicating the TRx sleep mode and transmits a Sleep_request message, at the time of shifting to the TRx sleep mode. The OLT 1 having received the message stores information that the ONU 10 has shifted to the TRx sleep mode as in the case of the Tx sleep mode, and uses this information for band allocation and alarm monitoring control.

When having shifted to the TRx sleep mode, the ONU 10 performs control to reduce power consumption of the optical transmitter and receiver 5. At this time, the ONU 10 reads sleep parameters (the sleep_time1 and the sleep_time2) stored in advance from a memory in the own device, halts the transmitting function for a period based on the sleep_time1, and halts the receiving function for a period based on the sleep_time2.

In setting of the sleep parameters shown in FIG. 17, the sleep_time1 is set longer than the sleep_time2, and the optical receiver 142 is operated more frequently than the optical transmitter 141. Therefore, the power saving effect of the optical transmitter 141 can be increased, and the ONU 10 can receive the transmission-band allocation notice (Grant or Gate) more frequently. Accordingly, when transmission is required, the ONU 10 can transmit data in the allocated transmission band by canceling the power saving state of the optical transmitter 141. Consequently, in this communication system, a higher power saving effect and a low delay effect can be realized.

In the case of such setting, the OLT 1 can provide one or a plurality of transmission bands in the future band allocation cycle, taking an operating time of the optical transmitter 141 (Tx_init) of the ONU 10 into consideration.

Figure 18:
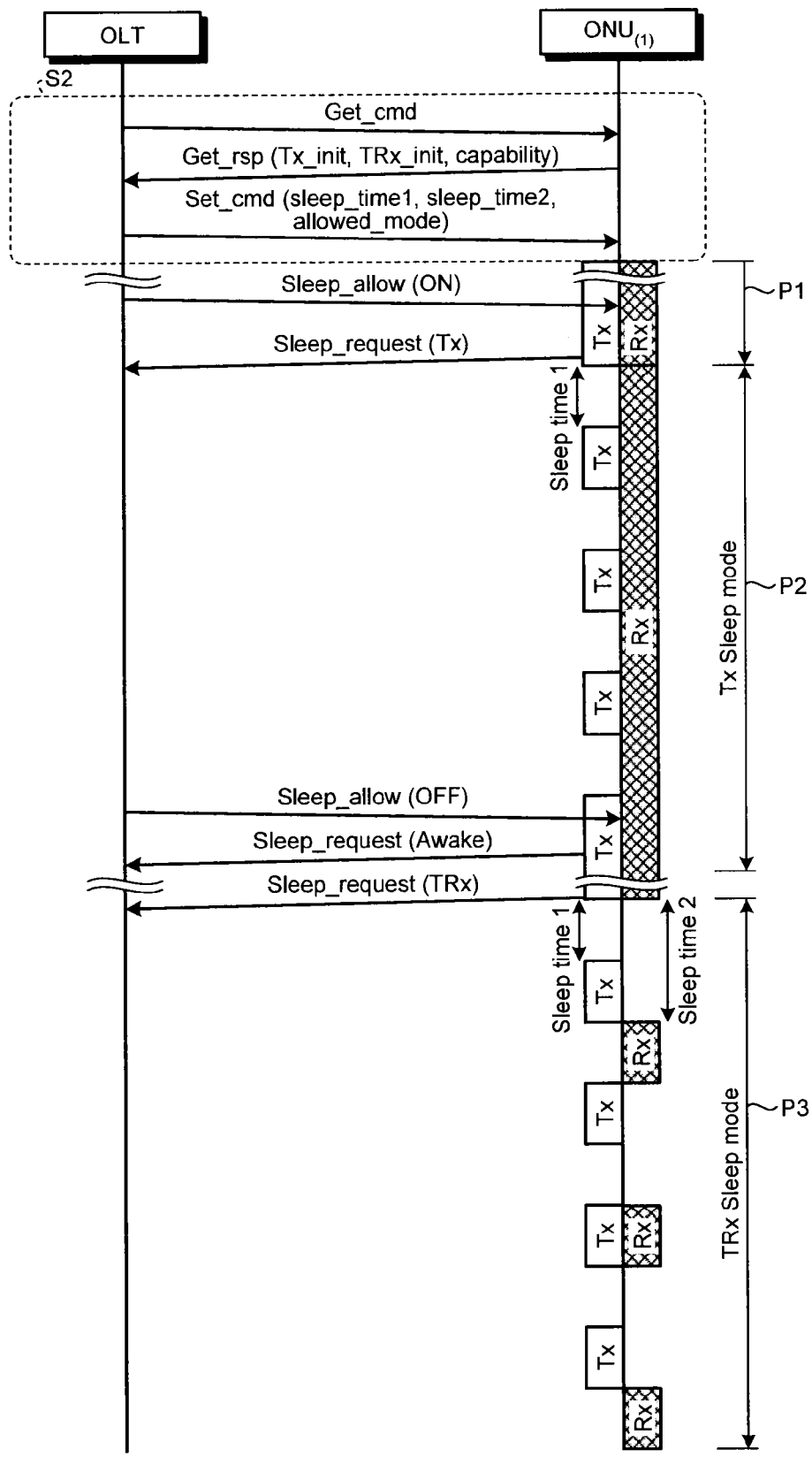
FIG. 18 is a sequence diagram depicting the power saving protocol according to the third embodiment of the present invention.

FIG. 18 depicts a communication sequence when the sleep_time1 is set to be shorter than the sleep_time2. The communication sequence can achieve an advantageous effect when the delay time required in uplink communication is short or a data rate continuously transmitted in the uplink is higher than a data rate received in the downlink. At this time, the OLT 1 operates to provide one or a plurality of transmission bands to the ONU 10 beforehand so that transmission can be performed when the receiving function of the ONU 10 is halted corresponding to the sleep_time2.

Figure 19:
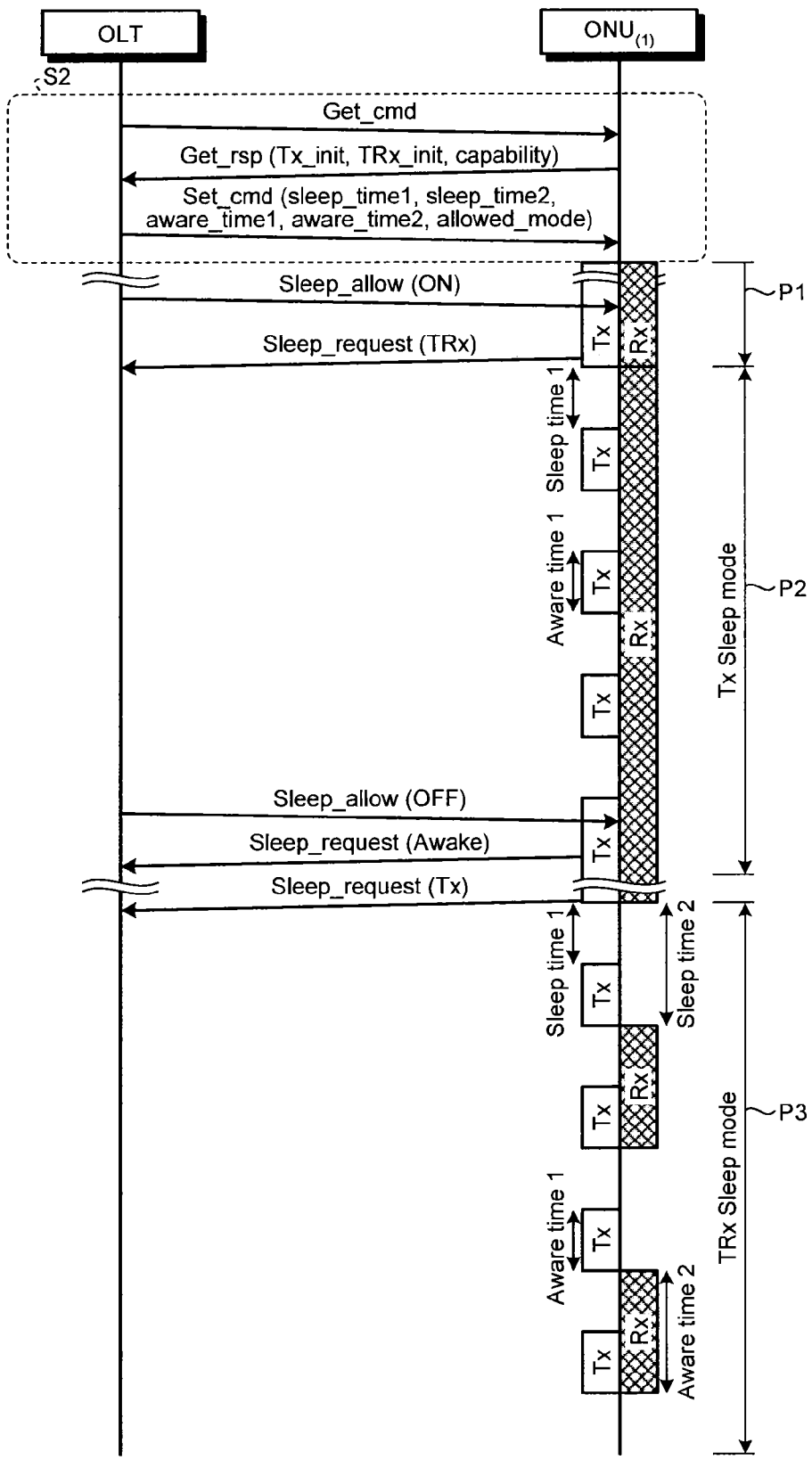
FIG. 19 is a sequence diagram depicting the power saving protocol according to the third embodiment of the present invention.

FIG. 19 depicts a communication sequence in which a transient operating time at the time of the power saving operation can be variably controlled. At a configuration step S2, the OLT 1 specifies a transient operating time and transmits a set_command message. In this example, an aware_time1 as a transient operating time for the uplink and an aware_time2 as a transient operating time for the downlink are set in the set_command message. However, the OLT 1 can specify one aware_time1.

The ONU 10 having received the set_command message stores therein these sleep parameters, and controls the power saving operation based on these parameters. The aware_time1 and the aware_time2 can be expressed by the MPCP count value by a scale of 16 nanoseconds as in the sleep_time1, or can be expressed by the number of band update cycles when the band update cycle is 125 microseconds.

When transiently operating the optical transmitter 141 during the power saving operation, the ONU 10 maintains the transmitting function of the optical receiver 142 to be on at least for a period indicated by the aware_time1 after operation. Because the OLT 1 can specify a transmittable period during which the ONU 10 can transmit data based on the aware_time1 and the sleep_time1, the OLT 1 can allocate a transmission band during the transmittable period. The OLT 1 can allocate a transmission band to the ONU 10 as well in a period other than the transmittable period because of decreasing the delay time or the like.

When transiently operating the optical transmitter 141, the ONU 10 maintains the receiving function of the optical receiver 142 to be on at least for a period specified by the aware_time2 after starting operation. Because the OLT 1 can specify a receivable period during which the ONU 10 can receive data based on the aware_time2 and the sleep_time2, the OLT 1 transmits at least one of a control signal such as a grant or sleep_request and data in the receivable period. The grant (or the gate) to be transmitted in the receivable period is significant because the grant (or the gate) is used for keep-alive determination of the ONU 10. The OLT 1 monitors at all times whether the communication with the ONU 10 is effectively maintained. When there is no response from the ONU 10 for a certain period according to a timer incorporated therein, the OLT 1 determines that a fault has been generated in communication with the ONU 10 and cancels a link with the ONU 10. Because the response signal is transmitted by using the transmission band allocated by the grant (or the gate), the OLT 1 needs to transmit the grant in the allocated receivable period, to provide a transmission opportunity to the ONU 10 in a normal way.

In this communication system, the transient operating time can be controlled, and a transmission timing and a reception timing can be arbitrarily controlled. For example, by setting a long transient operating time and decreasing operation frequency, a higher power saving effect can be acquired. As shown by parameters such as the Tx_init and TRx_init, the optical transmitter and receiver 5 requires an operating time at the time of shifting from the idle state to the operation state. Therefore, operation needs to be started earlier than the time actually required for transmission and reception, and power is consumed also in the operating time. The same holds true after the transient operating time ends. Therefore, by decreasing the frequency of the transient operating time, power consumed for the operating time and the like can be decreased.

Figure 20:
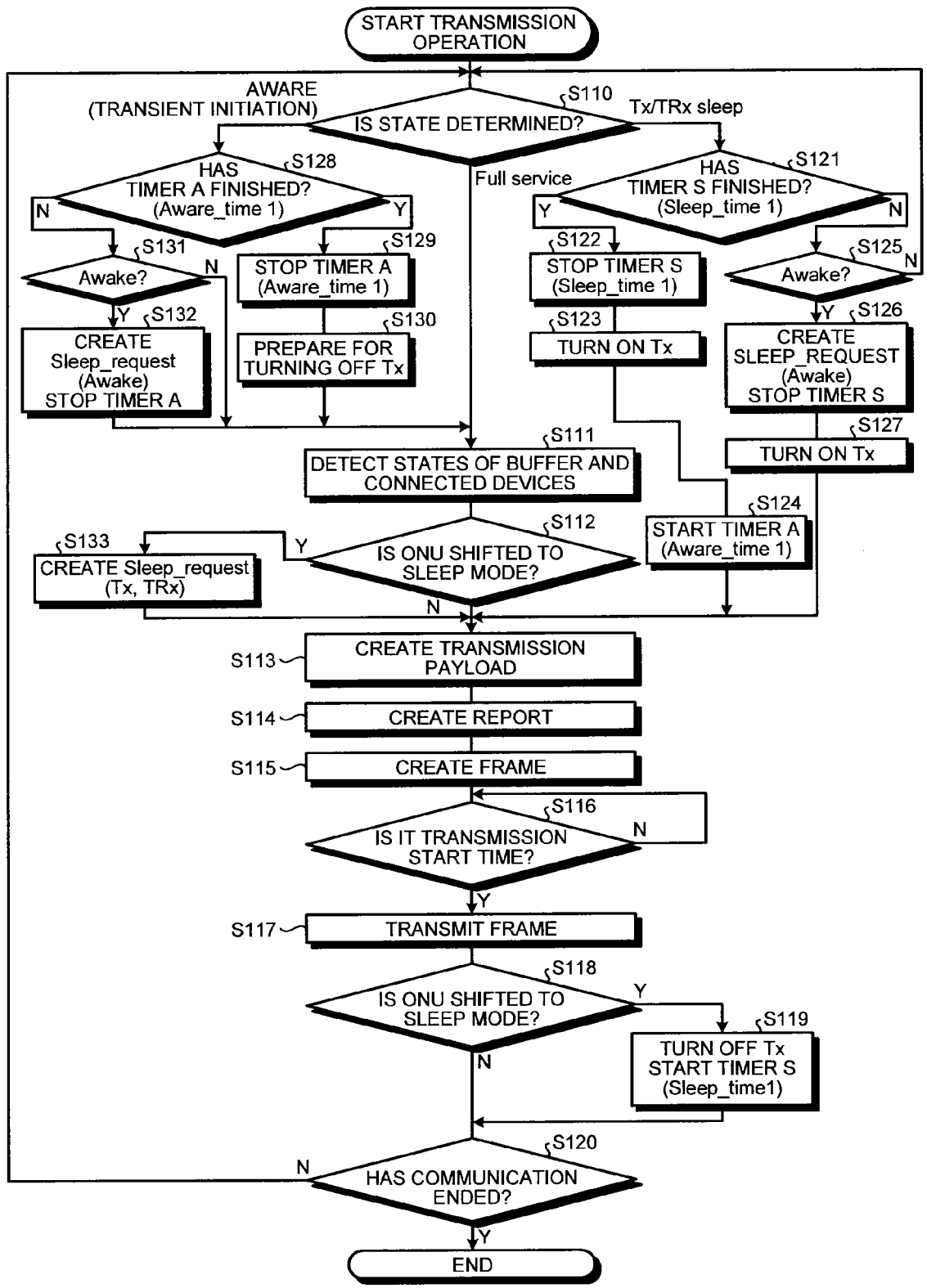
FIG. 20 is a flowchart of power saving mode control and the like in a transmission process of the control device according to the third embodiment of the present invention.
Figure 21:
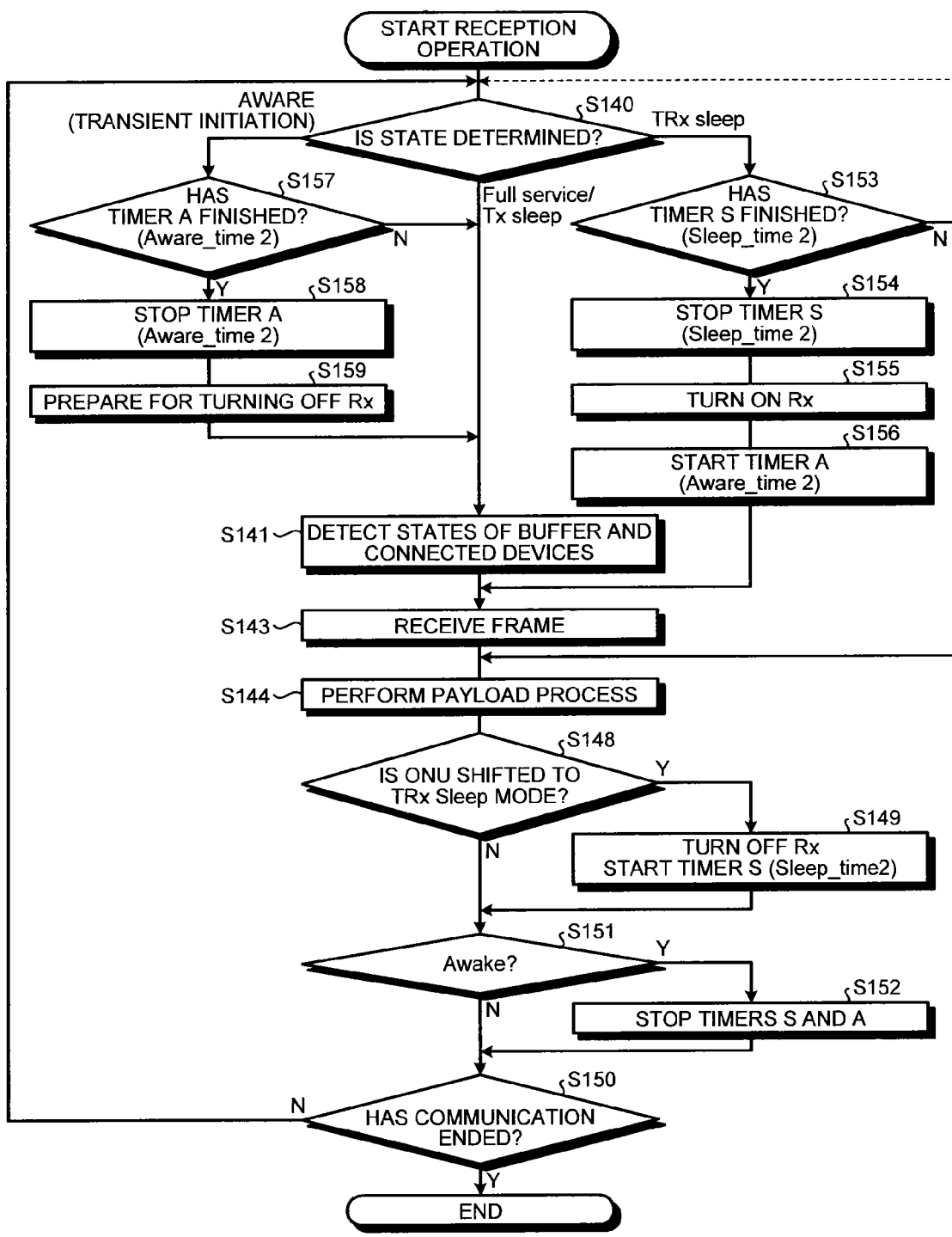
FIG. 21 is a flowchart of power saving mode control and the like in a reception process of the control device according to the third embodiment of the present invention.

Control of the power saving operation performed by the control unit 11 of the ONU 10 is explained next. FIGS. 20 and 21 depict control performed by the control unit 11. The control can be realized by a dedicated electronic circuit, or the similar function can be realized by describing this algorithm in a programming language and causing a general-purpose processor to execute the algorithm as software. FIG. 20 depicts a transmission process, and FIG. 21 depicts a reception process. The transmission process and the reception process are performed in parallel.

Power saving control in the transmission process in FIG. 20 is explained first. At Step S110, the control unit 11 determines the current operating mode based on mode information and the like stored in the memory or the like. When the operating mode is in the normal communication state, that is, in the full service mode using the transmission and receiving functions, the control unit 11 detects the amount of data accumulated in the reception buffer 13 and operating states of the connected devices (the terminals 20-1 and 20-2) (Step S111).

The control unit 11 then determines whether to shift to the sleep mode based on the detected states. For example, when a statistical amount of data in the transmission and reception buffers 12 and 13 is equal to or less than a preset value, and when all the terminals 20-1 and 20-2 as the connected devices are halted, the control unit 11 shifts the mode to the sleep mode, for example, when the type of application currently being executed by the terminals 20-1 and 20-2 allows delay. Because the shift to the sleep mode is performed by presupposing that a sleep permission, that is, Sleep_allow(ON) is received from the OLT 1 and the permission is not canceled, the control unit 11 refers to the information of the sleep permission stored in the own device to determine whether to allow the shift.

Selection of the sleep mode is performed by checking the communication state, the state of the connected device, and the type of the application to be executed, respectively for the uplink and downlink. The control unit 11 determines the sleep mode for the optical transmitter 141 based on the state of the uplink, and the sleep mode for the optical receiver 142 based on the state of the downlink. Because it may be required to receive the grant frequently depending on the requirement of uplink communication, the control unit 11 selects the sleep mode not only for the optical transmitter 141 but also for the optical receiver 142 depending on the state of the uplink, so as to satisfy the required communication conditions.

At the time of selecting the sleep mode, the control unit 11 does not select an unallowed sleep mode as the mode to be used, by referring to the allowed_mode received at the configuration step S2.

At the time of shifting to the sleep mode, the control unit 11 generates a Sleep_request message (Step S133), and inserts information corresponding to the sleep mode selected at Step S112, for example, Tx and TRx into the Sleep_request message.

When Step S133 is complete, and when having determined not to shift to the sleep mode at Step S112, the control unit 11 performs the process at Step S113. The control unit 11 creates transmission data and control data as a payload to be stored in a transmission frame. The control unit 11 also creates band request information (report) based on the amount of data or the like stored in the reception buffer 13. The control unit 11 creates a transmission frame (Step S115). The created payload and band request information are stored in a frame in a lower layer. The Sleep_request to be created at Steps S126, S132, and S133 is also included in the information to be stored.

When transmission preparation of the frame is complete, the control unit 11 waits until the time specified by an allocation notice of the transmission band without transmitting the frame (Step S116). The control unit 11 can perform other processes in parallel until the transmission start time is reached. When the transmission time is reached, the control unit 11 transmits the transmission frame to the OLT 1 via the optical transmitter 141 (Step S117).

Subsequently, the control unit 11 determines whether to shift to the sleep mode (Step S118). When the mode is to be shifted, the control unit 11 cuts power to the optical transmitter 141 or performs a process of decreasing power to the optical transmitter 141 (Step S119). Necessity of shift to the sleep mode is determined according to the determination result at Step S112. At Step S130, when it is determined that it is necessary to cut or decrease supply power after the transient operating time, the above process is also performed at Step S119.

The control unit 11 starts measurement of time by a timer (hereinafter, "timer S") for measuring the idle period. The sleep_time1 is set to the timer S, and when the sleep_time1 has passed after the start of measurement, the control unit 11 can ascertain the end of the idle period.

Subsequently, the control unit 11 determines whether to end the communication (Step S120). When it is determined not to end the communication, the control unit 11 returns to Step S110 to repeat the above process.

An operation during the idle period in the sleep mode is explained next.

At Step S110, when having determined that the current operating state of the ONU 10 is such that the ONU 10 is operating in the idle period in the Tx or TRx sleep mode, the control unit 11 determines whether the timer S has finished, that is, whether the idle period based on the sleep_time1 has ended (Step S121). When the idle period has ended, the control unit 11 stops the timer S (Step S122), recovers the transmitting function of the optical transmitter 141, and stops decreasing or cutting power to the optical transmitter 141 (Step S123). The control unit 11 starts measurement of an elapsed time by another timer (hereinafter, "timer A") in order to measure the transient operating time (Step S124). Timer information set here is an Aware_time1 indicating the transient operating time of the optical transmitter 141.

When having determined that the timer S has not finished at Step S121, the control unit 11 determines whether it is required to end the sleep mode and shift to the full service mode, that is, whether it is required to cancel the power saving operation and shift to an awake state (Step S125). At this time, cancelling conditions of the sleep mode are as described below. A first condition is whether a message Sleep_allow (OFF) for canceling the sleep permission has been received from the OLT 1. A second condition is whether the states of the buffer and the connected devices are detected as at Step S111 and a condition opposite to the condition at the time of shifting to the sleep mode has been detected. When the message has been received, or the opposite condition has been detected, the ONU 10 ends the sleep mode.

When the sleep mode is to be ended, the control unit 11 creates a Sleep_request message including information ("awake") indicating cancellation of the sleep mode, and stops the timer S (Step S126). The Sleep_request message is transmitted in a subsequent process at Step S117. The control unit 11 turns on the optical transmitter 141 as in the process at Step S123 (Step S127). On the other hand, when the sleep mode is not to be ended, the control unit 11 returns to Step S110.

Because the control unit 11 determines whether to cancel the sleep mode in the idle period and recovers the transmitting function, the ONU 10 can promptly restart transmission and can decrease the delay time. Even in the idle period, the control unit 11 can create a payload as at Step S113.

An operation during the transient operating time in the sleep mode is explained next.

When having determined that it is the transient operating time at Step S110, the control unit 11 determines whether the timer A has finished (Step S128). When the timer A has finished, the control unit 11 stops the timer A (Step S129), and prepares for decreasing or cutting power to the optical transmitter 141. Because the power is actually decreased or cut at Step S119, the control unit 11 stores information instructing to decrease or cut the power in the memory or a register at Step S130. When it takes a time since the instruction of power cut until power to the optical transmitter 141 is actually cut and transmission of the frame at Step S117 can be performed, the control unit 11 can perform a process to transmit a signal for instructing to decrease or cut power to the optical transmitter and receiver 5 or to stop power supply at Step S130.

When having determined that the timer A has not finished at Step S128, the control unit 11 determines whether to cancel the sleep mode as at Step S125 (Step S131). When the sleep mode is to be canceled, the control unit 11 creates a Sleep_request as at Step S126, and notifies the OLT 1 of cancellation of the sleep mode (Step S132). The control unit 11 then stops the timer A.

In this manner, the control unit 11 can effectively perform the power saving control of the ONU 10 by using the timer S for the sleep_time1 and the timer A for the aware_time1.

The power saving control in the reception process is explained next with reference to FIG. 21.

At Step S140, the control unit 11 first determines the current operating mode based on the mode information and the like stored in the memory or the like. When the operating mode is in the normal communication state, that is, in the full service mode using the transmission and receiving functions, or in the Tx sleep mode, the control unit 11 detects the communication state and the operating states of the connected devices (the terminals 20-1 and 20-2) as at Step S111 in FIG. 20 (Step S141).

The control unit 11 then extracts the frame stored in the reception buffer or the like by performing the reception process (Step S143), and extracts the payload from the frame to perform the process according to the payload (Step S144). The payload includes a control message, and the control unit 11 determines the control message by the identifier or the like of the message to perform the process according to the type of the control message.

The control unit 11 determines whether to shift to the TRx sleep mode, and when the mode is to be shifted, performs a process of cutting or decreasing power to the optical receiver 142. When the optical transmitter and receiver 5 has a function of halting a part or all of the transmission process or the reception process, the control unit 11 can perform the process by transmitting a control signal to the optical transmitter and receiver 5. Furthermore, when the control unit 11 can control electric current to the optical transmitter 141 or the optical receiver 142 directly supplied from a power circuit, the control unit 11 controls the power circuit or a relay circuit between the transmitter and the power circuit, thereby stopping power supply. The power control for cutting power at this step is performed not only for a case of newly performing the sleep mode but also for a case where it has been determined that the transient operating time has ended at Step S159 described later.

When power to the optical receiver 142 is cut in order to shift to the TRx sleep mode, the control unit 11 starts measurement of time by a timer S based on the sleep_time2. This timer S is different from the timer S in FIG. 20 for measuring the time related to the sleep_time1, and is used for measuring the idle period of the optical receiver 142.

The control unit 11 then determines whether to cancel the sleep mode as at Steps S125 and S131 in FIG. 20. When the sleep mode is to be canceled, the control unit 11 stops the timer S and a timer A described later, and stores a mode change in the memory or the like (Step S152). Subsequently, the control unit 11 determines whether to end the communication, and when the communication is not to be ended, returns to the process from Step S140.

The process in the idle period in the TRx sleep mode is explained next.

When having determined that the state is in the idle period in the TRx sleep mode at Step S140, the control unit 11 determines whether the timer S has finished (Step 153). When the timer S has not finished, the control unit 11 proceeds to Step S144 to perform the process for received data accumulated in the optical receiver 142. When the process for the received data accumulated in the reception buffer is not required during a period during which the receiving function of the optical receiver 142 is halted, the control unit 11 can return to the process at Step S140 to continue a standby state.

When the timer S has finished, the control unit 11 stops the timer S (Step S154), and stops cutting or decreasing power to the optical receiver 142, and restarts normal power supply (Step S155). The control unit 11 starts time measurement by the timer A related to the aware_time2, and starts measurement of timing at which the time specified by the aware_time2 passes since the start of transient operation (Step S156). The timer A can measure a time different from the timer A related to the aware_time1. The control unit 11 stores therein information that the mode has shifted to an aware state (a transient operation state), and starts a frame reception process at Step S143.

An operation during the transient operating time in the TRx sleep mode is explained next.

When having determined that the current state is a state in the transient operating time at Step S140, the control unit 11 determines whether the aware_time2 has finished based on the timer A in order to detect end of the transient operating time (Step S157). When the aware_time2 has not finished, the control unit 11 continues the reception process and the like from Step S141. On the other hand, when the aware_time2 has finished, the control unit 11 starts the process of cutting or decreasing power to the optical receiver 142 as at Step S152 (Step S159). At this time, the control unit 11 stores therein a state change from the transient operation state to the idle state, and proceeds to the process from Step S141.

As described above, because the control unit 11 can adjust power to the optical receiver 142 by using the timer S related to the sleep_time2 and the timer A related to the aware_time2, the power saving operation of the ONU 10 can be effectively controlled. It should be noted that, although the sleep_time1 and the sleep_time2 are set to different values in the communication sequence in FIG. 19, a case where the sleep_time1 and the sleep_time2 can be set to the same value and the aware_time1 and the aware_time2 can be set to different values also enables transmission and reception rates, power consumption, and the delay time to be adjusted appropriately.

It should be also noted that, although the ONU 10 acquires a sleep permission from the OLT 1 beforehand and the ONU 10 having the sleep permission shifts autonomously to the sleep mode at a certain timing in the communication sequence from FIG. 17 to FIG. 19, this sleep protocol is an example, and the power saving operation of the present embodiment can be also controlled by using other sleep protocols explained in the first and second embodiments.

While embodiments of the present invention have been explained above, the present invention is not limited to these embodiments, and any modification can be made within the scope of the present invention. For example, a communication system to which the communication method is applied does not need to be the PON system, and the communication method can be applied to an optical communication system using an active element. Furthermore, the communication method can be applied not only to the optical communication, but also a communication system in which communication between terminals is performed by using an electric signal.

Fourth Embodiment

Several examples are explained for a communication sequence in which the idle period is set corresponding to each sleep mode. The sequence explained in the present embodiment is identical to that of the first and second embodiments such that the idle period is set for each mode and is basically based on the communication system according to the first and second embodiments.

Figure 22:
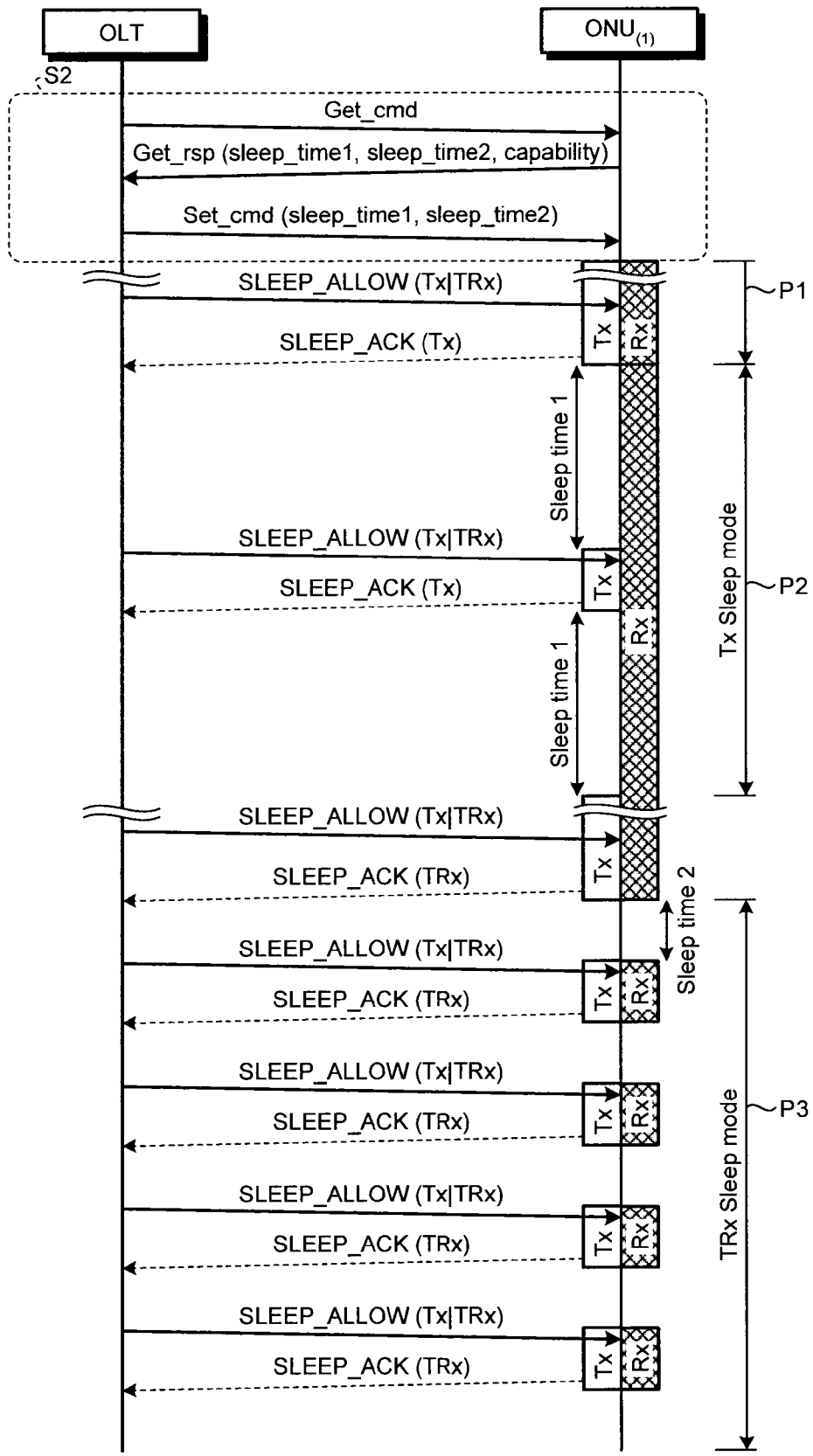
FIG. 22 depicts a communication sequence in a fourth embodiment of the present invention.

FIG. 22 depicts a communication sequence of the present embodiment. Step S2 (the configuration step) is also referred to as "capability discovery step", which is a process in which the OLT 1 newly becomes active to detect capability of the ONU 10, particularly, capability of the power saving function. At this step, the ONU 10 notifies the OLT 1 of request values as the ONU 10 for the sleep_time1 and the sleep_time2 corresponding to each mode. The sleep_time1 and the sleep_time2 can be, respectively, a numerical value of a minimum value allowed or a maximum value allowed for the sleep time, or can be information directly associated with the capability of the transmitter and receiver as in the third embodiment.

At the time of allowing the ONU 10 to shift to the sleep mode, the OLT 1 transmits a SLEEP_ALLOW message by specifying allowed modes. The ONU 10 can select a sleep mode to be used. When shifting to the Tx sleep mode, the ONU 10 selects the sleep_time1 (corresponding to T1 in the first embodiment), and sets the sleep_time1 to the timer to measure the idle time. When shifting to the TRx sleep mode, the ONU 10 sets the sleep_time2 (corresponding to T2 in the first embodiment) to the timer to measure the idle period. At the time of shifting to the sleep mode, the ONU 10 can arbitrarily select whether to transmit the SLEEP_ACK.

Figure 23:
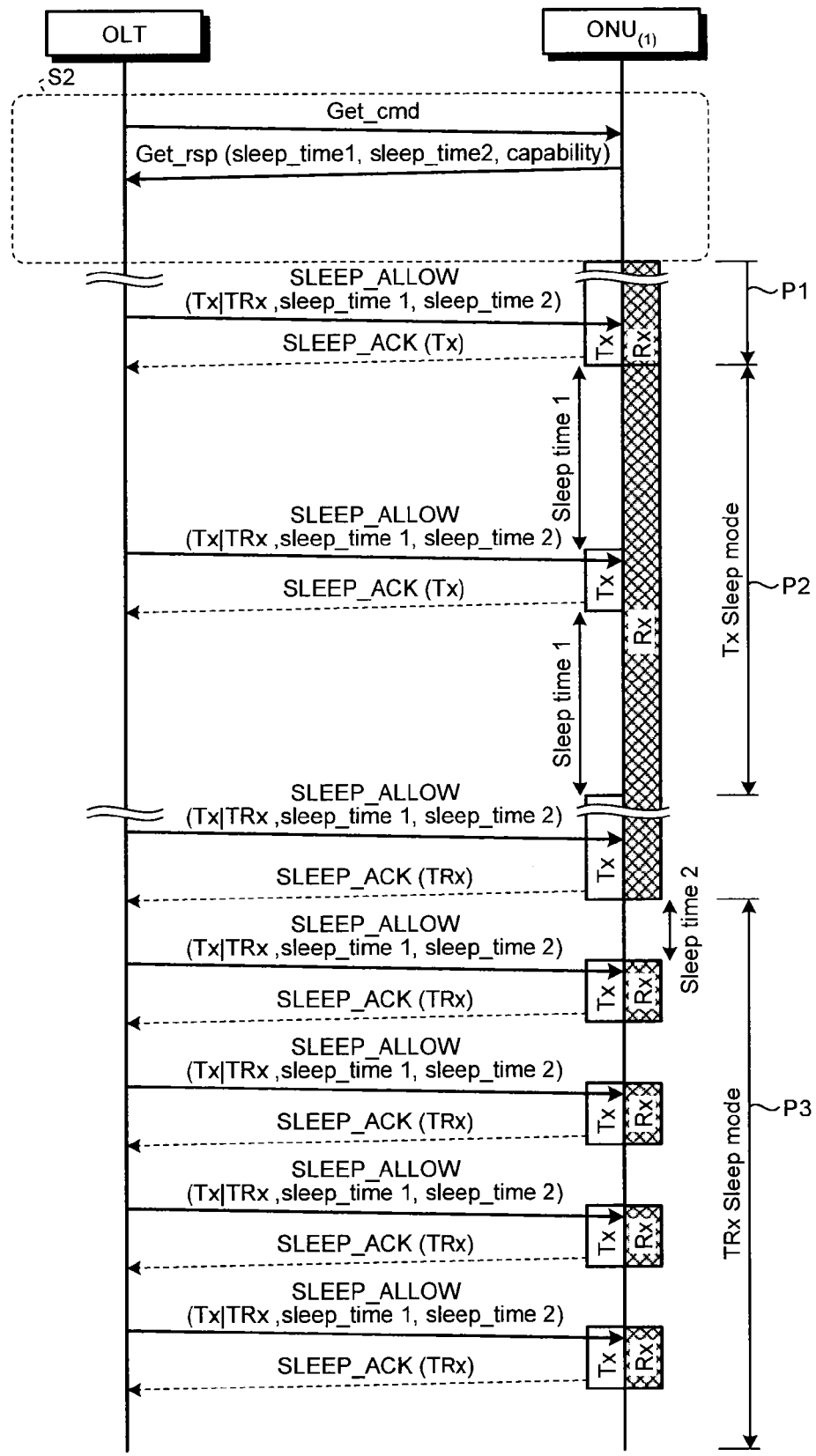
FIG. 23 depicts another example of the communication sequence in the fourth embodiment of the present invention.

FIG. 23 depicts a modification of the communication sequence in FIG. 22, in which the OLT 1 inserts two sleep parameters such as the sleep_time1 corresponding to the Tx sleep mode and the sleep_time2 corresponding to the Tx sleep mode into the SLEEP_ALLOW message to send the message to the ONU 10. The OLT 1 can also insert two sleep parameters such as the sleep_time1 corresponding to the optical transmitter 141 and the sleep_time2 corresponding to the optical receiver 142 into a similar message, to control the ONU 10 as in the third embodiment.

Figure 24:
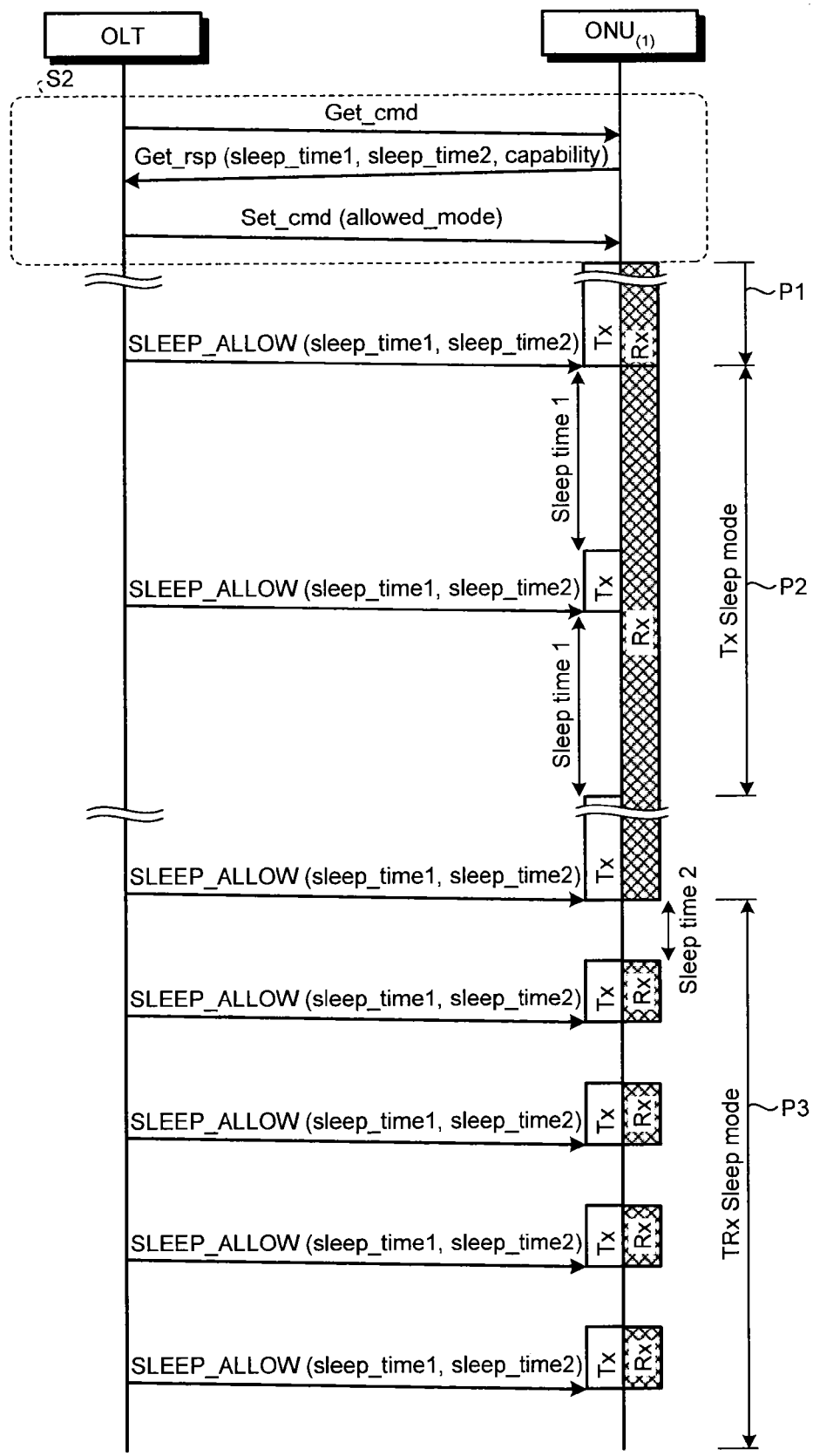
FIG. 24 is a sequence diagram depicting insertion of sleep parameters in the fourth embodiment of the present invention.

FIG. 24 depicts a sequence in which the OLT 1 inserts two sleep parameters such as the sleep_time1 corresponding to the Tx sleep mode and the sleep_time2 corresponding to the Tx sleep mode into the SLEEP_ALLOW message, without specifying a sleep mode. In the sequence, the OLT 1 notifies the ONU 10 of the allowed sleep modes beforehand at Step S2. When the allowed sleep mode is not regulated, the OLT 1 does not need to transmit the Set_command.

Figure 25:
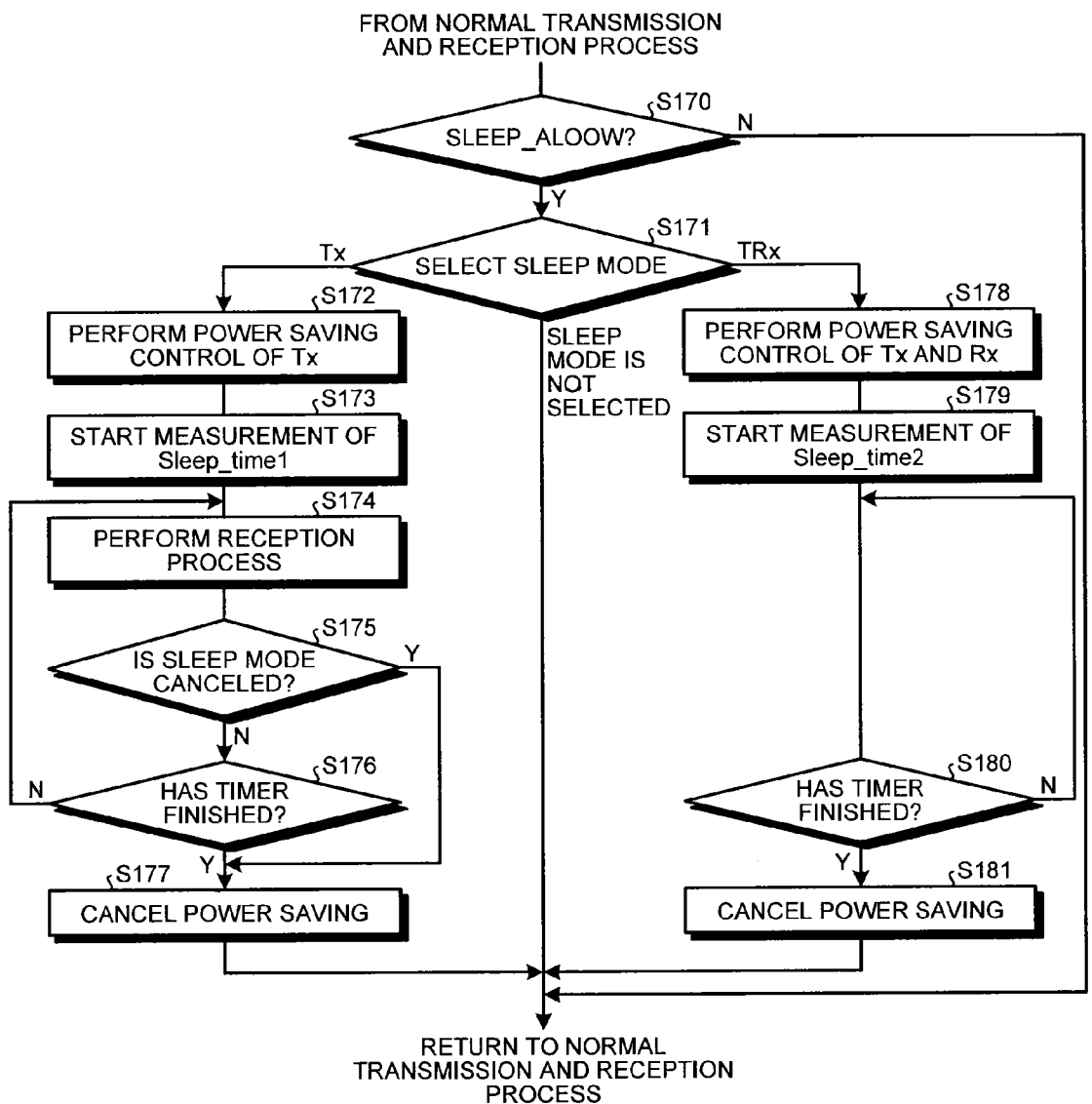
FIG. 25 is a flowchart of a process of selecting an idle period of an ONU according to the fourth embodiment of the present invention.

FIG. 25 depicts a process in which the control unit 11 of the ONU 10 selects the idle period (the sleep_time1 or the sleep_time2) corresponding to the sleep mode. Upon reception of the SLEEP_ALLOW message (Step S170), the control unit 11 selects the sleep mode as in the embodiments described above (Step S171).

When having selected the Tx sleep mode, the control unit 11 controls the optical transmitter 141 to the power saving state (Step S172), and selects the sleep_time1 as the idle period to start measurement by the timer (Step S173). In the Tx sleep mode, the reception process is performed (Step S174), and at Steps S175 and S176, when canceling sleep before finish of the sleep_time1, the control unit 11 cancels the power saving state of the optical transmitter 141 (Step S177) and returns to the normal transmission and reception process. Otherwise, the control unit 11 returns to the reception process at Step S174.

Meanwhile, when having selected the TRx sleep mode, the control unit 11 controls the optical transmitter and the optical receiver 142 to the power saving state (Step S178), and selects the sleep_time2 as the idle period to start measurement by the timer (Step S179). The control unit 11 then maintains the power saving state until the timer finishes, and when the timer finishes (Step S180), cancels the power saving states of the optical transmitter 141 and the optical receiver 142 (Step S181) to return to the normal transmission and reception process. The control unit 11 can perform control for canceling the power saving state due to an increase in the transmission rate or the like before the timer finishes.

In the first to fourth embodiments, the control for controlling the optical transmitter and receiver 5 to the power saving state can be performed not only by cutting power to the optical transmitter 141 and the optical receiver 142 but also by halting a part of the transmitting function or the receiving function, thereby suppressing power consumption. When the optical transmitter 141 includes a circuit such as a laser diode, a laser diode driver, or a signal conditioner, the control unit 11 can suppress power consumption by halting a part of these components and controlling remaining components to be active. Furthermore, when the optical receiver 142 includes a photodiode, a photodiode power circuit, a transimpedance amplifier, or a limit amplifier, the control unit 11 can suppress power consumption by halting a part of these components and controlling remaining components to be active. When the optical transmitter and receiver 5 has a microcomputer incorporated therein, the control unit 11 can control on or off of the microcomputer.

In the present embodiment, the OLT 1 instructs a shift to the power saving mode or conditions (parameters) to the ONU 10 by taking the function of the ONU 10 or a service to be offered into consideration, so that the OLT 1 can control the power saving function on the communication system. Regarding this function, it is an option whether the OLT 1 transmits a transmission permission signal based on the associated information of the power saving function.

The Tx sleep mode and the TRx sleep mode have been exemplified above as the power saving mode. However, the power saving mode and the protocol thereof are not limited thereto. The name of the Tx sleep mode can be changed to a sleep mode 1, the name of the TRx sleep mode can be changed to a sleep mode 2, and the corresponding mode parameters can be encoded such that the sleep mode 1 is denoted as "1", and the sleep mode 2 is denoted as "2". Further, in the first to third embodiments, the power saving operation using the Tx sleep mode and the TRx sleep mode has been explained. However, an Rx sleep mode in which only the optical receiver 142, of the optical transmitter 141 and the optical receiver 142 provided in the ONU 10, is controlled to the power saving state can be used together with other sleep modes. In this case, the transmission band is allocated beforehand from the OLT 1 before shifting to the power saving state or allocated in a fixed manner.

Fifth Embodiment

Figure 26:
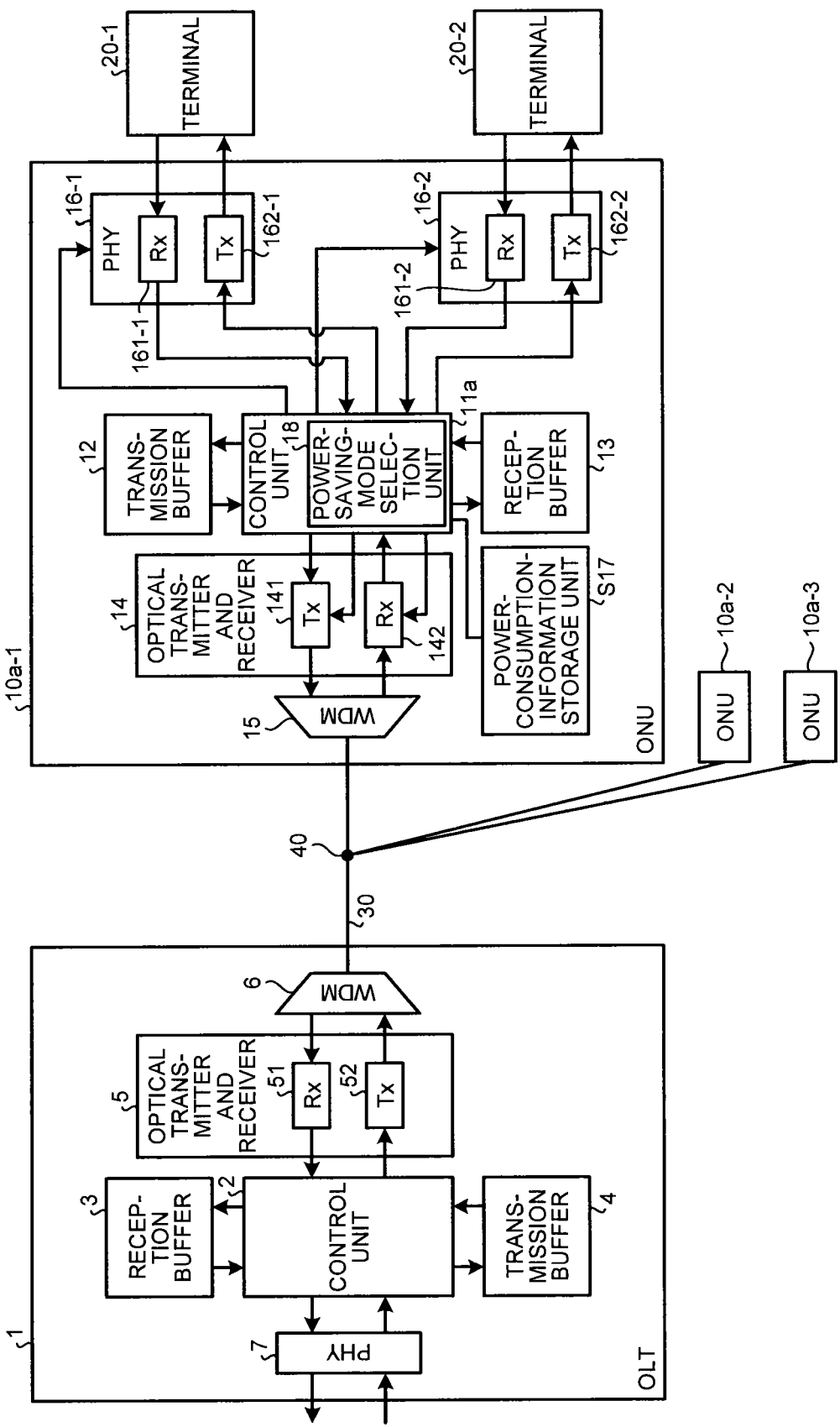
FIG. 26 is a configuration example of a PON system according to a fifth embodiment of the present invention.

A PON system that selects a power saving mode based on power consumption is explained next. FIG. 26 is a configuration example of a PON system according to the present embodiment. As shown in FIG. 26, the PON system according to the present embodiment includes the OLT 1 and ONUs 10*a*-1 to 10*a*-3 (slave stations). The OLT 1 is similar to that of the first embodiment. The ONU 10*a*-1 is similar to the ONU 10-1 of the first embodiment except for a feature that a power-consumption-information storage unit 17 is added and a control unit 11*a* is provided instead of the control unit 11. The ONUs 10*a*-2 to 10*a*-3 have similar configuration to that of the ONU 10*a*-1. Constituent elements in the fifth embodiment having a function identical to those in the first embodiment are denoted by like reference signs in the first embodiment and explanations thereof will be omitted.

The control unit 11*a* of the ONU 10*a*-1 includes a power-saving-mode selection unit 18. The operation of the control unit 11*a* of the ONU 10*a*-1 other than an operation involved with an operation of the power-saving-mode selection unit 18 is similar to that of the control unit 11 of the ONU 10-1 according to the first to fourth embodiments. As in the first and second embodiments, an example of setting the idle periods different in the Tx sleep mode and the TRx sleep mode is explained below. However, the present embodiment can be applied similarly to a case where the idle periods respectively corresponding to the optical transmitter 141 and the optical receiver 142 are set as in the third embodiment, with only a calculation method of "idle period/transient operating time" described later being different.

Figure 27:
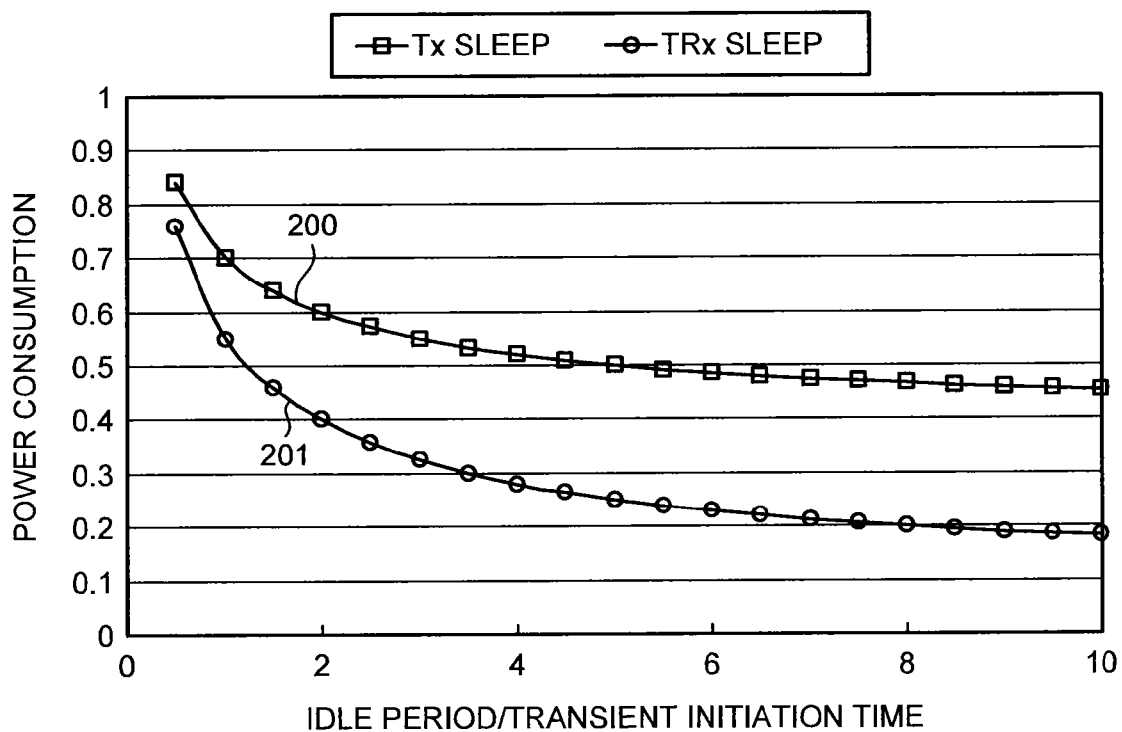
FIG. 27 is an example of power consumption in each power saving mode.

FIG. 27 is an example of power consumption in each power saving mode. A power saving characteristic 200 indicates a power consumption characteristic of the Tx sleep mode, and a power consumption characteristic 201 indicates a power consumption characteristic in the TRx sleep mode. In FIG. 27, the "idle period/transient operating time" is plotted on a horizontal axis, and power consumption normalized by assuming power consumption in the full service mode as 1 is plotted on a vertical axis. As the idle period, an idle period of one pause (intermittent idle period) in the power saving mode in which a pause is taken intermittently is shown, and the transient operating time indicates a transient operating time after the idle period. As shown in FIG. 27, regarding power consumption of the ONU 10a, the TRx sleep mode in which both the transmission and reception are halted has a larger power saving effect than the Tx sleep mode in which only a transmission side is halted. The power saving effect becomes larger as the idle period becomes longer with respect to the transient operating time in both power saving modes. In this manner, power consumption in the respective power saving modes depends on the "idle period/transient operating time", which is a ratio between the idle period and the transient operating time.

Specific characteristics of the power saving effect such as the power consumption characteristics 200 and 201 depend on implementation of the ONU 10a and is a value that can been known by a manufacturer of the ONU 10a. In the present embodiment, the ONU 10a stores the power consumption characteristics 200 and 201 as the power consumption information in the power-consumption-information storage unit 17 as a database. The power-saving-mode selection unit 18 obtains power consumption based on the "idle period/transient operating time" and the power consumption information for each power saving mode and selects a power saving mode having less power consumption.

While an example in which the power consumption characteristics 200 and 201 are stored as the database is exemplified here, a calculation formula for obtaining power consumption based on the "idle period/transient operating time" by polynomial approximation or the like is set, and the power-saving-mode selection unit 18 can obtain power consumption in each power saving mode by calculation using the calculation formula. The ONU 10a can store not only the format of the database, but also the power consumption information as information of a table or the like storing a threshold, and a storing method of the power consumption information and a calculation method of the power saving mode based on the power consumption characteristics 200 and 201 are not limited to the examples described above.

In the present embodiment, the power-consumption-information storage unit 17 is provided outside of the control unit 11a. However, the power-consumption-information storage unit 17 can be provided in the control unit 11a. Furthermore, the power-saving-mode selection unit 18 can be provided outside of the control unit 11a.

Figure 28:
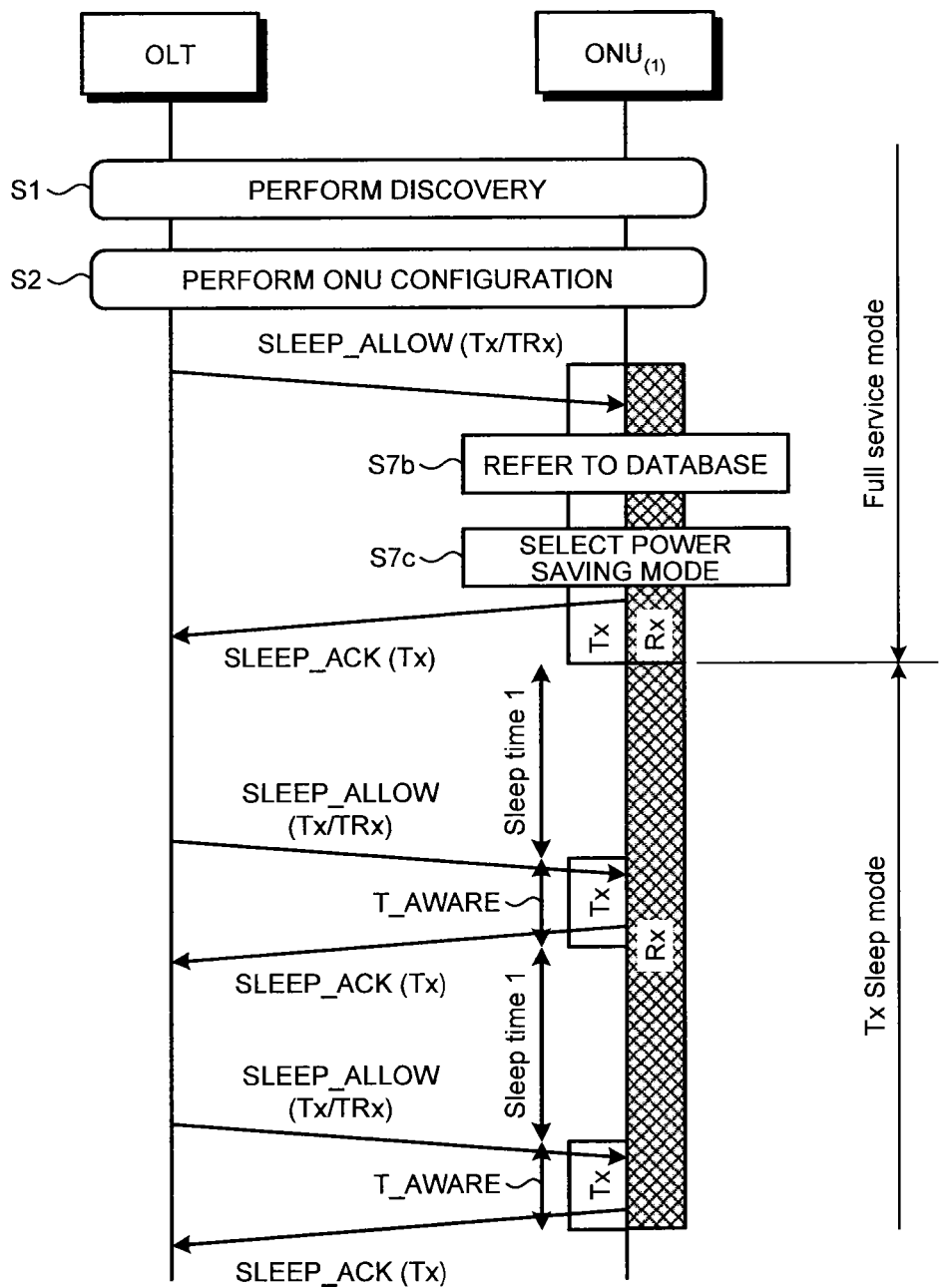
FIG. 28 is a sequence diagram depicting an example of a power-saving-mode setting procedure in the fifth embodiment of the present invention.

An operation example of the present embodiment is explained next. FIG. 28 is a sequence diagram depicting an example of a power-saving-mode setting procedure in the present embodiment. As explained in the above-described (a) to (d) of the first embodiment and in the fourth embodiment, there are various transition procedures to the sleep mode, and any procedure can be used so long as it is a procedure in which the ONU 10a selects a power saving mode. As in the above-described (a) of the first embodiment (a case where the OLT 1 makes an inquiry and the ONU 10 decides the power saving mode), and as in the example in FIG. 22, an example in which in the ONU configuration at Step S2, the sleep_time1 and the sleep_time2, which are the idle periods respectively corresponding to the Tx sleep mode and the TRx sleep mode, are notified from the OLT 1 to the ONU 10a is explained. Notice of the sleep_time1 and the sleep_time2 can be given by using the SLEEP_ALLOW message as in the examples shown in FIGS. 23 and 24.

After the ONU configuration at Step S2, the OLT 1 transmits a SLEEP_ALLOW (Sleep_allow) message to the ONU (1) (the ONU 10a-1) to allow the ONU to shift to the power saving mode. It is assumed here that the ONU 10a-1 can support both the Tx sleep mode and the TRx sleep mode. The OLT 1 transmits a SLEEP_ALLOW message informing that the ONU 10a-1 can shift to any of the Tx sleep mode and the TRx sleep mode to the ONU 10a-1.

The power-saving-mode selection unit 18 of the control unit 11a in the ONU 10a-1 determines that the ONU 10a-1 shifts to the power saving mode when uplink data is equal to or less than a certain value. The power-saving-mode selection unit 18 refers to the database in the power-consumption-information storage unit 17 (Step S7b) to obtain power consumption based on the "idle period/transient operating time" and the database for each power saving mode, and selects a power saving mode based on the obtained power consumption (Step S7c). By selecting a power saving mode having low power consumption, a power saving mode having a high power saving effect can be set. It is assumed here that the transient operating time (T_AWARE) is set as a fixed value regardless of the power saving mode. Accordingly, the "idle period/transient operating time" for each power saving mode can be obtained by the sleep_time1 and the sleep_time2, which are the idle periods respectively corresponding to the Tx sleep mode and the TRx sleep mode. When the transient operating time is different for each power saving mode, the transient operating time corresponding to each mode can be used at the time of calculating the "idle period/transient operating time".

As explained in the third embodiment, when the idle periods respectively corresponding to the optical transmitter 141 and the optical receiver 142 are to be set, for example, power consumption in the Tx sleep mode and the TRx sleep mode can be obtained in the following manner. A power consumption characteristic of the optical transmitter 141 and a power consumption characteristic of the optical receiver 142 with respect to the "idle period/transient operating time" are obtained, instead of the power consumption characteristics 200 and 201 for each power saving mode shown in FIG. 27, and power consumption in the Tx sleep mode is obtained based on the idle period and the transient operating time for the uplink, and the power consumption characteristic of the optical transmitter 141. For the TRx sleep mode, power consumption Pw1 is obtained based on the idle period and the transient operating time for the uplink, and the power consumption characteristic of the optical transmitter 141, and power consumption Pw2 is obtained based on the idle period and the transient operating time for the downlink, and the power consumption characteristic of the optical receiver 142, and a sum total of the Pw1 and Pw2 is specified as power consumption in the TRx sleep mode.

After selecting the power saving mode, the ONU 10a-1 transmits a SLEEP_ACK (Sleep_Ack) message in which information indicating a shift to the selected power saving mode is stored to the OLT 1, and shifts to the selected power saving mode. For example, when a ratio between the idle period and the transient operating time ("idle period/transient operating time") in the Tx sleep mode is 10, and a ratio between the idle period and the transient operating time in the TRx sleep mode is equal to or less than 1, because the power saving effect is higher in the Tx sleep mode than selecting the TRx sleep mode, the Tx sleep mode is selected. FIG. 28 is an example of selecting the Tx sleep mode, and after transmitting the SLEEP_ACK message, the ONU 10a-1 shifts to the Tx sleep mode in which only the transmission side is halted.

In the above example, an example in which after receiving a SLEEP_ALLOW message from the OLT 1, the ONU 10a-1 selects the power saving mode is shown. However, in the configuration at Step S2, after having received the sleep_time1 and the sleep_time2, the ONU 10a-1 can select a power saving mode. Selection of the power saving mode can be performed (Steps S7b and S7c) every time the SLEEP_ALLOW message is received. However, the ONU 10a-1 can store the selection result, and uses the stored selection result of the power saving mode until a reconfiguration is performed. When the reconfiguration is performed, if there is a change in the "idle period/transient operating time" ratio of the power saving mode, selection of the power saving mode (Steps S7b and S7c) can be performed.

Regarding the power consumption characteristic shown in FIG. 27, when a characteristic such as a secular change can be ascertained, power consumption can be obtained by taking the secular change into consideration. Because the power consumption characteristic generally depends on temperatures as well, by storing temperature dependency of the power consumption characteristic in a database, and providing a temperature monitor in the ONU 10a-1, power consumption can be obtained by using the "idle period/transient operating time" and a measurement result of the temperature monitor and referring to the database.

Figure 29:
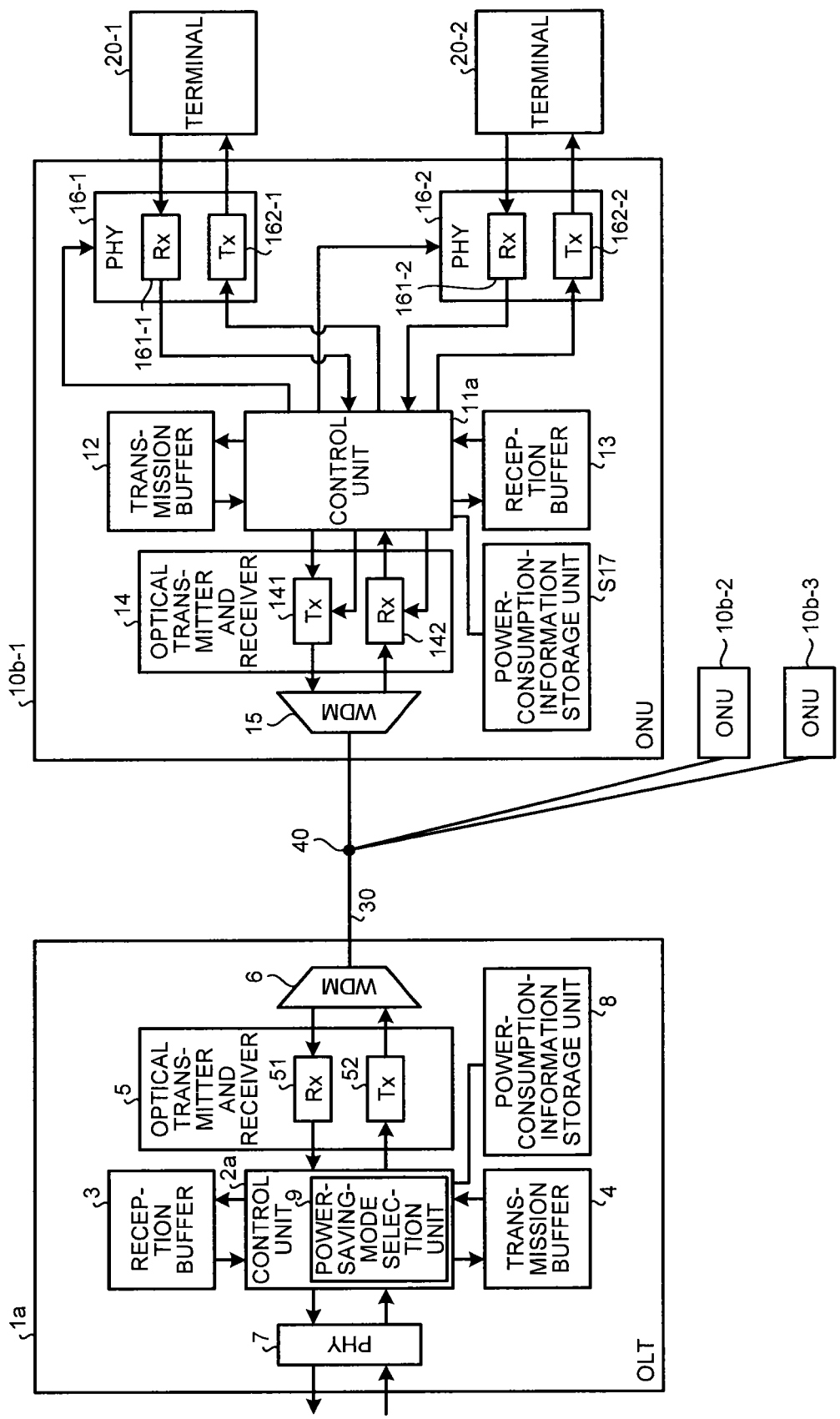
FIG. 29 is another configuration example of the PON system according to the fifth embodiment of the present invention.

In the above example, the ONU 10a-1 selects the power saving mode. However, the OLT side can select the power saving mode. FIG. 29 is a configuration example of the PON system in which the OLT selects the power saving mode based on power consumption. The PON system in FIG. 29 includes an OLT 1a (a master station) and ONUs 10b-1 to 10b-3. The ONUs 10b-1 to 10-3b are the same as the ONUs 10-1 to 10-3 according to the first embodiment except for a feature that the power-consumption-information storage unit 17 is added to the ONUs 10-1 to 10-3 according to the first embodiment. The OLT 1a is same as the OLT 1 according to the first embodiment except for a feature that a power-consumption-information storage unit 8 is added and a control unit 2a is provided instead of the control unit 2. The control unit 2a includes a power-saving-mode selection unit 9.

The power saving characteristic of the ONU is expressed by a value depending on implementation of the ONU and thus the ONU 10a described above stores therein the power consumption characteristics. However, the OLT 1a can store the power consumption characteristic for each power saving mode of each ONU 10b. The OLT 1a according to the present embodiment stores the power consumption characteristic for each power saving mode of each ONU 10b in the power-consumption-information storage unit 8 as a database. The database can be set by a manufacturer or the like of the ONU 10b, or the ONU 10b can transmit information to be stored in the database. When the database of the OLT 1a is set by the manufacturer or the like of the ONU 10b, the ONU 10b does not need to include the power-consumption-information storage unit 17, and can have the same configuration as that of the ONU 10.

Figure 30:
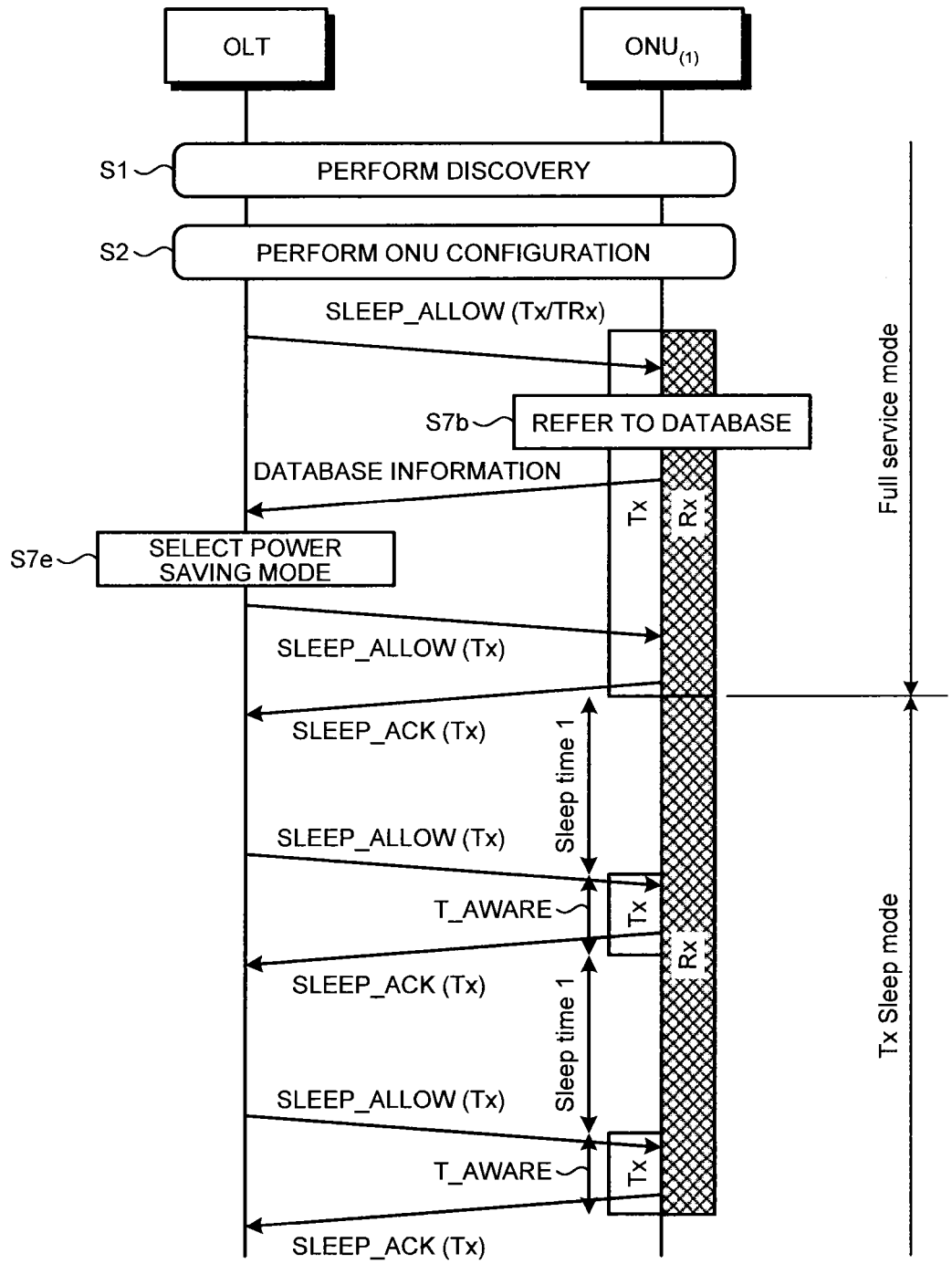
FIG. 30 is a sequence diagram depicting another example of the power-saving-mode setting procedure in the fifth embodiment of the present invention.

FIG. 30 is a sequence diagram depicting an example of a power-saving-mode setting procedure when the OLT 1a selects a power saving mode. An example in which the ONU (1) (the ONU 10b-1) transmits information to be stored in the database to the OLT 1a is shown below. It is assumed here that the ONU 10b-1 can support both the Tx sleep mode and the TRx sleep mode.

As in the example shown in FIG. 28, after Steps S1 and S2, the OLT 1a transmits a SLEEP_ALLOW message to the ONU 10b-1, and the ONU 10b-1 refers to the database in the power-consumption-information storage unit 17. The ONU 10b-1 reads all pieces of information (power consumption information) in the database (Step S7b). The ONU 10b-1 transmits the read database information (power consumption information) to the OLT 1a.

The power-saving-mode selection unit 9 in the OLT 1a stores the received power consumption information as a database in the power-consumption-information storage unit 8, and selects a power saving mode based on the "idle period/transient operating time" of the ONU 10b-1 and the database (Step S7e). The power-saving-mode selection unit 9 transmits a SLEEP_ALLOW message indicating that the selected power saving mode is allowed to the ONU 10b-1, and the ONU 10b-1 shifts to the power saving mode allowed by the SLEEP_ALLOW message from the OLT 1a, after transmitting a Sleep_Ack message. FIG. 30 is an example in which the Tx sleep mode is selected. Transmission of the database information from the ONU 10b-1 needs only to be performed at least once after connection between the ONU 10b-1 and the OLT 1a, and a transmission timing is not limited to the example shown in FIG. 30. Transmission can be performed in the ONU configuration at Step S2.

As described above, according to the present embodiment, a more effective power saving mode is selected based on the power consumption characteristic for each power saving mode of the ONU. Accordingly, the power saving effect can be increased.

INDUSTRIAL APPLICABILITY

The present invention is suitable for a communication method and a communication system that require power saving.

REFERENCE SIGNS LIST 1, 1a OLT
2, 2a control unit
3, 13 reception buffer
4, 12 transmission buffer
5, 14 optical transmitter and receiver
6 WDM
7 PHY
8, 17 power-consumption-information storage unit
9, 18 power-saving-mode selection unit
10-1 to 10-3, 10a-1 to 10a-3, 10b-1 to 10b-3 ONU
11, 11a control unit
20-1, 20-2 terminal
30 optical fiber
40 splitter
51, 142, 161-1, 161-2 Rx
52, 141, 162-1, 162-2 Tx
200, 201 power saving characteristic

The invention claimed is:

1. A user-side communication device that communicates with a station-side communication device based on a control signal transmitted from the station-side communication device, the user-side communication device comprising:
a receiver that receives a control signal related to a power saving operation from the station-side communication device, and can shift to a power saving state where power consumption is reduced by halting a part or all of a receiving function;
a transmitter that transmits a transmission signal to the station-side communication device and can shift to a power saving state where power consumption is reduced by halting a part or all of a transmitting function; and
a controller that controls the transmitter in a first power saving mode in which the transmitter shifts to the power saving state in a first power saving period based on the control signal and controls the receiver and the transmitter in a second power saving mode in which the receiver and the transmitter shift to the power saving state in a second power saving period based on the control signal,
wherein the first power saving period is different from the second power saving period, and
the controller intermittently stops power supplied to the transmitter in the first power saving period based on the control signal received by the receiver, and intermittently stops power supplied to the transmitter and the receiver in the second power saving period based on the control signal received by the receiver.

2. The user-side communication device according to claim 1, wherein
the first power saving period is set corresponding to the first power saving mode and the second power saving period is set corresponding to the second power saving mode.

3. The user-side communication device according to claim 1, wherein
the receiver receives a first control signal having time information of the first power saving period, which is a power saving period in the first power saving mode, and a second control signal having time information of the second power saving period, which is a power saving period in the second power saving mode, and
the controller intermittently stops the power supplied to the transmitter in the first power saving period based on the first control signal received by the receiver, and intermittently stops the power supplied to the transmitter and the receiver in the second power saving period based on the second control signal received by the receiver.

4. The user-side communication device according to claim 1, wherein
the first power saving period is a power saving period with respect to the transmitter, and the second power saving period is a power saving period with respect to the receiver and the transmitter.

5. The user-side communication device according to claim 1, wherein
the controller selectively performs the first power saving mode and the second power saving mode,
the receiver receives a first control signal having time information of the first power saving period, which is a power saving period in the first power saving mode, and a second control signal having time information of the second power saving period, which is a power saving period in the second power saving mode,
the controller intermittently stops power supply to the transmitter based on the first control signal, designating the first power saving period as an idle period, and intermittently stops power supply to the transmitter and the receiver based on the second control signal, designating the second power saving period as the power saving period, and
the controller includes
a consumption-power-information storage unit for storing therein, for each ONU, correspondence of a ratio between the intermittent idle period and a transient operating time to power consumption for each power saving mode as consumption power information, when a period during which the transmitter is transiently operated or a period during which the transmitter and the receiver are transiently operated after the power saving period is specified as the transient operating time, and
a power-saving-mode selection unit that obtains power consumption for each power saving mode based on the set power saving period, the transient operating time, and the power consumption information, and selects a power saving mode based on power consumption for each of the obtained power saving modes.

6. A communication method used in a communication system including a station-side communication device, hereinafter referred to as an Optical Line Terminal ("OLT"), and a user-side communication device, hereinafter referred to as an Optical Network Unit ("ONU"), in which the OLT controls a first power saving operation of the ONU and a second power saving operation different from the first power saving operation, the communication method comprising:
a step at which the OLT transmits a first power saving period related to the first power saving operation of the ONU and a second power saving period related to the second power saving operation to the ONU;
a step at which the ONU receives a control signal transmitted from the OLT;
a step at which the ONU determines whether to perform a power saving operation; and
a step at which the ONU performs the first power saving operation in the first power saving period, and the second power saving operation in the second power saving period, depending on the determination result,
wherein in the first power saving operation, a transmitter of the ONU operates in a power saving state,
in the second power saving operation, the transmitter and a receiver of the ONU operate in the power saving state,
the first power saving period is different from the second power saving period, and
power supplied to the transmitter in the first power saving period is intermittently stopped based on a first control signal received by the receiver, and power supplied to the transmitter and the receiver in the second power saving period is intermittently stopped based on a second control signal received by the receiver.

7. The communication method according to claim 6, wherein
the first power saving period is longer than the second power saving period.

8. The communication method according to claim 6, further comprising
a step at which the OLT transmits a first operation period related to the first power saving operation of the ONU and a second operation period related to the second power saving operation to the ONU.

9. The communication method according to claim 8, further comprising:
a step at which the ONU or the OLT stores therein, for each ONU, correspondence of a ratio between the first or second power saving period and the first or second operation period to power consumption for each power saving mode, as consumption power information;
a step at which the ONU or the OLT obtains power consumption for each power saving mode based on the set first or second power saving period, the set first or second operation period, and the power consumption information, and selects a power saving mode based on power consumption for each of the obtained power saving modes; and
a step at which the ONU performs the selected power saving mode.

10. A control device of a station-side communication device connected to a user-side communication device, hereinafter referred to as an Optical Network Unit ("ONU"), including a receiver that can shift to a power saving state where power consumption is reduced by halting a part or all of a receiving function, and a transmitter that can shift to a power saving state where power consumption is reduced by halting a part or all of a transmitting function, via a line to control an operation of the ONU, wherein the control device generates a control signal for controlling a power saving operation of the ONU by specifying a first power saving period with respect to a first power saving mode in which the transmitter shifts to the power saving state and by specifying a second power saving period with respect to a second power saving mode in which the transmitter and the receiver shift to the power saving state, the second power saving period being different from the first power saving period, the control device generates the control signal which causes a supply of power to the transmitter in the first power saving period to be intermittently stopped based on the control signal which has been received, and causes a supply of power to the transmitter and the receiver in the second power saving period to be intermittently stopped based on the control signal which has been received.

11. A station-side communication device connected to a user-side communication device via a communication line, the station-side communication device comprising:

an OLT controller being the control device according to claim 10; and an OLT transmitter that transmits the control signal generated by the OLT controller to the user-side communication device.

12. The station-side communication device according to claim 11, further comprising a storage unit that stores, as a plurality of idle periods, therein the first power saving period and the second power saving period.

13. The station-side communication device according to claim 12, wherein the OLT controller generates a first control signal for intermittently stopping power supply to the transmitter of the user-side communication device during the first power saving period and a second control signal for intermittently stopping power supply to the transmitter and the receiver of the user-side communication device during the second power saving period.

14. The station-side communication device according to claim 13, wherein the OLT controller specifies, as a threshold, a downlink delay time at which power consumption by the first power saving mode in which power supply to the transmitter of the user-side communication device is intermittently stopped and power consumption by the second power saving mode in which power supply to the transmitter and the receiver of the user-side communication device is intermittently stopped in the second power saving period become equal to each other, and when an acceptable downlink delay time is less than the threshold, the OLT controller determines the first power saving mode as the power saving mode of the user-side communication device, to generate the first control signal.

15. The station-side communication device according to claim 14, wherein the OLT controller generates a third control signal having time information of the first power saving period and a fourth control signal having time information of the second power saving period.

16. The station-side communication device according to claim 11, wherein the OLT controller inserts, into the control signal, the first power saving period as an idle period with respect to the transmitter of the user-side communication device and the second power saving period as an idle period with respect to the receiver and the transmitter of the user-side communication device.

17. The station-side communication device according to claim 11, wherein the OLT controller inserts, into the control signal, a transient operating time in a period during which the user-side communication device transiently operates the transmitter or the receiver of the user-side communication device after the first power saving period in the first power saving mode or the second power saving period in the second power saving mode.

18. The station-side communication device according to claim 17, further comprising:

a power-consumption-information storage unit that stores therein, for each ONU, correspondence of a ratio between a power saving period and the transient operating time to power consumption for each power saving mode as consumption power information; and a power-saving-mode selection unit that obtains power consumption for each power saving mode based on the set power saving period, the set transient operating time, and the power consumption information, and selects a power saving mode based on power consumption for each of the obtained power saving modes.

19. The station-side communication device according to claim 11, wherein when the OLT controller acquires capability information of the user-side communication device and performs communication setting in a communication protocol on the communication line, the OLT controller transmits the control signal to the user-side communication device by specifying the first power saving period or the second power saving period therein, and when the OLT controller allows the user-side communication device to perform the first power saving mode or the second power saving mode after communication based on the communication setting is started, the OLT controller transmits a permission signal to the user-side communication device.

20. A communication system comprising:

the station-side communication device according to claim 11; and the ONU, wherein the ONU includes an ONU controller that receives the control signal via the receiver to selectively perform the first power saving mode and the second power saving mode based on the control signal.

21. The communication system according to claim 20, wherein the OLT controller specifies the first and second power saving periods and transmits the first and second power saving periods to the ONU as the control signal, at a time of acquiring capability information of the ONU and performing communication setting in the communication line, and in the communication setting, the ONU controller stores therein the first and second power saving periods, and when the first power saving operation or the second power saving operation is to be performed after performing the communication setting, the ONU controller selects a power saving period corresponding to the power saving operation to be performed from the first and second power saving periods, and controls the power saving period according to the selected power saving period.

22. The communication system according to claim 21, wherein the first power saving period is longer than the second power saving period.

23. The communication system according to claim 21, wherein
each of the first and second power saving periods is determined based on a delay time generated in a corresponding power saving operation and power consumption reduced by the power saving period.

24. The communication system according to claim 20, wherein
the ONU controller selectively performs a first power saving mode in which the user-side transmitter is intermittently halted, designating the first idle period as an intermittent idle period, and a second power saving mode in which the user-side transmitter and the user-side receiver are intermittently halted, designating the second idle period as the intermittent idle period,
the ONU includes
a consumption-power-information storage unit for storing therein correspondence of a ratio between the intermittent idle period and a transient operating time to power consumption for each power saving mode, as consumption power information, when a period during which the user-side transmitter is transiently operated or a period during which the user-side transmitter and the user-side receiver are transiently operated after the intermittent idle period is designated as the transient operating time, and
a power-saving-mode selection unit that obtains power consumption for each power saving mode based on the set intermittent idle period, the transient operating time, and the power consumption information, and selects a power saving mode based on power consumption for each of the obtained power saving modes, and
the communication system performs the power saving mode selected by the power-saving-mode selection unit and notifies the OLT of the selected power saving mode.

25. The communication system according to claim 20, wherein
the ONU controller selectively performs a first power saving mode in which the user-side transmitter is intermittently halted, designating the first idle period as an intermittent idle period, and a second power saving mode in which the user-side transmitter and the user-side receiver are intermittently halted, designating the second idle period as the intermittent idle period,
the OLT includes
a consumption-power-information storage unit for storing therein, for each ONU, correspondence of a ratio between the intermittent idle period and a transient operating time to power consumption for each power saving mode as consumption power information, when a period during which the user-side transmitter is transiently operated or a period during which the user-side transmitter and the user-side receiver are transiently operated after the intermittent idle period is designated as the transient operating time, and
a power-saving-mode selection unit that obtains power consumption for each power saving mode based on the set intermittent idle period, the transient operating time, and the power consumption information, and selects a power saving mode based on power consumption for each of the obtained power saving modes, and
the OLT notifies the selected power saving mode to the ONU, and
the ONU performs the power saving mode notified from the OLT.

26. The communication system according to claim 25, wherein
the power consumption information is transmitted from the ONU to the OLT.

27. A control device provided in a user-side communication device including a receiver that receives a control signal related to a power saving operation from a station-side communication device and can shift to a power saving state where power consumption is reduced by halting a part or all of a receiving function, and a transmitter that transmits a transmission signal to the station-side communication device and can shift to a power saving state where power consumption is reduced by halting a part or all of a transmitting function, wherein
the control device controls the transmitter in a first power saving mode in which the transmitter shifts to the power saving state in a first power saving period based on the control signal and controls the receiver and the transmitter in a second power saving mode in which the receiver and the transmitter shift to the power saving state in a second power saving period based on the control signal,
the first power saving period is different from the second power saving period, and
power supplied to the transmitter in the first power saving period is intermittently stopped based on the control signal received by the receiver, and power supplied to the transmitter and the receiver in the second power saving period is intermittently stopped based on the control signal received by the receiver.

28. A control device of a station-side communication device connected to a user-side communication device, comprising a receiver and a transmitter, via a line to control an operation of the user-side communication device, wherein
the control device generates a control signal for controlling a power saving operation of the user-side communication device by specifying a first power saving period with respect to a first power saving mode in which a transmission function of the user-side communication device shifts to the power saving state and by specifying a second power saving period with respect to a second power saving mode in which the transmission function and a receiving function of the user-side communication device shift to the power saving state, the control signal comprising information of the first power saving period and information of the second power saving period,
the control signal causing a supply of power to the transmission function in the first power saving period to be intermittently stopped based on the control signal which has been received, and a supply of power to the transmission function and the receiving function in the second power saving period to be intermittently stopped based on the control signal which has been received.

29. A control device of a user-side communication device comprising a receiver that receives a control signal related to a power saving operation from a station-side communication device, and a transmitter that transmits a transmission signal to the station-side communication device, wherein
the control device intermittently powers down a transmission function of the user-side communication device in a first power saving mode in which the transmission function shifts to the power saving state in a first power saving period based on the control signal and intermittently powers down a receiving function and the transmission function of the user-side communication device in a second power saving mode in which the receiving function and the transmission function shift to the power saving state in a second power saving period based on the control signal, the control signal comprising information of the first power saving period and information of the second power saving period.

* * * * *